United States Patent
Ferren et al.

(10) Patent No.: US 8,209,524 B2
(45) Date of Patent: *Jun. 26, 2012

(54) CROSS-ARCHITECTURE OPTIMIZATION

(75) Inventors: Bran Ferren, Beverly Hills, CA (US);
W. Daniel Hillis, Encino, CA (US);
William Henry Mangione-Smith,
Kirkland, WA (US); **Nathan P.
Myhrvold, Medina, WA (US); Clarence
T. Tegreene, Bellevue, WA (US); Lowell
L. Wood, Jr.**, Livermore, CA (US)

(73) Assignee: The Invention Science Fund I, LLC,
Bellevue, WA (US)

( * ) Notice: Subject to any disclaimer, the term of this patent is extended or adjusted under 35 U.S.C. 154(b) by 1265 days.

This patent is subject to a terminal disclaimer.

(21) Appl. No.: 11/343,745

(22) Filed: Jan. 31, 2006

(65) Prior Publication Data
US 2007/0074173 A1    Mar. 29, 2007

Related U.S. Application Data

(63) Continuation-in-part of application No. 11/214,449, filed on Aug. 29, 2005, now Pat. No. 7,539,852, and a continuation-in-part of application No. 11/214,458, filed on Aug. 29, 2005, and a continuation-in-part of application No. 11/214,459, filed on Aug. 29, 2005, and a continuation-in-part of application No. 11/292,207, filed on Nov. 30, 2005, and a continuation-in-part of application No. 11/292,296, filed on Nov. 30, 2005, and a continuation-in-part of application No. 11/291,503, filed on Nov. 30, 2005, and a continuation-in-part of application No. 11/292,323, filed on Nov. 30, 2005, and a continuation-in-part of application No. 11/324,174, filed on Dec. 30, 2005, and a continuation-in-part of application No. 11/343,927, filed on Jan. 31, 2006.

(51) Int. Cl.
G06F 7/38    (2006.01)
G06F 9/00    (2006.01)
G06F 9/44    (2006.01)
G06F 15/00   (2006.01)

(52) U.S. Cl. ...................................... 712/226
(58) Field of Classification Search .................. 712/226
See application file for complete search history.

(56) References Cited

U.S. PATENT DOCUMENTS

| | | |
|---|---|---|
| 4,484,275 A | 11/1984 | Katzman et al. |
| 4,639,864 A | 1/1987 | Katzman et al. |
| 4,654,819 A | 3/1987 | Stiffler et al. |
| 4,672,537 A | 6/1987 | Katzman et al. |
| 4,751,639 A | 6/1988 | Corcoran et al. |
| 4,763,244 A | 8/1988 | Moyer et al. |
| 4,800,489 A | 1/1989 | Moyer et al. |
| 4,807,116 A | 2/1989 | Katzman et al. |

(Continued)

OTHER PUBLICATIONS

Patel et al.; rePlay: A Hardware Framework for Dynamic Optimization) ; 2001; IEEE.*

(Continued)

*Primary Examiner* — Corey S Faherty

(57) ABSTRACT

Embodiments include a device, apparatus, and a method. An apparatus includes a monitor circuit for determining an execution characteristic of a first instruction associated with a first computing machine architecture. The apparatus also includes a generator circuit for creating an optimization profile useable in an execution of a second instruction associated with a second computing machine architecture.

34 Claims, 55 Drawing Sheets

U.S. PATENT DOCUMENTS

| | | |
|---|---|---|
| 4,817,091 A | 3/1989 | Katzman et al. |
| 4,819,154 A | 4/1989 | Stiffler et al. |
| 4,847,755 A | 7/1989 | Morrison et al. |
| 4,891,787 A | 1/1990 | Gifford |
| 5,084,891 A | 1/1992 | Ariyavisitakul et al. |
| 5,212,777 A | 5/1993 | Gove et al. |
| 5,475,856 A | 12/1995 | Kogge |
| 5,526,313 A | 6/1996 | Etoh et al. |
| 5,535,405 A | 7/1996 | Byers et al. |
| 5,691,870 A | 11/1997 | Gebara |
| 5,764,953 A | 6/1998 | Collins et al. |
| 5,768,551 A | 6/1998 | Bleiweiss et al. |
| 5,774,736 A | 6/1998 | Wright et al. |
| 5,966,528 A | 10/1999 | Wilkinson et al. |
| 6,021,489 A | 2/2000 | Poplingher |
| 6,052,773 A | 4/2000 | DeHon et al. |
| 6,098,030 A | 8/2000 | McMinn |
| 6,199,095 B1 | 3/2001 | Robinson |
| 6,205,537 B1 | 3/2001 | Albonesi |
| 6,216,236 B1 | 4/2001 | Miyao et al. |
| 6,247,118 B1 | 6/2001 | Zumkehr et al. |
| 6,324,643 B1 | 11/2001 | Krishnan et al. |
| 6,347,341 B1 | 2/2002 | Glassen et al. |
| 6,374,349 B1 | 4/2002 | McFarling |
| 6,427,206 B1 | 7/2002 | Yeh et al. |
| 6,496,056 B1 | 12/2002 | Shoji |
| 6,519,654 B1 | 2/2003 | Fang et al. |
| 6,571,373 B1 | 5/2003 | Devins et al. |
| 6,625,750 B1 | 9/2003 | Duso et al. |
| 6,763,452 B1 | 7/2004 | Hohensee et al. |
| 6,766,419 B1 | 7/2004 | Zahir et al. |
| 6,877,084 B1 | 4/2005 | Christie |
| 6,924,790 B1 | 8/2005 | Bi |
| 6,954,845 B2 | 10/2005 | Arnold et al. |
| 6,954,923 B1 | 10/2005 | Yates, Jr. et al. |
| 6,959,372 B1 | 10/2005 | Hobson et al. |
| 7,093,147 B2 | 8/2006 | Farkas et al. |
| 7,886,164 B1 | 2/2011 | Alben et al. |
| 2001/0011346 A1 | 8/2001 | Yoshimi |
| 2001/0020267 A1 | 9/2001 | Koino |
| 2001/0021974 A1 | 9/2001 | Lee |
| 2001/0025338 A1 | 9/2001 | Zumkehr et al. |
| 2001/0032309 A1 | 10/2001 | Henry et al. |
| 2001/0047467 A1 | 11/2001 | Yeh et al. |
| 2002/0032718 A1 | 3/2002 | Yates et al. |
| 2002/0059054 A1 | 5/2002 | Bade et al. |
| 2002/0087828 A1 | 7/2002 | Arimilli et al. |
| 2002/0095666 A1 | 7/2002 | Tabata et al. |
| 2002/0112227 A1 | 8/2002 | Kramskoy et al. |
| 2002/0124196 A1 | 9/2002 | Morrow et al. |
| 2002/0144247 A1 | 10/2002 | Tirumalai et al. |
| 2002/0184385 A1 | 12/2002 | Kato |
| 2003/0005265 A1 | 1/2003 | Barowski et al. |
| 2003/0005419 A1 | 1/2003 | Pieper et al. |
| 2003/0074649 A1 | 4/2003 | Poulsen et al. |
| 2003/0079113 A1 | 4/2003 | Nguyen et al. |
| 2003/0101443 A1 | 5/2003 | Kosche et al. |
| 2003/0135771 A1 | 7/2003 | Cupps et al. |
| 2003/0200537 A1 | 10/2003 | Barsness et al. |
| 2003/0200539 A1 | 10/2003 | Fu et al. |
| 2004/0003309 A1 | 1/2004 | Cai et al. |
| 2004/0073894 A1 | 4/2004 | Chen et al. |
| 2004/0073899 A1 | 4/2004 | Luk et al. |
| 2004/0093591 A1 | 5/2004 | Kalogeropulos et al. |
| 2004/0103410 A1 | 5/2004 | Sakai |
| 2004/0153749 A1 | 8/2004 | Schwarm et al. |
| 2004/0174944 A1 | 9/2004 | Uht |
| 2004/0225871 A1 | 11/2004 | Irie et al. |
| 2005/0005203 A1 | 1/2005 | Czajkowski |
| 2005/0066153 A1 | 3/2005 | Sharangpani et al. |
| 2005/0086650 A1 | 4/2005 | Yates, Jr. et al. |
| 2005/0093607 A1 | 5/2005 | Marshall et al. |
| 2005/0132238 A1 | 6/2005 | Nanja |
| 2005/0138478 A1 | 6/2005 | Safford et al. |
| 2005/0149915 A1 | 7/2005 | Wu et al. |
| 2005/0155026 A1 | 7/2005 | DeWitt, Jr. et al. |
| 2005/0240814 A1 | 10/2005 | Sasakura et al. |
| 2005/0246613 A1 | 11/2005 | Blaauw et al. |
| 2006/0020838 A1 | 1/2006 | Tschanz et al. |
| 2006/0026543 A1 | 2/2006 | Jayaraman et al. |
| 2006/0181857 A1 | 8/2006 | Belady et al. |
| 2006/0202713 A1 | 9/2006 | Shumarayev |
| 2006/0202714 A1 | 9/2006 | Hoang et al. |
| 2006/0206882 A1 | 9/2006 | Illowsky et al. |
| 2006/0212753 A1 | 9/2006 | Sato |
| 2007/0006178 A1 | 1/2007 | Tan |
| 2007/0050555 A1 | 3/2007 | Ferren et al. |
| 2007/0050556 A1 | 3/2007 | Ferren et al. |
| 2007/0050557 A1 | 3/2007 | Ferren et al. |
| 2007/0050558 A1 | 3/2007 | Ferren et al. |
| 2007/0050581 A1 | 3/2007 | Mangione-Smith |
| 2007/0050582 A1 | 3/2007 | Mangione-Smith |
| 2007/0050604 A1 | 3/2007 | Ferren et al. |
| 2007/0050605 A1 | 3/2007 | Ferren et al. |
| 2007/0050606 A1 | 3/2007 | Ferren et al. |
| 2007/0050607 A1 | 3/2007 | Ferren et al. |
| 2007/0050608 A1 | 3/2007 | Ferren et al. |
| 2007/0050609 A1 | 3/2007 | Ferren et al. |
| 2007/0050659 A1 | 3/2007 | Ferren et al. |
| 2007/0050660 A1 | 3/2007 | Ferren et al. |
| 2007/0050661 A1 | 3/2007 | Ferren et al. |
| 2007/0050672 A1 | 3/2007 | Mangione-Smith |
| 2007/0050775 A1 | 3/2007 | Ferren et al. |
| 2007/0050776 A1 | 3/2007 | Ferren et al. |
| 2007/0055848 A1 | 3/2007 | Ferren et al. |
| 2007/0067611 A1 | 3/2007 | Ferren et al. |
| 2009/0115468 A1 | 5/2009 | Berthold et al. |

OTHER PUBLICATIONS

Berg et al.; SIP: Performance Tuning through Source Code Interdependence; 2002; Euro-Par 2002.*

DeRose; The Hardware Performance Monitor Toolkit; 2001.*

U.S. Appl. No. 12/454,633, Ferren et al.

Austin, Todd; "DIVA: A Reliable substrate for Deep Submicron Microarchitecture Design"; Advanced Computer Architecture Lab; pp. 1-12; University of Michigan; located at http://huron.cs.ucdavis.edu/Micro32/presentations/p_austin.pdf; printed Feb. 6, 2006.

Austin, Todd; "DIVA: A Reliable substrate for Deep Submicron Microarchitecture Design"; ACM Portal; Bearing dates of 1999 and 2006; pp. 1-6; Association for Computing Machinery; located at http://portal.acm.org/citation.cfm?id=320111; printed on Feb. 6, 2006.

Chang, Po-Yung et al.; "Branch Classification: a New Mechanism for Improving Branch Prediction Performance"; International Journal of Parallel Programming; 1994; pp. 22-31; Ann Arbor, USA.

Chatterjee, Saugata; Weaver, Chris; Austin, Todd; "Efficient Checker Processor Design"; pp. 1-11; University of Michigan; located at http://www.eecs.umich.edu/~taustin/papers/MICRO33-divadesign.pdf; printed on Feb. 6, 2006.

"Cisco 12000 Single Event Upset Failures Overview and Work Around Summary"; Cisco Systems; Bearing dates of Aug. 15, 2003, Dec. 13, 2004, and 1992-2005; pp. 1-2; printed on Feb. 17, 2006; located at http://www.cisco.com/en/US/products/hw/routers/ps167/products_field_notice09186a00801b3df8.shtml.

"Core Plane Voltage"; The PC Guide; bearing dates of Apr. 17, 2001 and 1997-2004; pp. 1; located at http://www.pcguide.com/ref/mbsys/bios/set/cpuCore-c.html; printed on Mar. 1, 2006.

"Cosmic ray"; Wikipedia, the free encyclopedia; Bearing a date of Feb. 9, 2006; pp. 1-3; printed on Feb. 17, 2006; pp. 1-3; located at http://en.wikipedia.org/wiki/Cosmic_ray.

"CPU Power Plane"; The PC Guide; bearing dates of Apr. 17, 2001 and 1997-2004; pp. 1; located at http://www.pcguide.com/ref/mbsys/bios/set/cpuPower-c.html; printed on Mar. 1, 2006.

Ernst, Dan; Kim, Nam Sung; Das, Shidhartha; Pant, Sanjay; Pham, Toan; Rao, Rajeev; Ziesler, Conrad; Blaauw, David; Austin, Todd; Mudge, Trevor; Flautner, Krisztian; "Razor: A Low-Power Pipeline Based on Circuit-Level Timing Speculation"; Abstract; Bearing a date of Jun. 6, 2006; pp. 1-23; located at http://www.gigascale.org/pubs/426/razor.submit.authors.pdf; printed on Jul. 7, 2006.

Georgi, Shirley; "The 41$^{st}$ Power Sources Conference a Challenge to Create Portable Power Sources for a Victorious Military"; pp. 1-4; located at http://www.batteriesdigest.com/power_sources_military.htm; printed on Mar. 15, 2006.

Moore, Charles W.; "The PowerBook Mystique Laptop Batteries, and Why the Portable Power Source Future May Be Something Other (Plus Mailbag)"; PowerBookCentral.com; bearing dates of 1996-2006; pp. 1-10; Macmarkets; located at http://powerbookcentral.com/columns/hildreth_moore/batt.shtml; printed on Mar. 15, 2006.

"Performance and Tuning: Basics"; Sybase; Adaptive Server Enterprise; Bearing dates of Aug. 2003, and 1989-2003; pp. 40-43 (6 pages total); 12.5.1; printed on Mar. 22, 2006.

"Semantics of the TASK_REGION Construct"; bearing a date of Feb. 10, 2006; printed on Mar. 22, 2006; p. 1; Google.com; located at http://72.14.203.104/search?q=cache:mpmaTDSemccJ:dacnet.rice.edu/Depts/versions/.

Uht, Augustus K.; "TEAtime: Timing Error Avoidance for Performance Enhancement and Environment Adaptation"; URI Road Show, Spring 2003; pp. 1-22; located at www.ele.uri.edu/~uht/talks/TEAtimeroadshow2003.Dist.pdf; printed on Feb. 3, 2006.

Uht, Augustus K.; "Uniprocessor Performance Enhancement Through Adaptive Clock Frequency Control"; SSGRR 2003w Conference; pp. 1-10; located at http://www.ele.uri.edu/~uht/papers/SSGRR2003wFnlUht.pdf; printed on Feb. 6, 2006.

Uht, Augustus; Vaccaro, Rick; "TEAPC: Adaptive Computing and Underclocking in a Real PC"; MuRI Technical Report No. 20041027-1; Oct. 27, 2004; pp. 1-13; located at http://www.ele.uri.edu/~uht/papersiMuRI-TR-20041027.pdf; printed on Feb. 6, 2006.

Uht, Gus; Vaccaro, Rick; "Adaptive Computing ( . . . via Timing Error Avoidance)"; bearing dates of Jan. 21, 2005 and May 2003; pp. 1-24; located at http://www.lems.brown.edu/~iris/BARC2005/Webpage/BARCpresentations/uht.pdf; printed on Feb. 6, 2006.

Bala, Vasanth; Duesterwald, Evelyn; Banerjia, Sanjeev; "Dynamo: A Transparent Dynamic Optimization System"; Hewlett-Packard Labs; Bearing a date of 2000, printed on Nov. 10, 2005; pp. 1-12; ACM; Vancouver, Canada.

"Bayes' theorem"; Facts, Info and Encyclopedia article; pp. 1-6; located at: http://absoluteastronomy.com/encyclopedia/b/ba/bayes_theorem1.htm; printed on Aug. 27, 2005.

"Bayes' theorem"; Wikipedia, the free encyclopedia; pp. 1-6; located at: http://en.wikipedia.org/wiki/Bayes_theorem; printed on Aug. 27, 2005.

"Bayesian inference"; Wikipedia, the free encyclopedia; pp. 1-9; located at: http://en.wikipedia.org/wiki/Bayesian_inference#Evidence_and_the_scientific_method; printed on Aug. 27, 2005.

"Bayesian logic"; a Whatis.com definition; p. 1; located at: http://whatis.techtarget.com/definition/0,,sid9_gci548993,00.html; printed on Aug. 19, 2005.

"Bayesian probability"; Wikipedia, the free encyclopedia; pp. 1-4; located at: http://en.wikipedia.org/wiki/Bayesianism; printed on Aug. 27, 2005.

Calder, Brad; Grunwald, Dirk; Lindsay, Donald; Martin, James; Mozer, Michael; Zorn, Benjamin; "Corpus-based Static Branch Prediction"; pp. 1-14; located at: http://www.cse.ucsd.edu/~calder/papers/PLD1-95-ESP.pdf.

Conte, Thomas M.; Sathaye, Sumedh W.; Banerjia, Sanjeev; "A Persistent Rescheduled-Page Cache for Low Overhead Object Code Compatibility in VLIW Architectures"; Bearing a date of 1996, printed on Nov. 10, 2005; pp. 4-13; IEEE.

Dehnert, James C.; Grant, Brian K.; Banning, John P.; Johnson, Richard; Kistler, Thomas; Klaiber, Alexander; Mattson, Jim; "The Transmeta Code Morphing™ Software: Using Speculation, Recovery, and Adaptive Retranslation to Address Real-Life Challenges"; Proceedings of the First Annual IEEE/ACM International Symposium on Code Generation and Optimization, Mar. 27-29, 2003, San Francisco, California; Bearing a date of 2003, printed on Nov. 10, 2005; pp. 1-10; IEEE.

"Exception Handling"; Wikipedia The Free Encyclopedia; Bearing a date of Nov. 2, 2005, printed on Nov. 3, 2005; pp. 1-8; located at: http://en.wikipedia.org/wiki/Exception_handling.

Fisher, Joseph A.; "Walk-Time Techniques: Catalyst for Architectural Change"; Computer; Bearing dates of Sep. 1997 and 1997, printed on Nov. 10, 2005; pp. 40-42; IEEE.

Gomez, Faustino J.; Burger, Doug; Miikkulainen, Risto; "A Neuroevolution Method for Dynamic Resource Allocation on a Chip Multiprocessor"; bearing a date of 2001; pp. 1-6; printed on Aug. 25, 2005.

Harris, Tim; Marlow, Simon; Jones, Simon Peyton; Herlihy, Maurice; "Composable Memory Transactions"; PPoPP'05; Bearing dates of Jun. 15-17, 2005 and 2005, printed on Oct. 6, 2005; pp. 1-13; Chicago, Illinois; ACM.

Hazelwood, Kim; Smith, Michael D.; "Characterizing Inter-Execution and Inter-Application Optimization Persistence"; printed on Jan. 30, 2006; pp. 1-8; Harvard University; located at www.cs.virginia.edu/kim/docs/traces.pdf.

"Infrastructure for Profile Driven Optimizations"; GNU Project; Bearing dates of Aug. 29, 2001 and Jul. 11, 2005, printed on Nov. 9, 2005; pp. 1-4; Free Software Foundation, Inc.; located at http://gcc.gnu.org/news/profiledriven.html.

Kaeli, David; "Profile-guided Instruction and Data Memory Layout"; pp. 1-12; located at: http://www.ece.neu.edu/info/architecture/publications/Tufts.pdf; printed on Dec. 12, 2005.

Knies, Rob; "Concurrent Programming Enters Atomic Age"; Microsoft Research News and Highlights; Bearing a date of 2005, printed on Oct. 6, 2005; pp. 1-3; Microsoft Corporation; located at http://research.microsoft.com/displayArticle.aspx?id=1313.

Lount, Peter William; "Dynamic Runtime Type-Object-Class Inference"; Smalltalk.org™; Bearing dates of Nov. 23, 2005 and 2004, printed on Nov. 23, 2005; pp. 1-3; version 1, 20050914; located at http://www.smalltalk.org/articles/article_20050914_a2_Dynamic_Type-Object-Class_Inference.html.

Machanick, Philip; "Macintelligence: Instruction Basics"; MacOPINION; Bearing a date of Jul. 3, 2001, printed on Nov. 16, 2005; pp. 2-6; located at http://www.macopinion.com/columns/intelligence/01/07/03/.

McFarling, Scott; "Combining Branch Predictors"; WRL Technical Note TN-36; Jun. 1993; pp. 1-29; locatd at: http://www.hpl.hp.com/techreports/Compaq-DEC/WRL-TN-36.pdf; printed on Aug. 30, 2005.

"Performance Management Guide: Performance Overview of the Virtual Memory Manager (VMM)"; printed on Nov. 1, 2005; pp. 1-11; located at http://publibn.boulder.ibm.com/doc_link/en_US/a_doc_lib/aixbman/prftungd/2365c22.htm.

"Profile-Based Optimization: HP C Programmer's Guide"; HP 3000 Manuals; printed on Nov. 9, 2005; pp. 1-4; located at http://docs.hp.com/cgi-bin/doc3k/B9243490008.13256/29.

Sato, Toshinori; "Data Dependence Speculation Using Data Address Prediction and its Enhancement with Instruction Reissue"; $24^{th}$ EUROMICRO Conference; Bearing a date of 1998; pp. 1-2 (pp. 10285); vol. 1; IEEE, Inc.; located at: http://csdl2.computer.org/persagen/DLAbsTocjsp?resourcePath=/dl/proceedings/&toc=comp/proceedings/euromicro/1998/8646/01/8646tox.xml&DOI=10.1109/EURMIC.1998.711812; printed on Dec. 8, 2005.

Sites, Richard L.; Chernoff, Anton; Kirk, Matthew B.; Marks, Maurice P.; Robinson, Scott G.; "Binary Translation"; Communications of the ACM; Bearing a date of Feb. 1993, printed on Nov. 10, 2005; pp. 69-81; vol. 36, No. 2; ACM.

"Speculative Execution"; Wikipedia The Free Encyclopedia; Bearing a date of Aug. 3, 2005, printed on Oct. 7, 2005; pp. 1-1; located at http://en.wikipedia.org/wiki/Speculative_execution.

Storkey, Amos; Amos Storkey-Research-Belief Networks; "Tutorial: Introduction to Belief Networks"; 2000-2005; pp. 1-8; located at: http://ww.anc.ed.ac.uk/~amos/belief.html; printed on Aug. 27, 2005.

Wu, Youfeng; Larus, James R.; "Static Branch Frequency and Program Profile Analysis," pp. 1-11; Bearing dates of Nov. 1994 and 1994; located at: http://citeseer.ist.psu.edu/cache/papers/cs/1353/ftp:zSzzSzftp.cs.wisc.eduzSztech-reportszSzreportszSz94zSztr1248.pdf/wu94static.pdf; printed on Aug. 25, 2005.

Yacktman, Don; "Freeze Dried Objects"; Stepwise.com; Bearing dates of Jun. 27, 2005 and 1994-2000; pp. 1-2; located at: http://www.stepwise.com/Articles/Technical/FreezeDriedObjects.html; printed on Dec. 15, 2005.

Zhang, Lixin; McKee, Sally A.; Hsieh, Wilson C.; Carter, John B.; "Pointer-Based Prefetching within the Impulse Adaptable Memory Controller: Initial Results"; pp. 1-11; located at: http://www.cs.utah.edu/impulse/papers/isca00ws.pdf; printed on Dec. 7, 2005.
U.S. Appl. No. 12/321,027, Ferren et al.
U.S. Appl. No. 12/319,696, Ferren et al.
Mano, M. Morris; "Computer System Architecture, Third Edition"; bearing a date of 1993; pp. 489-491; Prentice Hall, Inc., A Paramount Communications Company; Englewood Cliffs, New Jersey.
PCT International Search Report; International App. No. PCT/US07/02298; Jan. 16, 2009; pp. 1-3.
PCT International Search Report; International App. No. PCT/US2007/001905; Jan. 16, 2009; pp. 1-2.
U.S. Appl. No. 11/541,473, Ferren et al.
U.S. Appl. No. 11/541,450, Ferren et al.
U.S. Appl. No. 11/540,910, Ferren et al.
U.S. Appl. No. 11/526,190, Ferren et al.
U.S. Appl. No. 11/526,145, Ferren et al.
U.S. Appl. No. 11/392,992, Mangione-Smith, William Henry.
U.S. Appl. No. 11/384,237, Mangione-Smith, William Henry.
U.S. Appl. No. 11/384,236, Mangione-Smith, William Henry.
U.S. Appl. No. 11/364,573, Ferren et al.
U.S. Appl. No. 11/364,131, Ferren et al.
U.S. Appl. No. 11/364,130, Ferren et al.
U.S. Appl. No. 11/343,927, Ferren et al.
Evers, Marius; Chang, Po-Yung; Patt, Yale N.; "Using Hybrid Branch Predictors to Improve Branch Prediction Accuracy in the Presence of Context Switches"; 1996; pp. 3-11; Proceedings of the $23^{rd}$ annual international symposium on computer architecture; ACM Press.
Razdan et al.; "A High-Performance Microarchitecture with Hardware-Programmable Functional Units"; Bearing a date of 1994; pp. 172-180; Association of Computing Machinery (ACM); San Jose, CA.
Berg et al.; "SIP: Performance Tuning through Source Code Interdependence"; Euro-Par 2002, LNCS 2400; bearing a date of 2002; pp. 177-186; © Springer-Verlag Berlin Heidelberg 2002.
Jacobsen, Erik; Rotenberg, Eric; Smith, J. E.; "Assigning Confidence to Conditional Branch Predictions"; Proceedings of the $29^{th}$ Annual International Symposium on Microarchitecture; pp. 1-12; bearing a date of Dec. 2-4, 1996, Paris, France; IEEE; USA.
Klauser, Artur; Paithankar, Abhijit; Grunwald, Dirk; "Selective Eager Execution on the PolyPath Architecture"; pp. 1-10; University of Colorado, Department of Computer Science, Boulder, Colorado; bearing a date of Jul. 1998; IEEE; ISCA.
Patel, Sanjay J., Lumetta, Steven S.; "rePlay: A Hardware Framework for Dynamic Optimization"; bearing a date of Jun. 2001; pp. 590-607; IEEE Transactions on Computers; vol. 50, No. 6; IEEE.
Gummaraju et al.; "Branch Prediction in Multi-Threaded Processors"; 2000; pp. 179-188; IEEE.
Suh et al.; "Dynamic Partitioning of Shared Cache Memory"; 2002; pp. 1-23; MIT.
Mitra et al.; "Robust System Design from Unreliable Components"; 2005 Penn State University; retrieved Sep. 17, 2007; pp. 1-252; located at http://www.cse.psu.edu/~yuanxie/isca05.pdf.
Albonesi, David H., "Dynamic IPC/Clock Rate Optimization", 1998, pp. 282-292, $25^{th}$ International Symposium on Computer Architecture, IEEE Computer Society.
Balasubramonian, Rajeev; Albonesi, David; Buyuktosunoglu, Alper; Dwarkadas, Sandhya, "Dynamic Memory Hierarchy Performance Optimization", 2000, pp. 1-11, IEEE.
Balasubramonian, Rajeev; Albonesi, David; Buyuktosunoglu, Alper; Dwarkadas, Sandhya, "Memory Hierarchy Reconfiguration for Energy and Performance in General-Purpose Processor Architectures", 2000, pp. 1-13, IEEE.
Juan, Toni; Sanjeevan, Sanji; Navarro, Juan J., "Dynamic History-Length Fitting: A Third Level of Adaptivity for Branch Prediction", bearing a date of 1998, pp. 155-166, IEEE.

Veidenbaum, Alexander V.; Tang, Weiyu; Gupta, Rajesh; Nicolau, Alexandru; Ji, Xiaomei, "Adapting Cache Line Size to Application Behavior", 1999, pp. 145-154, $13^{th}$ International Conference on Supercomputing, ACM Press.
Kundu, Partha, et al.; "A Case for Shared Instruction Cache on Chip Multiprocessors running OLTP"; ACM SIGARCH Computer Architecture News; Jun. 2004; pp. 11-18; vol. 32, No. 3; ACM Press.
Rotenberg, Eric et al.; "Trace Cache: a Low Latency Approach to High Bandwidth Instruction Fetching"; International Symposium on Microarchitecture; 1996; pp. 24-34; IEEE.
Sodani, Avinash et al.; "Dynamic Instruction Reuse"; ISCA; Jun. 1997; pp. 1-12; ACM Press.
Nair et al.; "Exploiting Instruction Level Parallelism in Processors by Caching Scheduled Groups"; May 1997; pp. 13-25.
Shen et al.; "Modern Processor Design: Fundamentals of Superscalar Processors"; 2002; McGraw Hill; Beta Edition; p. 423 (3 pages included).
U.S. Appl. No. 12/657,285, Mangione-Smith, William Henry.
Akkary et al.; "Checkpoint Processing and Recovery: Towards Scalable Large Instruction Window Processors"; Proceedings of the $36^{th}$ International Symposium on Microarchitecture (MICRO-36 2003); bearing a date of 2003; pp. 1-12; © 2003 IEEE.
Berg et al.; "SIP: Performance Tuning Through Source Code Interdependence"; Euro-Par 2002; bearing a date of 2002; pp. 177-186; Springer-Verlag Berlin Heidelberg 2002.
Mehta et al.; "Data placement in shared-nothing parallel database systems"; The VLDB Journal (1997); bearing a date of 1997; pp. 53-72; vol. 6; © Springer-Verlag.
Pflanz, M.; "Fast Processor Recover Techniques with Micro Rollback"; On-line Error Detection and Fast Recover Techniques; bearing a date of 2002; pp. 65-80; © Springer-Verlag Berlin Heidelberg 2002.
Pflanz et al.; "Online Check and Recovery Techniques for Dependable Embedded Processors"; IEEE; bearing a date of 2001; pp. 24-40; © 2001 IEEE.
U.S. Appl. No. 12/806,395, Bran Ferren et al.
Ernst et al.; "Razor: A Low-Power Pipeline Based on Circuit-Level Timing Speculation"; Proceedings of the $36^{th}$ International Symposium on Microarchitecutre (MICRO-36'03); 2003; pp. 1-12; IEEE Computer Society.
Balasubramonian, Rajeev, et al.; "Memory Hierarchy Reconfiguration for Energy and Performance in General-Purpose Processor Architectures"; IEEE; 2000; pp. 1-13; IEEE.
Juan, Toni, et al.; "Dynamic History-Length Fitting: A third level of adaptivity for branch prediction"; IEEE; 1998; pp. 1-12.
Patel, Sanjay J., et al.; "rePLay: A Hardware Framework for Dynamic Program Optimization"; CRHC Technical Report; Dec. 1999; pp. 1-26; #CRHC-99-16; The University of Illinois.
Uht, Gus, et al.; "Adaptive Computing ( . . . via Timing Error Avoidance)"; Jan. 21, 2005; pp. 1-24; A.K. Uht, R.J. Vaccaro; URI Microarchitecture Research Institute, University of Rhode Island; Kingston, RI.
Uht, Gus, et al.; "TEAPC; Adaptive Computing and Underclocking in a Real PC"; MuRI Technical Report No. 20041027-1; Oct. 27, 2004; pp. 1-13; A.K. Uht, R.J. Vaccaro; URI Microarchitecture Research Institute, University of Rhode Island; Kingston, RI.
Uht, Augustus K.; "Uniprocessor Performance Enhancement through Adaptive Clock Frequency Control"; IEEE Transactions on Computers; Feb. 2005; pp. 132-140; vol. 54; No. 2; IEEE Computer Society.
Mano, M. Morris; "Computer System Architecture"; bearing a date of 1993; pp. 489-491 (4 pages, including cover page); Third Edition; Prentice Hall, Inc., A Paramount Communications Company; Englewood Cliffs, New Jersey.
Hodgdon, David; "Efficient, Compiler-Aided Dynamic Optimization"; bearing a date of Nov. 2, 2004; pp. 1-10.

* cited by examiner

410 First circuit for collecting data corresponding to a runtime execution of at least one instruction of an instruction set from a communications link that is transparent to software executing on the processor and exposed to a processor having a processor instruction set that includes the instruction set.

420 Second circuit for creating an execution-optimization information utilizing the collected data corresponding to the execution of at least one instruction of the instruction set and which is usable in another execution of the at least one instruction of an instruction set.

FIG. 40

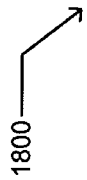

1800

1802 A computer-readable medium encoded with the execution-based optimization profile.

1804 An execution-based optimization profile usable during an execution of a computer program by a first processor and derived by a hardware device utilizing data generated during a runtime execution of the computer program by a second processor.

1806 An execution-based optimization profile usable during an execution of a computer program by a first processor and derived by a hardware device utilizing data generated during a runtime execution of the computer program by a second processor and transparent to software executing on the second processor.

1810 The computer-readable medium includes a computer storage medium.

1812 The computer-readable medium includes a transportable computer storage medium.

1814 The computer-readable medium includes a portable computer storage medium.

1820 The computer-readable medium includes a computer-readable communication medium.

FIG. 54

2910 Means for determining an execution characteristic of a first instruction associated with a first computing machine architecture.

2920 Means for creating an optimization profile useable in an execution of a second instruction associated with a second computing machine architecture.

3002 A computer-readable medium encoded with the optimization profile.

3004 An optimization profile usable during an execution of a second instruction associated with a second computing machine architecture and determined in response to an execution characteristic of a first instruction associated with a first computing machine architecture.

3010 The computer-readable medium includes a computer storage medium.

3012 The computer storage medium includes a transportable computer storage medium.

3014 The computer storage medium includes a portable computer storage medium.

3020 The computer-readable medium includes a computer-readable communication medium.

CROSS-ARCHITECTURE OPTIMIZATION

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.

RELATED APPLICATIONS

For purposes of the USPTO extra-statutory requirements, the present application constitutes a continuation-in-part of United States Patent application entitled PROCESSOR RESOURCE MANAGEMENT, naming Bran Ferren; W. Daniel Hillis; Nathan P. Myhrvold; Clarence T. Tegreene; and Lowell L. Wood, Jr. as inventors, U.S. application Ser. No. 11/214,449, filed Aug. 29, 2005 now U.S. Pat. No. 7,539,852.

For purposes of the USPTO extra-statutory requirements, the present application constitutes a continuation-in-part of United States Patent application entitled MULTIPROCESSOR RESOURCE OPTIMIZATION, naming Bran Ferren; W. Daniel Hillis; Nathan P. Myhrvold; Clarence T. Tegreene; and Lowell L. Wood, Jr. as inventors, U.S. application Ser. No. 11/214,458, filed Aug. 29, 2005.

For purposes of the USPTO extra-statutory requirements, the present application constitutes a continuation-in-part of United States Patent application entitled PREDICTIVE PROCESSOR RESOURCE MANAGEMENT, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/214,459, filed Aug. 29, 2005.

For purposes of the USPTO extra-statutory requirements, the present application constitutes a continuation-in-part of United States Patent application entitled RUNTIME-BASED OPTIMIZATION PROFILE, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/292,207, filed Nov. 30, 2005.

For purposes of the USPTO extra-statutory requirements, the present application constitutes a continuation-in-part of United States Patent application entitled ALTERATION OF EXECUTION OF A PROGRAM IN RESPONSE TO AN EXECUTION-OPTIMIZATION INFORMATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/292,296, filed Nov. 30, 2005.

For purposes of the USPTO extra-statutory requirements, the present application constitutes a continuation-in-part of United States Patent application entitled FETCH REROUTING IN RESPONSE TO AN EXECUTION-BASED OPTIMIZATION PROFILE, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/291,503, filed Nov. 30, 2005.

For purposes of the USPTO extra-statutory requirements, the present application constitutes a continuation-in-part of United States Patent application entitled HARDWARE-GENERATED AND HISTORICALLY-BASED EXECUTION OPTIMIZATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/292,323, filed Nov. 30, 2005.

For purposes of the USPTO extra-statutory requirements, the present application constitutes a continuation-in-part of United States Patent application entitled FREEZE-DRIED GHOST PAGES, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/324,174, filed Dec. 30, 2005.

For purposes of the USPTO extra-statutory requirements, the present application constitutes a continuation-in-part of United States Patent application entitled CROSS-ARCHITECTURE EXECUTION OPTIMIZATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/343,927, filed Jan. 31, 2006.

The United States Patent Office (USPTO) has published a notice to the effect that the USPTO's computer programs require that patent applicants reference both a serial number and indicate whether an application is a continuation or continuation in part. Stephen G. Kunin, *Benefit of Prior-Filed Application*, USPTO Electronic Official Gazette, Mar. 18, 2003 at http://www.uspto.gov/web/offices/com/sol/og/2003/week11/patbene.htm. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

SUMMARY

An embodiment provides a device. The device includes an input circuit for receiving data corresponding to a runtime execution of a first instruction by a first processor having a first architecture. The device also includes a generator circuit for creating an execution-based optimization profile useable in an execution of a second instruction by a second processor having a second architecture. The device may include an information store configured by the execution-based optimization profile. The device may further include an output circuit for broadcasting the execution-based optimization profile. In addition to the foregoing, other device embodiments described in the claims, drawings, and text form a part of the present application.

Another embodiment provides a device. The device includes means for receiving data transparent to software executing on a first processor having a first architecture and corresponding to a runtime execution of a first instruction by the first processor. The device also includes means for creating an execution-based optimization profile useable in an execution of a second instruction by a second processor having a second architecture. The device may include means for configuring an information store in response to the execution-based optimization profile. In addition to the foregoing, other device embodiments are described in the claims, drawings, and text form a part of the present application.

A further embodiment provides an apparatus. The apparatus includes an input module operable to receive data transparent to software executing on a first processor having a first instruction set architecture and corresponding to a runtime execution of a first instruction by the first processor. The apparatus also includes a generator module operable to create an execution optimization information useable in an execution of a second instruction by a second processor having a second instruction set architecture. The apparatus may include a broadcast module operable to encode a computer-readable signal-bearing medium with the execution optimization information. The apparatus may include a broadcast module operable to transmit a computer-readable signal-bearing medium encoded with the execution optimization information. In addition to the foregoing, other apparatus embodiments described in the claims, drawings, and text form a part of the present application.

An embodiment provides an apparatus. The apparatus includes a receiver module operable to acquire data transparent to software executing on a first processor having a first microarchitecture and corresponding to a runtime execution of a first instruction by the first processor. The apparatus also includes a generator module operable to create an execution optimization information useable in an execution of a second instruction by a second processor having a second microarchitecture. In addition to the foregoing, other apparatus embodiments described in the claims, drawings, and text form a part of the present application.

Another embodiment provides a method. The method includes receiving hardware-gathered data corresponding to a runtime execution of a first instruction by a first processor having a first architecture. The method also includes creating an execution optimization information useable in an execution of a second instruction by a second processor having a second architecture. The method may include saving the execution optimization information. The method may include marketing the execution optimization information. The method may include facilitating entry of the execution optimization information into a stream of commerce. The method may include encoding a computer-readable signal-bearing medium with the execution optimization information. In addition to the foregoing, other method embodiments described in the claims, drawings, and text form a part of the present application.

A further embodiment provides an apparatus. The apparatus includes an execution-based optimization profile usable during an execution of a computer program by a second processor having a second architecture. The execution-based optimization profile is derived by a hardware device utilizing data generated during a runtime execution of the computer program by a first processor having a first architecture. The apparatus also includes a computer-readable medium encoded with the execution-based optimization profile. In addition to the foregoing, other apparatus embodiments described in the claims, drawings, and text form a part of the present application.

An embodiment provides an apparatus. The apparatus includes a monitor circuit for determining an execution characteristic of a first instruction associated with a first computing machine architecture. The apparatus also includes a generator circuit for creating an optimization profile useable in an execution of a second instruction associated with a second computing machine architecture. In addition to the foregoing, other apparatus embodiments described in the claims, drawings, and text form a part of the present application.

Another embodiment provides a method. The method includes identifying an execution characteristic of a first instruction associated with a first computing machine architecture. The method also includes generating an optimization profile useable in an execution of a second instruction associated with a second computing machine architecture. In addition to the foregoing, other method embodiments described in the claims, drawings, and text form a part of the present application.

A further embodiment provides a device. The device includes means for determining an execution characteristic of a first instruction associated with a first computing machine architecture. The device also includes means for creating an optimization profile useable in an execution of a second instruction associated with a second computing machine architecture. In addition to the foregoing, other device embodiments described in the claims, drawings, and text form a part of the present application.

An embodiment provides an apparatus. The apparatus includes an optimization profile usable during an execution of a second instruction associated with a second computing machine architecture and determined in response to an execution characteristic of a first instruction associated with a first computing machine architecture. The apparatus also includes a computer-readable medium encoded with the optimization profile. In addition to the foregoing, other apparatus embodiments described in the claims, drawings, and text form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates a partial view of an exemplary device in which embodiments may be implemented;

FIG. 40 illustrates an exemplary apparatus in which embodiments may be implemented;

FIG. 54 illustrates a partial view of a device in which embodiments may be implemented; and FIG. 55 illustrates a partial view of an apparatus in which embodiments may be implemented.

DETAILED DESCRIPTION

Figure 1:
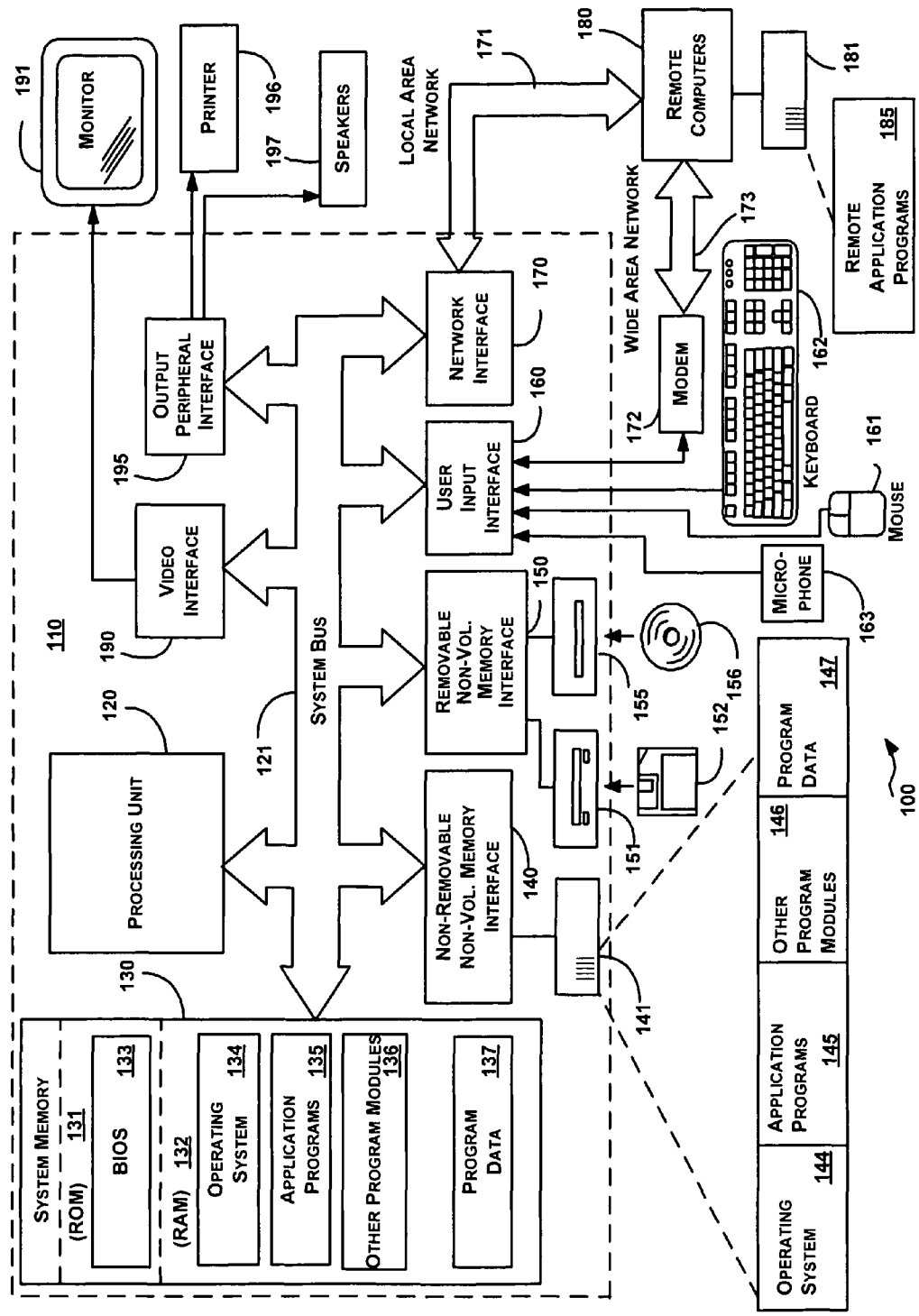
FIG. 1 illustrates a partial view of an exemplary device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an exemplary general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art. In an embodiment, an information store may include a computer storage media.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141, is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 10 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on computer storage medium 181. It will be appreciated that the network connections shown are exemplary and other means of establishing a communications link between the computers may be used.

FIG. 1 is intended to provide a brief, general description of an illustrative and/or suitable exemplary environment in which embodiments may be implemented. An exemplary system may include the computing system environment 100 of FIG. 1. FIG. 1 is an example of a suitable environment and is not intended to suggest any limitation as to the structure, scope of use, or functionality of an embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
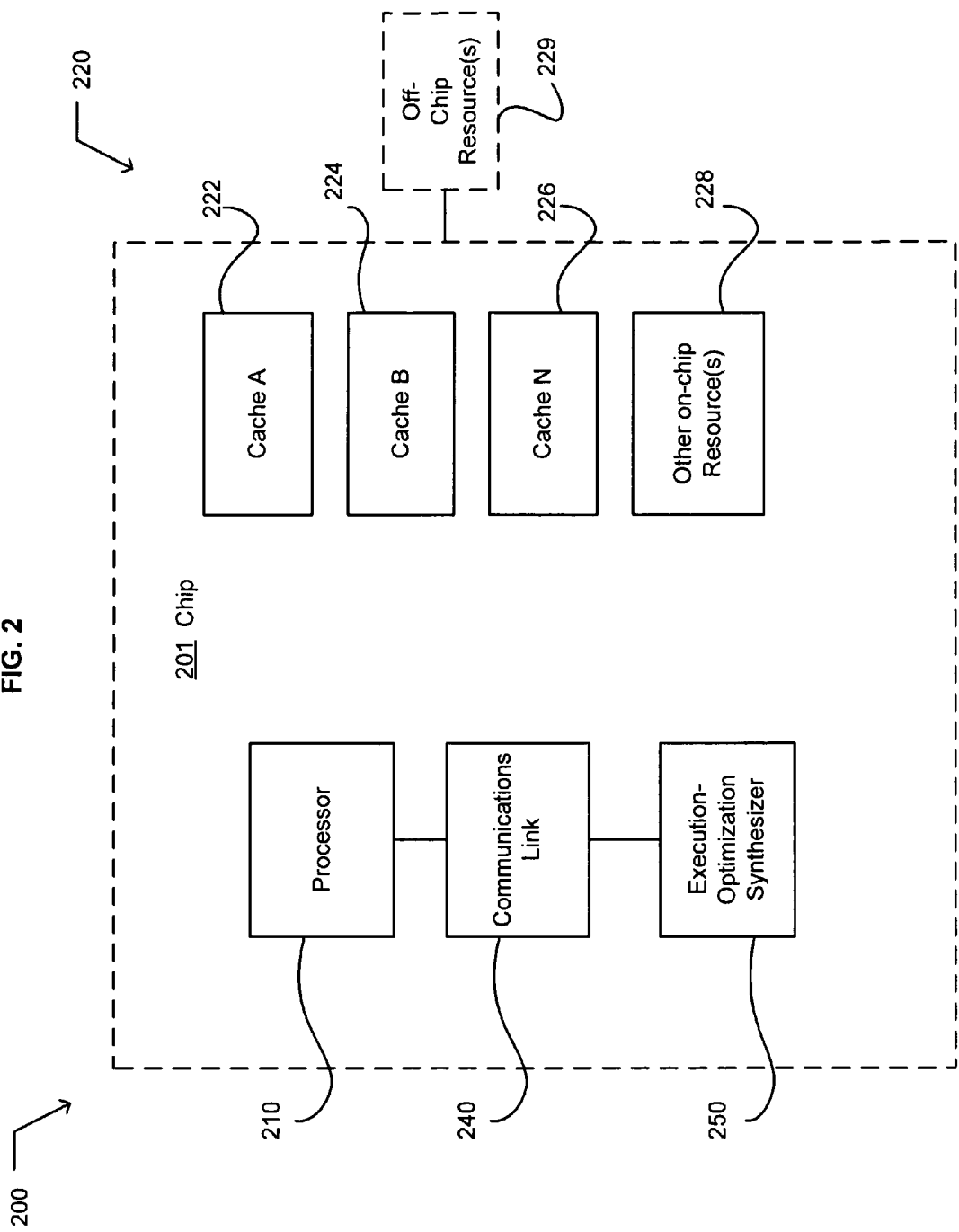
FIG. 2 illustrates a partial view of an exemplary device in which embodiments may be implemented.

FIG. 2 illustrates a partial view of an exemplary device 200 in which embodiments may be implemented. The device includes a processor 210, an execution-optimization synthesizer 250, and a communications link 240 exposed to the execution-optimization synthesizer and to the processor. The processor may include any processing unit, and may be described as a central processing unit that controls operation of a computer, such as for example, the processing unit 120 described in conjunction with FIG. 1. The device may also include a hardware resource 220 interconnected with the processor. The hardware resource may be any hardware resource associated and/or interconnected with the processor. In an embodiment, the hardware resource may include one or more caches, illustrated as a cache A (222), a cache B (224), and through a cache N (226). Also, the hardware resource may include a branch predictor (not shown). In another embodiment, the hardware resource 220 may include any other resource associated with the processor, illustrated as other on-chip resource 228. In a further embodiment, the hardware resource includes an off-chip resource, illustrated as an off-chip resource 229. For example, the cache A (222) may be an on-chip L1 cache and the off-chip resource 229 may be an off-chip cache, such as an off-chip L2 cache.

The processor 210 includes a processor operable to execute an instruction set. In an embodiment, the instruction set may include a collection of instructions that the processor can execute. In a further embodiment, the instruction set may include an instruction set architecture of the processor. In another embodiment, the instruction set may include a group of machine instructions and/or computer instructions that the processor can execute. In another embodiment, the instruction set may be interpreted by the processor. In further embodiment, the instruction set may include a high-level language, an assembly language, and/or a machine code that the processor can execute, with or without a compiling and/or a translation.

In an embodiment, an instruction may include a functional instruction, a branching instruction, a memory instruction, and/or other instruction that may be executed by a processor. In another embodiment, an instruction may include a statement or a portion of a statement in a program. In a further embodiment, an instruction may include at least two statements from a program. A program may include any type of a program, from several lines of instructions, to an application, and to an operating system. In an embodiment, an instruction may include a decoded instruction, a translated instruction, a portion of a translated instruction, and/or a micro-operation. In a further embodiment, an instruction may include an instruction block, a basic block, a functional block, and/or an instruction module.

The execution-optimization synthesizer 250 includes an execution-optimization synthesizer operable to collect data from the communications link that corresponds to an execution of at least one instruction of the instruction set. In an embodiment, the data may include certain data items, such as datum, byte, bit, and/or a block that are associated together. The execution-optimization synthesizer is also operable to generate an execution-optimization information utilizing the collected data from the communications link and corresponding to the execution of at least one instruction of the instruction set.

In an embodiment, the communications link 240 may include at least one of a signal-bearing medium, digital-signal-bearing medium, a light propagation medium, a light propagation medium, an optical fiber, a light guide, a computer readable storage medium, a hardware register, a bus, a memory local to the processor, an interconnection structure, and/or a digital-signal conductor. For example, a computer readable storage medium may include a memory and/or a memory system directly accessible by the processor and the execution-optimization synthesizer. By way of further example, a digital-signal conductor may include any digital signal conducting structure configured to at least transfer digital signals from the processor to the execution-optimization synthesizer. In another embodiment, the communications link includes a signal-bearing medium exposed only to an execution-optimization synthesizer and the processor. In a further embodiment, the communications link includes a signal-bearing medium exposed to an execution-optimization synthesizer and the processor, and transparent to software executing on the processor. In another embodiment, the communications link includes a signal-bearing medium exposed to an execution-optimization synthesizer, to the processor, and to software.

In an embodiment, the processor 210 and the communications link 240 reside on a single chip, illustrated as a single chip 201. In another embodiment, the processor and the execution-optimization synthesizer 250 reside on a single chip, also illustrated as the single chip 201. In a further embodiment, the processor, communications link, and the execution-optimization synthesizer are formed on a single chip, illustrated as the single chip 201.

In an embodiment, the execution-optimization synthesizer 250 includes a hardware implemented execution-optimization synthesizer. In another embodiment, the execution-optimization synthesizer includes a microengine implemented execution-optimization synthesizer.

In a further embodiment, the execution-optimization synthesizer 250 operable to collect data from the communications link that corresponds to an execution of at least one instruction of the instruction set includes an execution-optimization synthesizer operable to collect dynamic data from the communications link that corresponds to a runtime execution of at least one instruction of the instruction set. In an embodiment, the data collected by the execution-optimization synthesizer includes at least one of an interpreted instruction, a translated instruction, a decoded instruction, a micro-operation corresponding to at least a portion of an instruction, data correlating to the execution of the at least one instruction, a movement of data correlating to an execution of the at least one instruction of the instruction set, a result of an execution of an instruction, a branch outcome of an execution of an instruction, an exception correlating to an execution of an instruction, a store-to-load dependency correlating an execution of an instruction, a predicted value correlating to an execution of an instruction, and/or a relationship between at least two instructions of the instruction set.

In an embodiment, the execution-optimization synthesizer 250 operable to collect data from the communications link that corresponds to an execution of at least one instruction of the instruction set includes an execution-optimization synthesizer operable to collect at least one of data transparent to a user, data visible to a user, data transparent to software executing on the processor, data visible to software executing on the processor, and/or data exposed for user manipulation.

In another embodiment, the execution-optimization synthesizer 250 operable to generate an execution-optimization information utilizing the collected data includes an execution-optimization synthesizer operable to generate an optimization information that is at least one of responsive to the collected data, derived from the collected data, associated with the collected data, and/or using the collected data. In a further embodiment, the execution-optimization synthesizer operable to generate an execution-optimization information corresponding to the execution of at least one instruction of the instruction set includes an execution-optimization synthesizer operable to generate at least one of an execution-environment optimization information, a processor-environment optimization information, a data-environment optimization information, and/or a metadata reporting an execution environment. For example, an execution-environment optimization information may include an indication that an identified micro-op is used frequently and may be advantageously saved in a memory close to the processor 210. Another execution-environment optimization may include one or more versions of the at least one instruction of the instruction set that provides some expected benefit over the original at least one instruction of the instruction set. A memory management system serving the processor may cause one of the versions to be executed transparently instead of the original at least one instruction of the instruction set, such as through a translation lookaside buffer. By way of further example, metadata reporting an execution environment may include tracking information with respect to data objects. For example, certain access predictors may work well with certain data objects, or some objects do not appear to be co-resident in the cache, or may be highly co-resident, or certain pointers in object-orientated systems typically point to specific object types, or specific value predictors have worked well with some data in the past.

In other embodiments, the execution-optimization synthesizer 250 operable to generate an execution-optimization information utilizing the collected data may include an execution-optimization synthesizer operable to generate an execution-optimization information optimizing data handling, which may be by a data class. In some instances, a data class may include certain data items (datum, byte, bit, a block, a page) that are used once and never again. In other instances, a data class may include certain data items are used constantly but never written and/or infrequently written. In further data classes, certain data items may be constantly read and written to, or other data items may be often being written but never read. The execution-optimization synthesizer operable to generate an execution-optimization information may predict how a data class will likely be used in the future and/or saves the data items in a manner and/or a location that substantially optimizes utilization of the data items by an instruction group and/or storage of the data items by the computing device. Any suitable type of predictive algorithm providing meaningful results may be used, including a predictive algorithm based on a Bayesian method, and/or a learning algorithm. The prediction may be written to a ghost page associated with a piece of data. A prediction may be straight forward if it is known that the data piece will never be written or read. Each data item will expose what its peculiar flavor is. This may be implemented down to the size of a single cache line, or even below the cache line.

In further embodiments, the execution-optimization synthesizer 250 operable to generate an execution-optimization information utilizing the collected data may include a execution-optimization synthesizer operable to generate an execution-optimization information providing a storage mobility for data items that are associated together in a substantial disequilibrium based upon a shared fate, a shared nature, an entanglement to a page and/or line of similarly handled data. The data item may include one or more extra bits (tag) on end of a data item that may indicate its size, nature (written but never read, read but never written, read once in the life of the program, used by at least two threads). In a further embodiment, an indicator may say which code relates with to the data item. This may be used for doing storage assignment. For example, if the data item includes a semaphore that is used across multiple threads, that should be known and the data item managed accordingly. Most data is associated with a particular body of code and assigned to a storage unit together. By watching that, these assignments can be done together between the I-cache and the D-cache.

In an embodiment, the execution-optimization synthesizer 250 further includes an execution-optimization synthesizer operable to save the optimization information. The optimization information may be saved close to the processor 210, for example in an on-chip resource such as the cache A (222), or in the off-chip resource 229, such as a system memory or storage medium. In another embodiment, the execution-optimization synthesizer further includes an execution-optimization synthesizer operable to save the optimization information in an association with the at least one instruction of the instruction set.

In an embodiment, the device 200 includes a computing device, such as for example, the computing device 110 of the computing system environment 100 of FIG. 1. In a further embodiment, the computing device includes at least one of desktop computing device, a laptop-computing device, a portable computing device, and/or a supercomputing device.

Figure 3:
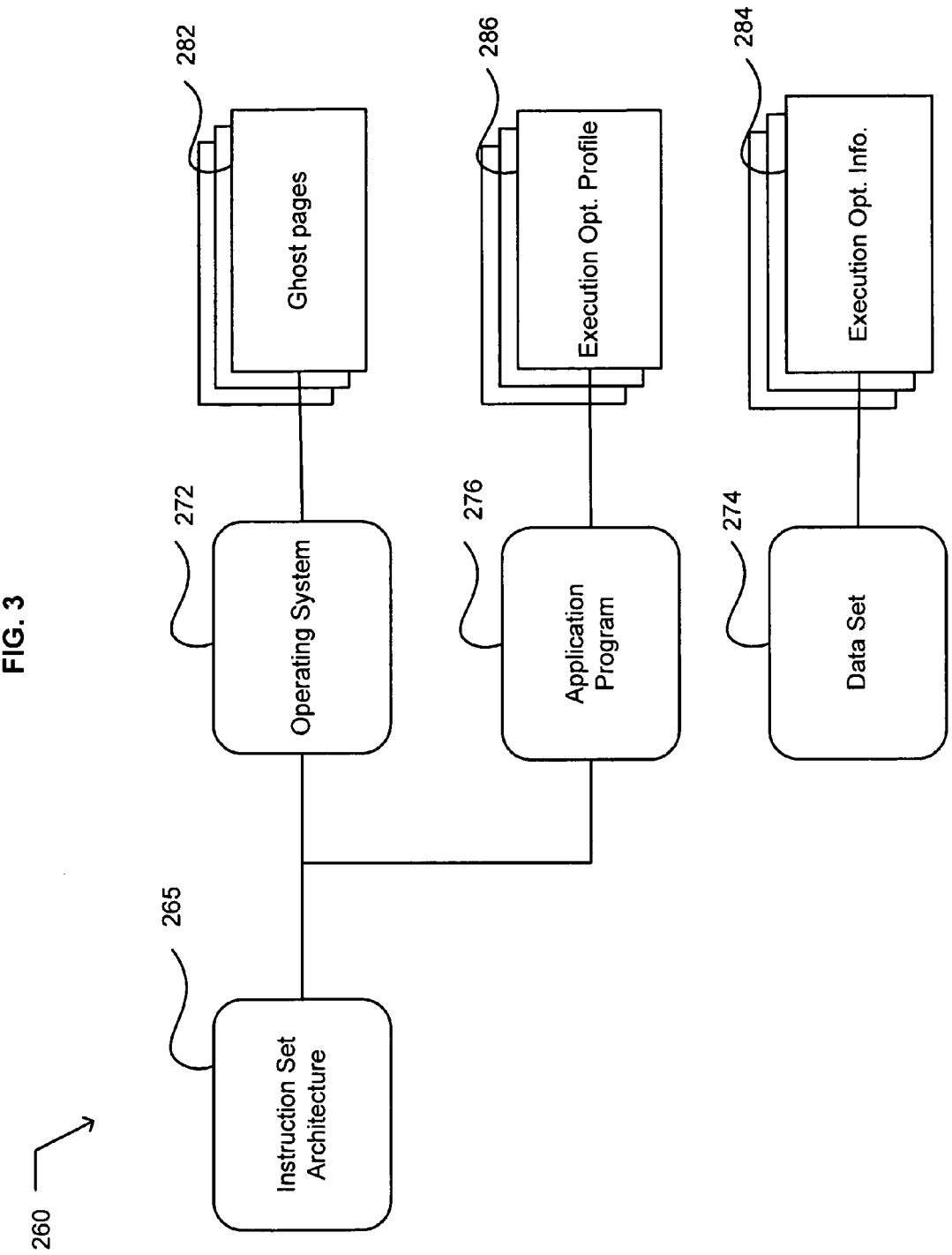
FIG. 3 partially illustrates an association between optimization information and a program and/or data.

FIG. 3 partially illustrates an association between optimization information and a program and/or data. An instruction set architecture is illustrated as an instruction set architecture 265, and related compiled programs are illustrated as an operating system 272 and an application program 276. The application program 276 may be a compiled application program or a compliable application program. Also illustrated is a data set 274.

The execution-optimization information generated by the execution-optimization synthesizer 250 may be associated with the at least one instruction of the instruction set of a program, an application, and/or a module that includes the at least one instruction. In the case of data, the execution-optimization information generated by the execution-optimization synthesizer may be associated with data received for processing by the execution, data produced by the execution, the at least one instruction of the instruction set that processed the data, and/or other related matter. FIG. 3 illustrates certain embodiments of an association of the execution-optimization information with the at least one instruction of the instruction set. The ghost pages 282 that include the execution-optimization information pertaining to the operating system 272 may be virtually and/or physically associated in an information storage with the operating system. The information storage may include a non-volatile memory structure. For example, the ghost pages may be saved in the same file as the operating system. When the operating system is loaded into system memory, the ghost pages may remain in the information storage, or may be, such as for example, also loaded into system memory, or loaded into an inboard memory. In another embodiment, an execution-optimization information 284 pertaining to a data set 274 is associated in a information storage with the data set. In a further embodiment, an execution-optimization profile 286 is associated in an information storage with an application 276.

In an embodiment, a ghost page of the ghost pages 282 containing the execution-optimization information may be associated with a selected page of a program or data whose content corresponds to the generation of the execution-optimization information, such as for example, a selected page containing the instruction of the operating system 272, a selected page containing the data of the data set 274, and/or a selected page containing the application program 276. By way of further example, data in a ghost page of the ghost pages 282 may indicate that a branch instruction on an identified line of an associated selected page of an application should not be taken. In another embodiment, a file containing the execution-optimization information 284 may be associated with a file containing the data set.

The illustrated embodiments of the ghost page 282, the execution-optimization information 284, and the execution-optimization profile 286 respectively associated with the operating system 272, the data 274, and the application 276 are intended only to be illustrative and are not limiting. In another embodiment for example, the ghost pages 282 may be associated with the application 276, or the data set 274.

Figure 4:
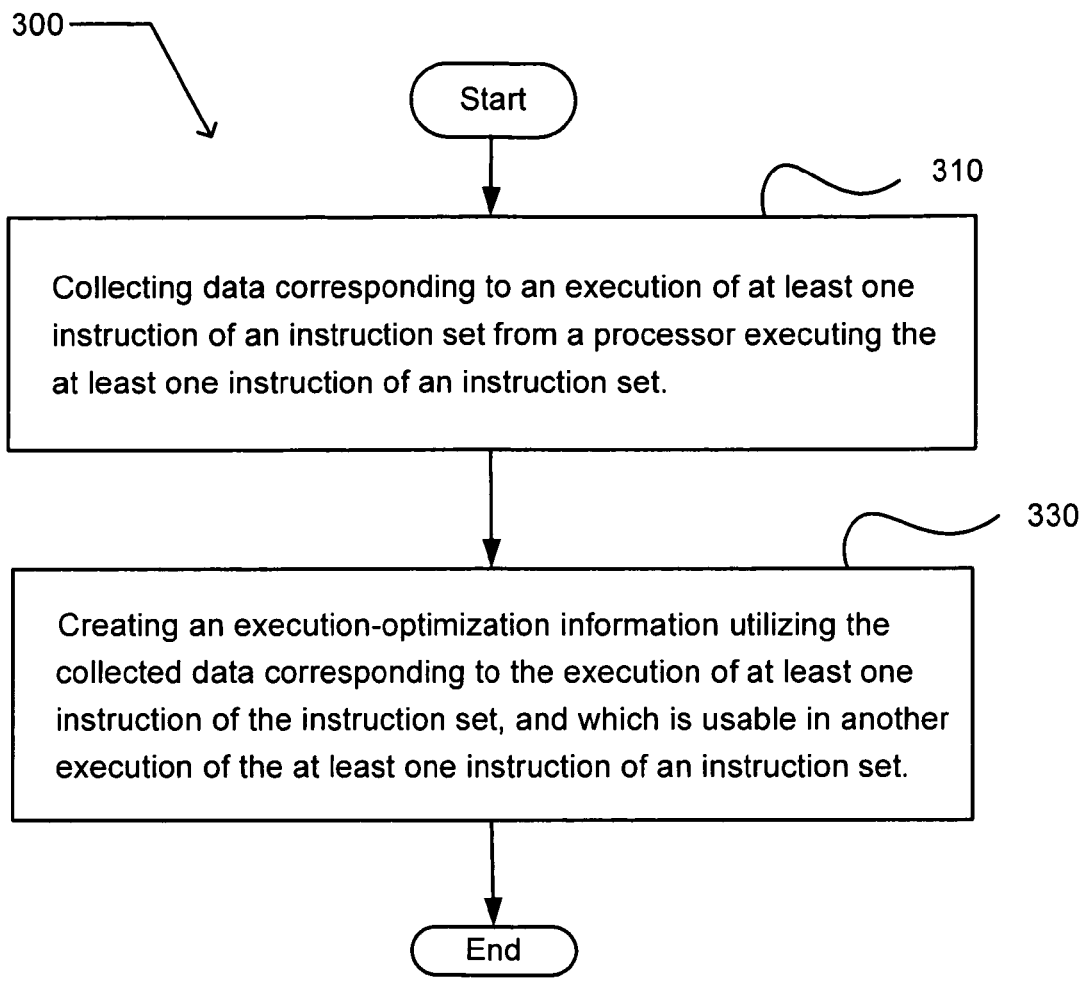
FIG. 4 illustrates an exemplary operational flow in which embodiments may be implemented.

FIG. 4 illustrates an exemplary operational flow 300 in which embodiments may be implemented. In an embodiment, the operational flow may be implemented in the computing system environment 100 of FIG. 1 and/or the device 200 of FIG. 2. After a start operation, the operational flow moves to an accumulation operation 310. The accumulation operation collects data corresponding to an execution of at least one instruction of an instruction set from a processor executing the at least one instruction of an instruction set. An enhancement operation 330 creates an execution-optimization information utilizing the collected data corresponding to the execution of at least one instruction of the instruction set and which is usable in another execution of the at least one instruction of an instruction set. The operational flow then moves to an end operation.

Figure 5:
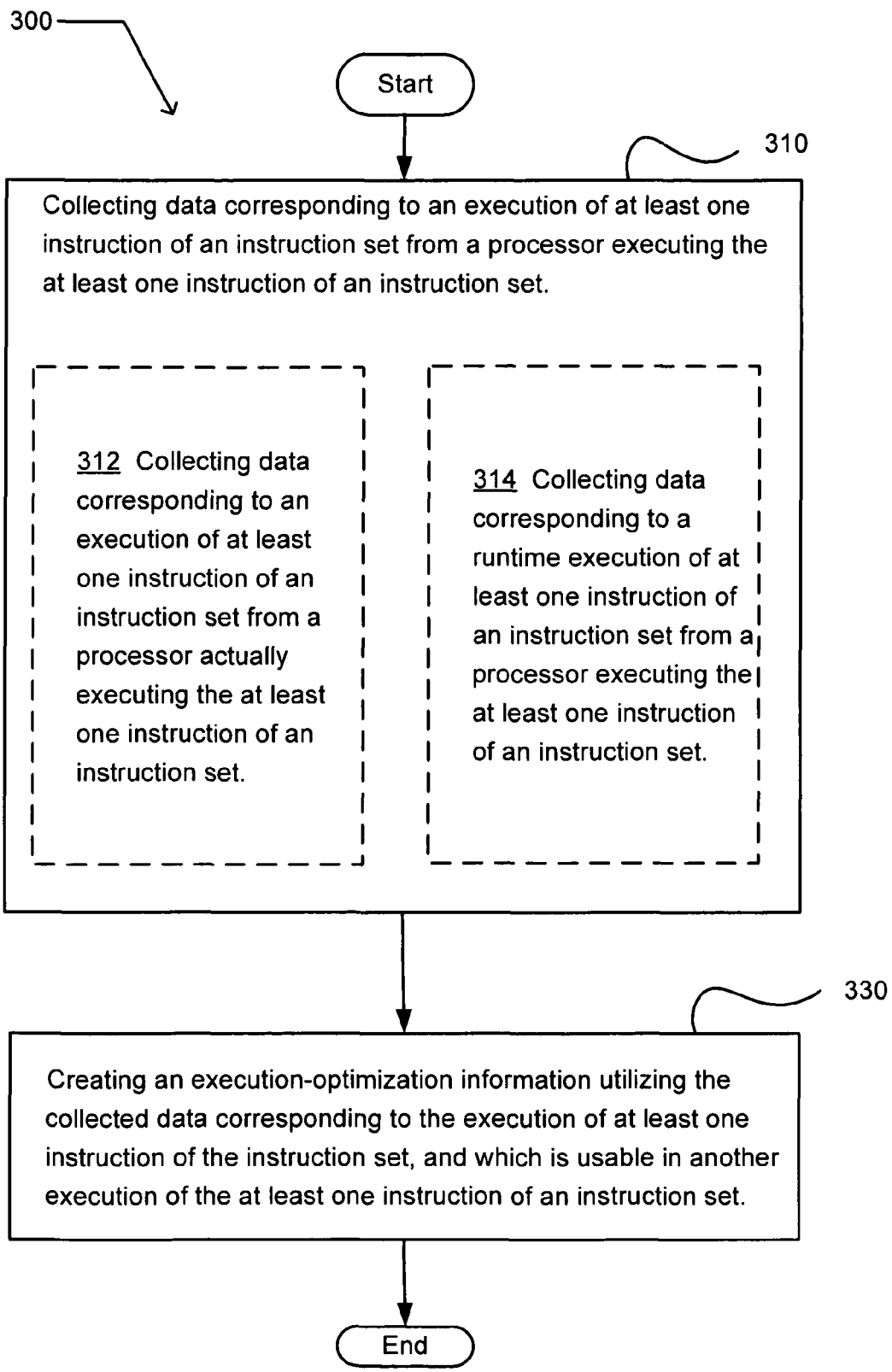
FIG. 5 illustrates an alternative embodiment of the exemplary operational flow of FIG. 4.

FIG. 5 illustrates an alternative embodiment of the exemplary operational flow 300 of FIG. 4. The accumulation operation 310 may include at least one additional operation. The at least one additional operation may include an operation 312 and/or an operation 314. The operation 312 collects data corresponding to an execution of at least one instruction of an instruction set from a processor actually executing the at least one instruction of an instruction set. The operation 314 collects data corresponding to a runtime execution of at least one instruction of an instruction set from a processor executing the at least one instruction of an instruction set.

Figure 6:
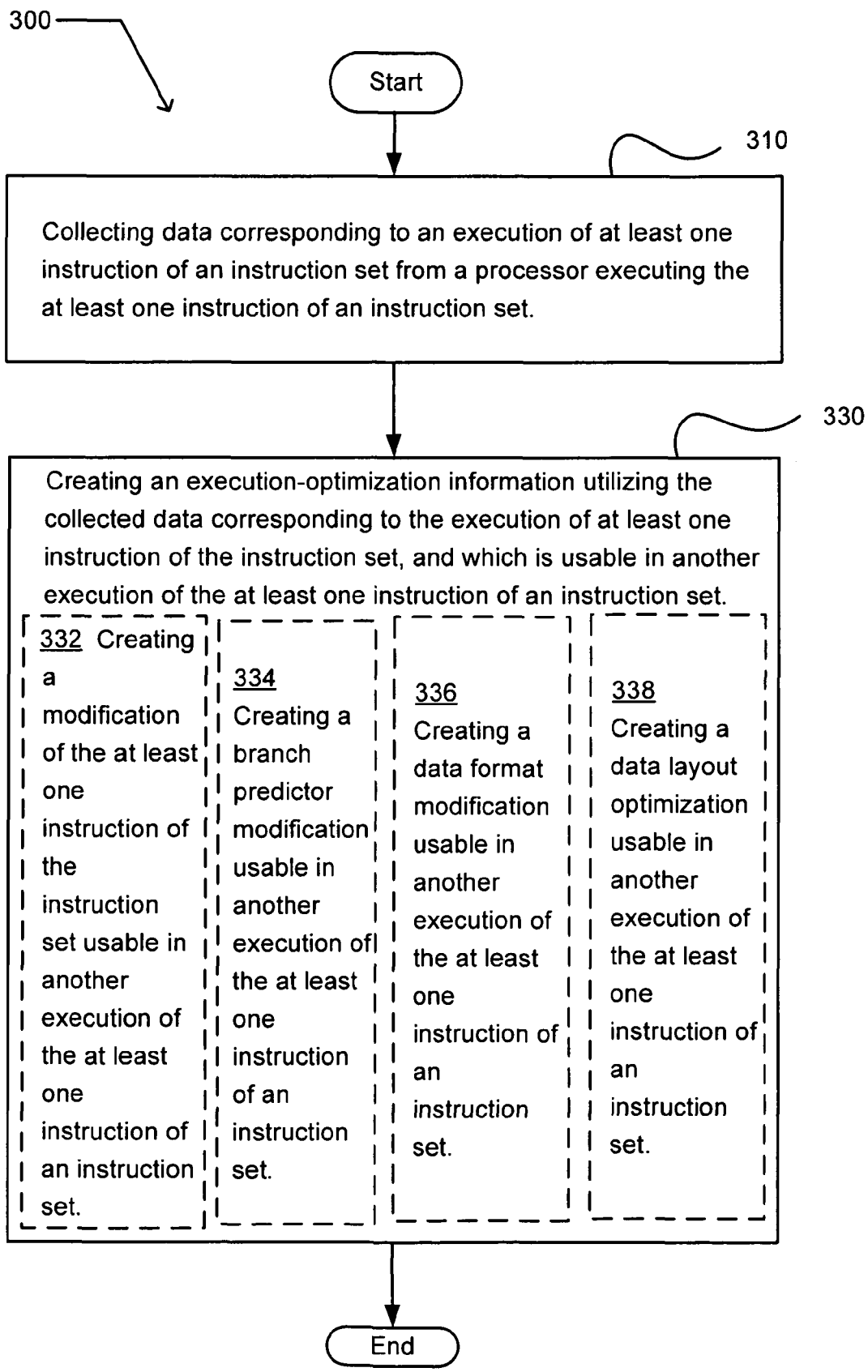
FIG. 6 illustrates another alternative embodiment of the exemplary operational flow of FIG. 4.

FIG. 6 illustrates another alternative embodiment of the exemplary operational flow 300 of FIG. 4. The enhancement operation 330 may include at least one additional operation. The at least one additional operation may include an operation 332, an operation 334, an operation 336, and/or an operation 338. The operation 332 creates a modification of the at least one instruction of the instruction set usable in another execution of the at least one instruction of an instruction set. For example, the creating a modification of the at least one instruction may include creating one or more versions of the instruction where each version may provide some expected benefit over the original version, or saving a decoded version of a frequently fetched at least one instruction to save a future decoding of the frequently fetched instruction. The operation 334 creates a branch predictor modification usable in another execution of the at least one instruction of an instruction set. The operation 336 creates a data format modification usable in another execution of the at least one instruction of an instruction set. The operation 338 creates a data layout optimization usable in another execution of the at least one instruction of an instruction set. For example, in an embodiment, a data layout optimization may include a repacking of data, a compaction of data, and/or a saving of data that may be useful in execution the at least one instruction.

FIG. 7 illustrates a partial view of an exemplary device 400 in which embodiments may be implemented. The device includes a first circuit 410 for collecting data corresponding to a runtime execution of at least one instruction of an instruction set from a communications link that is transparent to software executing on the processor and exposed to a processor having a processor instruction set that includes the instruction set. The device also includes a second circuit 420 for creating an execution-optimization information utilizing the collected data corresponding to the execution of at least one instruction of the instruction set and which is usable in another execution of the at least one instruction of an instruction set. In an embodiment, the second circuit for creating the execution-optimization information includes the first circuit for collecting data corresponding to an execution.

Figure 8:
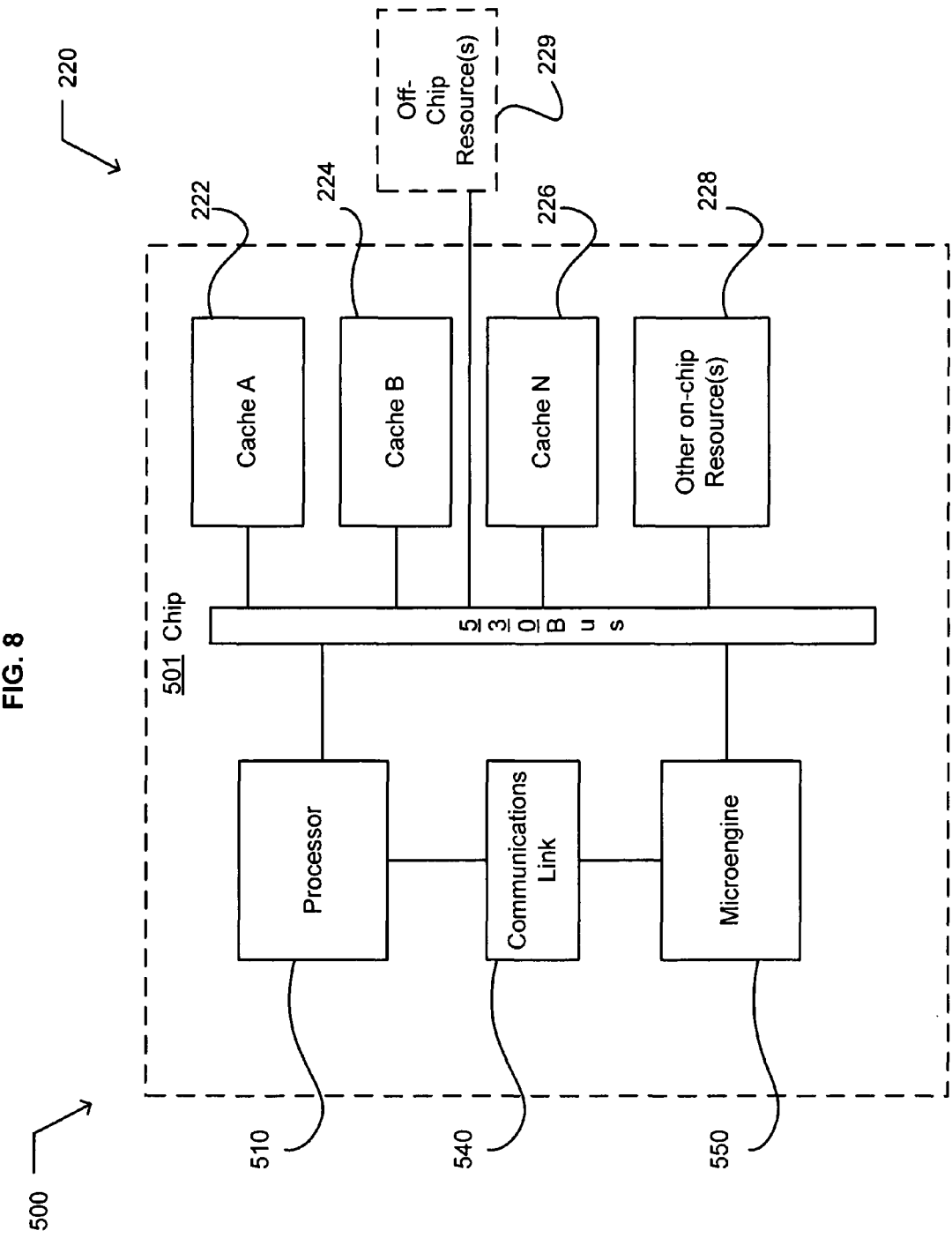
FIG. 8 illustrates a partial view of an exemplary device in which embodiments may be implemented.

FIG. 8 illustrates a partial view of an exemplary device 500 in which embodiments may be implemented. The device includes a microengine 550 operatively coupled with a processor 510 having an instruction set. The processor may include any processor, such as for example, the processing unit 120 described in conjunction with FIG. 1. The processor may be described as a central processing unit that controls operation of a computer. In an embodiment, the device may include an internal bus 530 providing a parallel data transfer path between the processor and the hardware resource 220.

The microengine 550 includes a microengine operable to gather data in a manner transparent to software executing on the processor 510 and corresponding to a runtime execution of at least a portion of the instruction set by the processor. The microengine is also operable to create a runtime-based optimization profile utilizing the gathered dynamic data and which is useable in a subsequent execution of the at least of a portion of the instruction set by the processor.

In an embodiment, the microengine 550 may include a microengine operable to gather at least one of dynamic data and/or static data in a manner transparent to software executing on the processor and corresponding to a runtime execution of at least a portion of the instruction set by the processor 510.

In another embodiment, the device 500 may further include the processor 510 having an instruction set. In a further embodiment, the processor and the microengine 550 are formed on a chip, illustrated as a single chip 501. In an embodiment, the device may further include a communications link 540 exposed to the microengine. In another embodiment, the device may include the communications link exposed to the microengine and transparent to software executing on the processor. In a further embodiment, the device may include the communications link operably coupled to the microengine and to the processor. In another embodiment, the communications link may include an interconnection structure.

Figure 9:
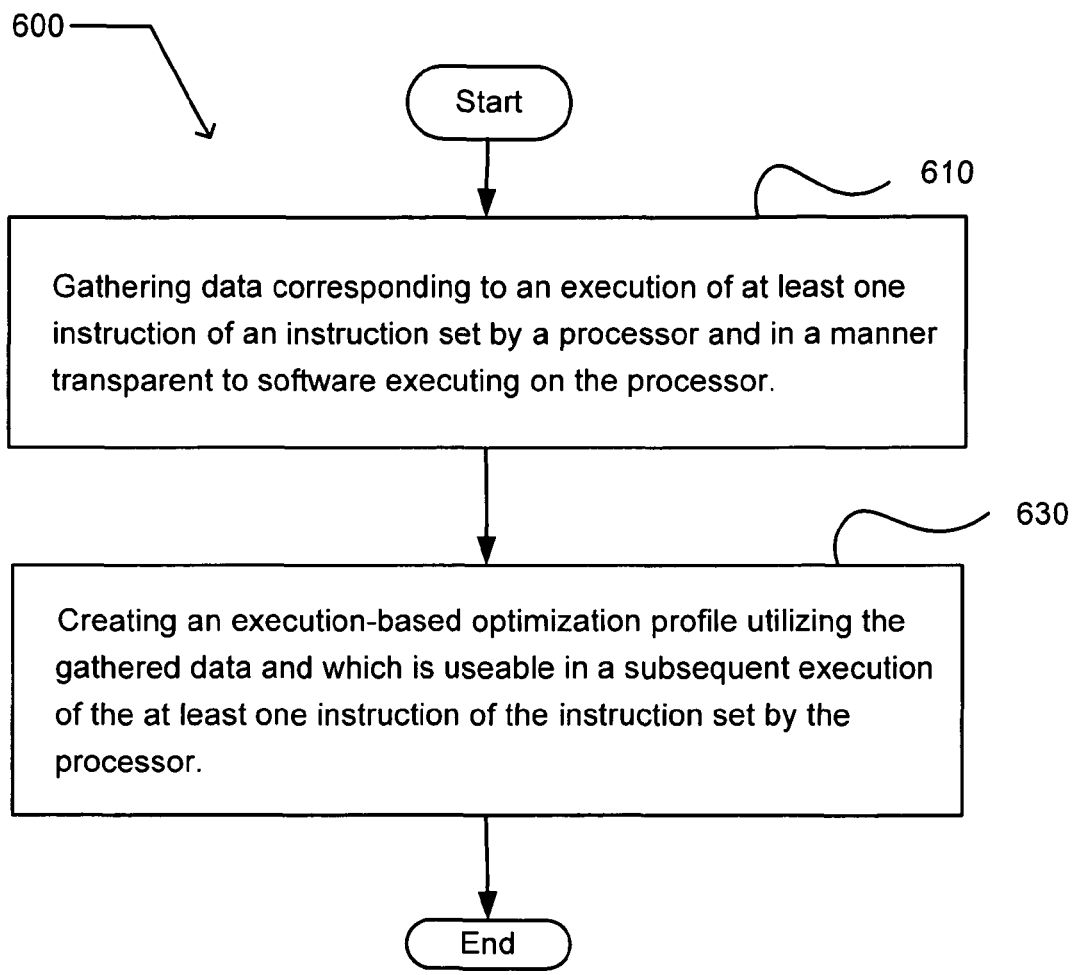
FIG. 9 illustrates an exemplary operational flow implemented in a hardware device and in which embodiments may be implemented.

FIG. 9 illustrates an exemplary operational flow 600 implemented in a hardware device and in which embodiments may be implemented. In an embodiment, the operational flow may be implemented in the computing system environment 100 of FIG. 1, and/or the device 500 of FIG. 8. After a start operation, the operational flow moves to a harvesting operation 610. The harvesting operation gathers data corresponding to an execution of at least one instruction of an instruction set by a processor and in a manner transparent to software executing on the processor. An improvement operation 630 creates an execution-based optimization profile utilizing the gathered data and which is useable in a subsequent execution of the at least one instruction of the instruction set by the processor. In an embodiment, the execution-based optimization profile may enhance a future execution of the at least one instruction by increasing an efficiency of the execution, reducing cache misses, reducing exceptions, reducing storage used, and/or reducing energy consumed. The operational flow then proceeds to an end operation.

Figure 10:
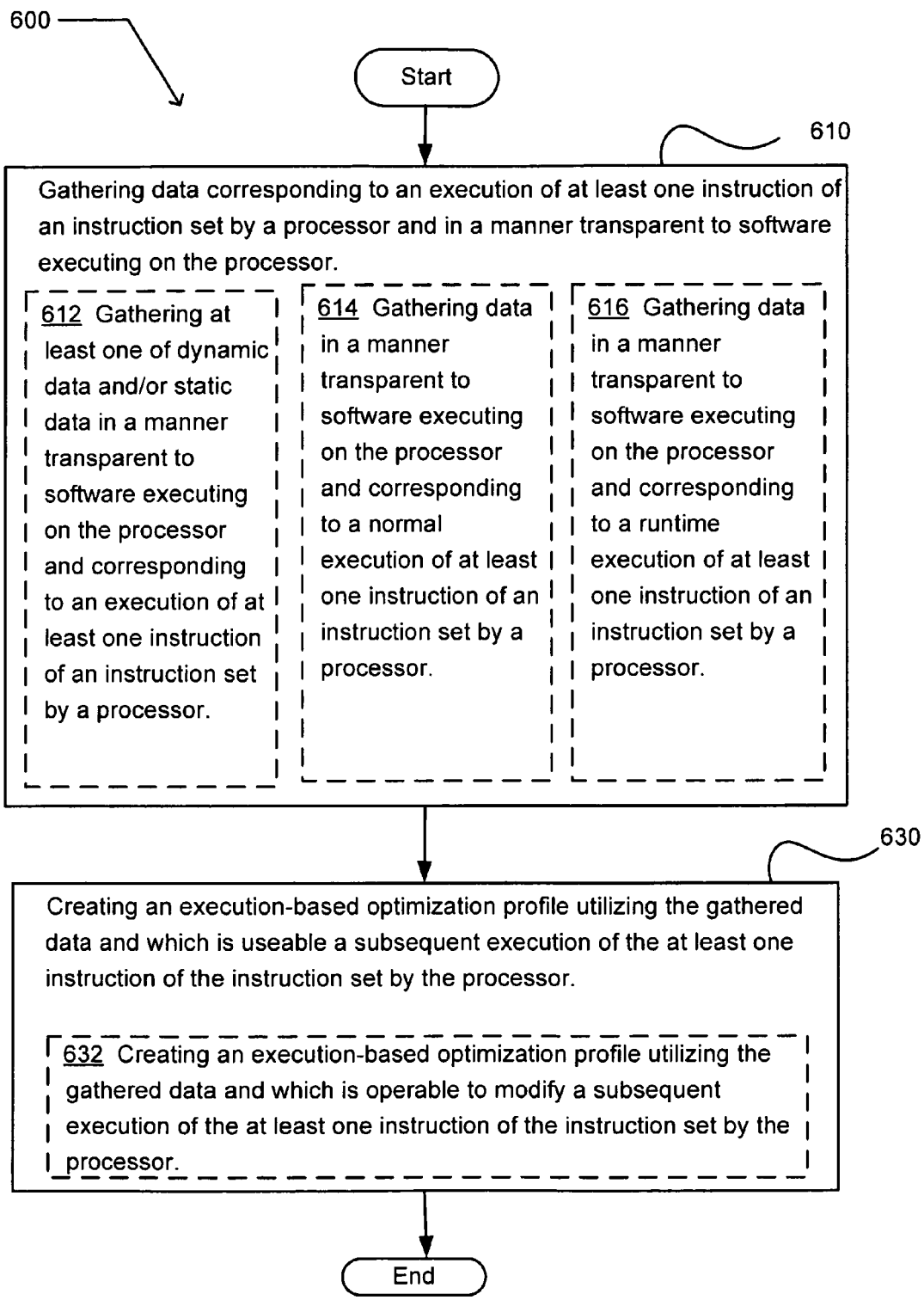
FIG. 10 illustrates an alternative embodiment of the exemplary operational flow of FIG. 9.

FIG. 10 illustrates an alternative embodiment of the exemplary operational flow 600 of FIG. 9. The harvesting operation 610 may include at least one additional operation. The at least one additional operation may include an operation 612, an operation 614, and/or an operation 616. The operation 612 gathers at least one of dynamic data and/or static data in a manner transparent to software executing on the processor and corresponding to an execution of at least one instruction of an instruction set by a processor. The operation 614 gathers data in a manner transparent to software executing on the processor and corresponding to a normal execution of at least one instruction of an instruction set by a processor. The operation 616 gathers data in a manner transparent to software executing on the processor and corresponding to a runtime execution of at least one instruction of an instruction set by a processor. The improvement operation 630 may include at least one additional operation, such as an operation 632. The operation 632 creates an execution-based optimization profile utilizing the gathered data and which is operable to modify a subsequent execution of the at least one instruction of the instruction set by the processor.

Figure 11:
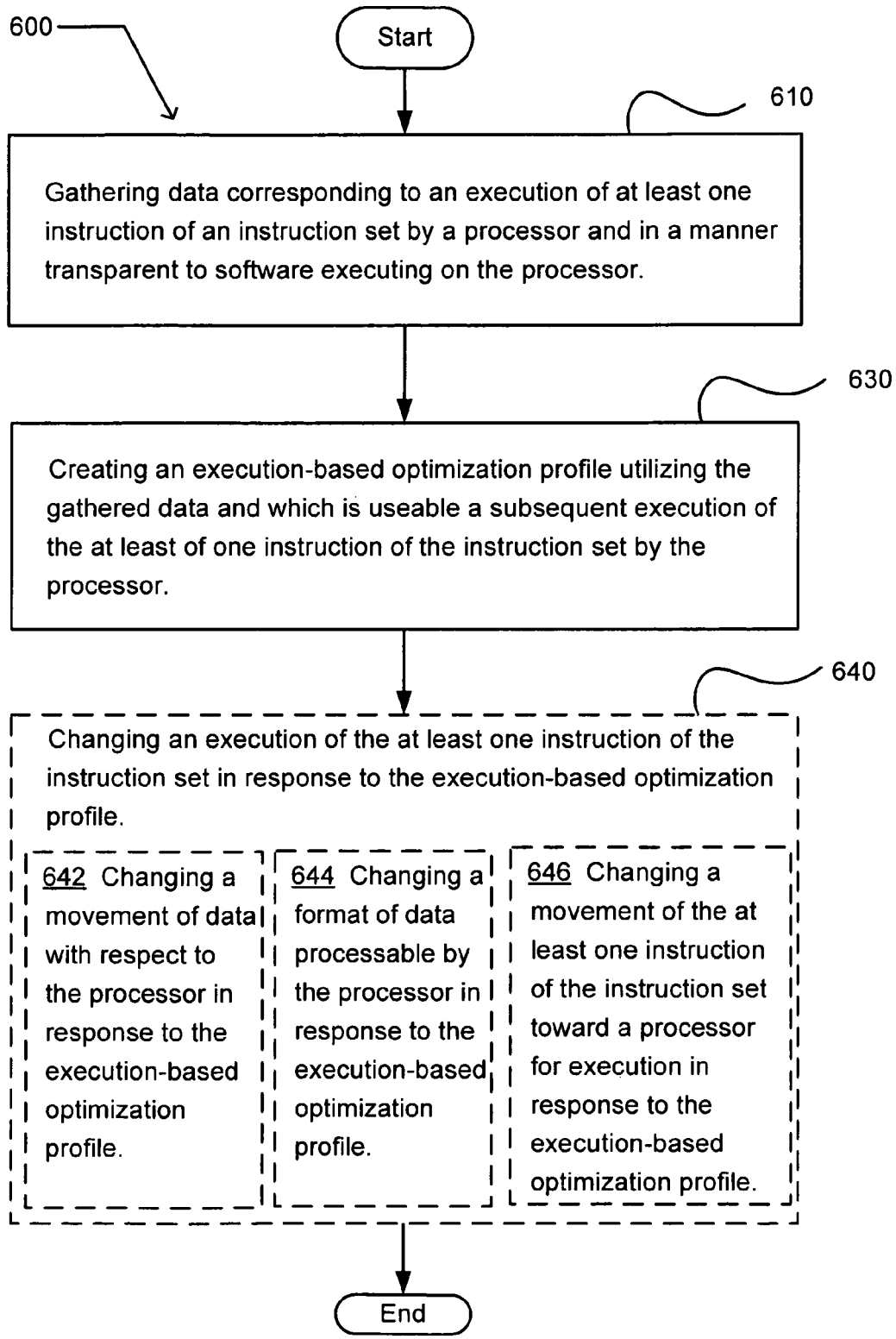
FIG. 11 illustrates another alternative embodiment of the exemplary operational flow of FIG. 9.

FIG. 11 illustrates another alternative embodiment of the exemplary operational flow 600 of FIG. 9. The operational flow may include at least one additional operation. The at least one additional operation may include a modification operation 640. The modification operation changes an execution of the at least one instruction of the instruction set in response to the execution-based optimization profile.

The modification operation 640 may include at least one additional operation. The at least one additional operation may include an operation 642, an operation 644, and/or an operation 646. The operation 642 changes a movement of data with respect to the processor in response to the execution-based optimization profile. For example, changing a movement of data may include changing a movement of data toward and/or away from the processor. Changing a movement of data toward the processor may include a prefetch of data. By way of further example, frequently read data may be stored in a memory close to the processor and infrequently read data may be stored in a memory far from the processor. By way of example, frequently written or rewritten data may be stored in a memory close to the processor and infrequently read data may be stored in a memory far from the processor. The operation 644 changes a format of data processable by the processor in response to the execution-based optimization profile. For example, the operation 644 may save data translated from one format to another, such as from big-endian to little-endian, or floating-point formats. The operation 646 changes a movement of the at least one instruction of the instruction set toward a processor for execution in response to the execution-based optimization profile.

Figure 12:
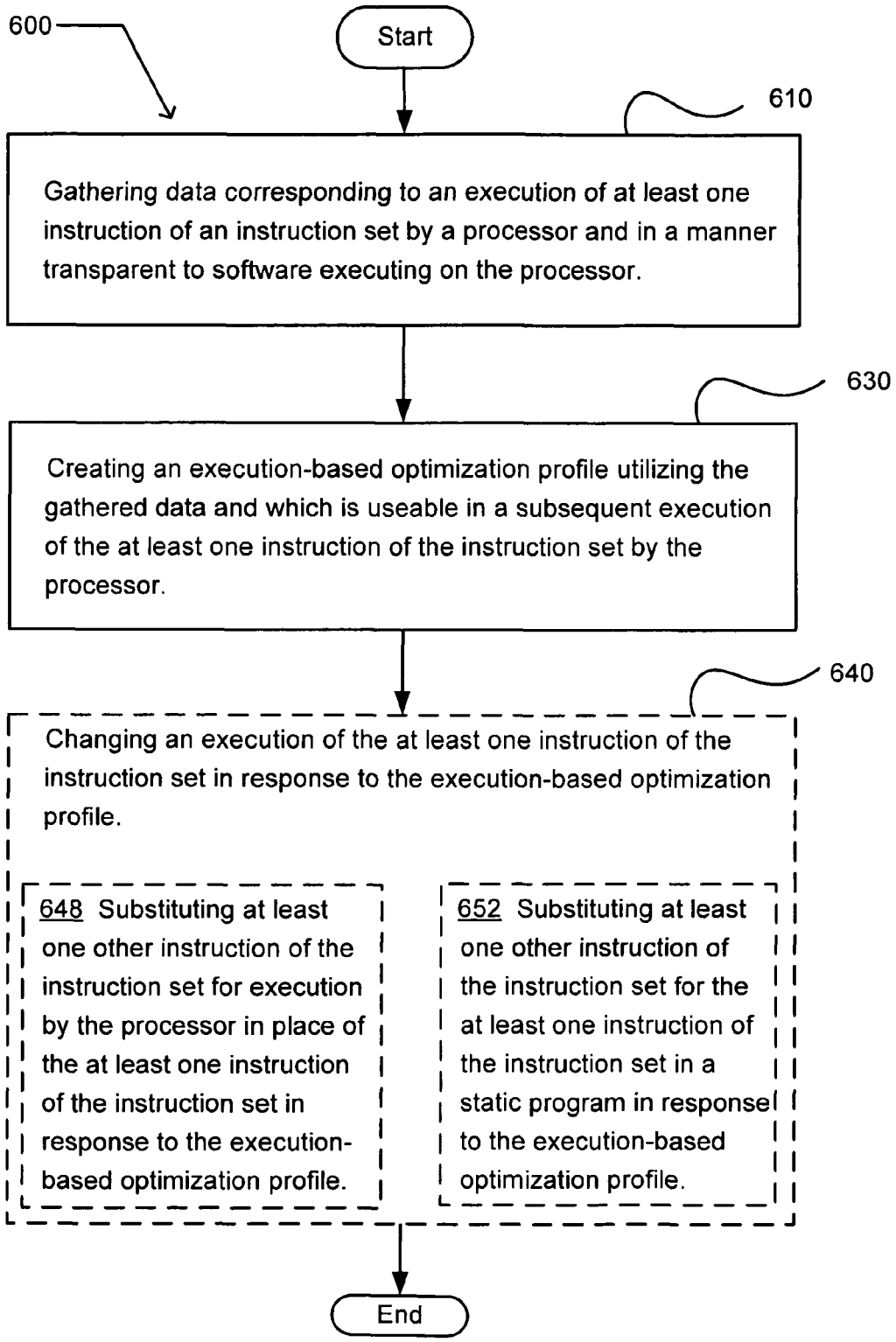
FIG. 12 illustrates a further alternative embodiment of the exemplary operational flow of FIGS. 9 and 11.

FIG. 12 illustrates a further alternative embodiment of the exemplary operational flow 600 of FIGS. 9 and 11. The modification operation 640 may include at least one additional operation. The at least one additional operation may include an operation 648, and/or an operation 652. The operation 648 substitutes at least one other instruction of the instruction set for execution by the processor in place of the at least one instruction of the instruction set in response to the execution-based optimization profile. The operation 652 substitutes at least one other instruction of the instruction set for the at least one instruction of the instruction set in a static program in response to the execution-based optimization profile.

Figure 13:
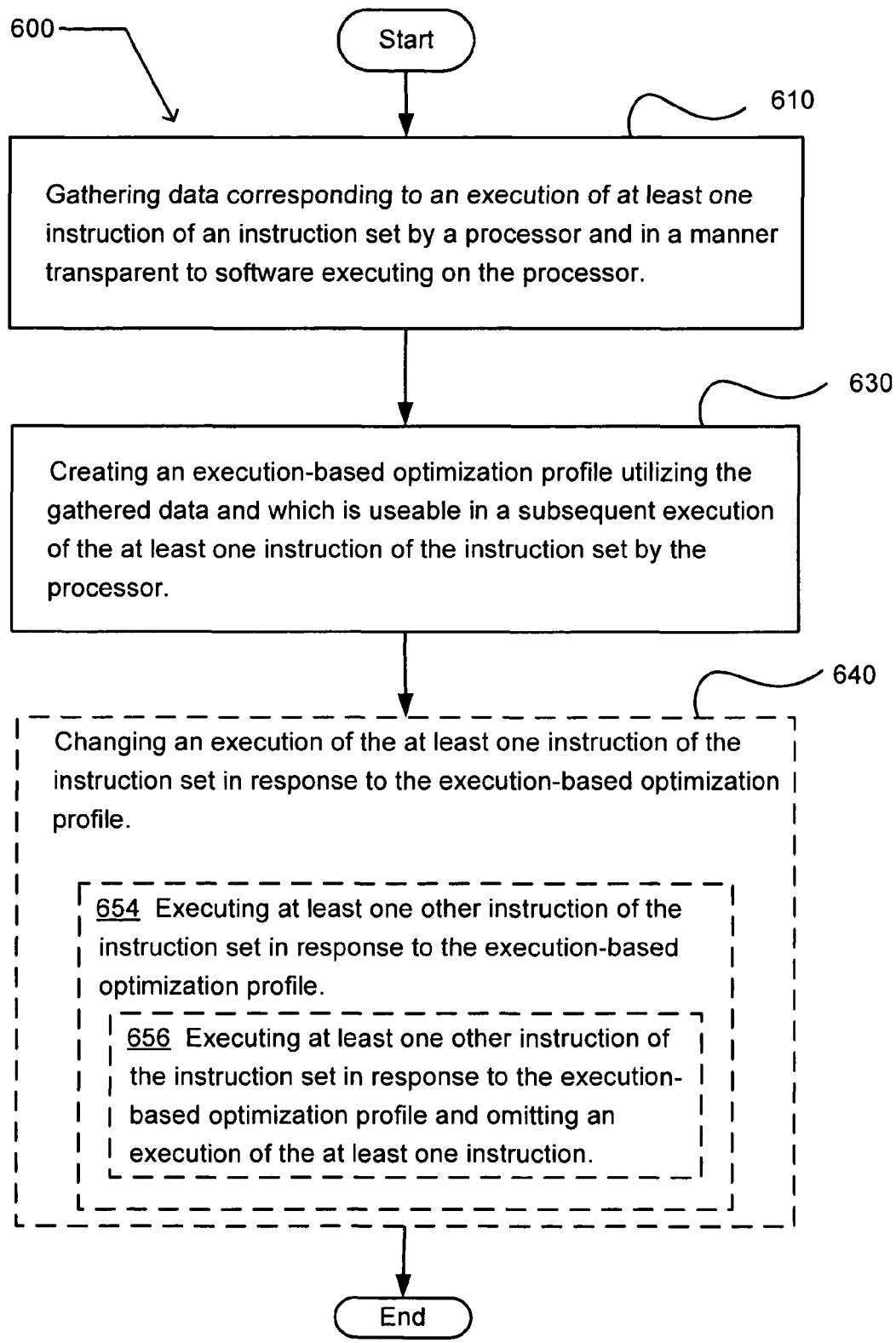
FIG. 13 illustrates an alternative embodiment of the exemplary operational flow of FIGS. 9 and 11.

FIG. 13 illustrates an alternative embodiment of the exemplary operational flow 600 of FIGS. 9 and 11. The modification operation 640 may include at least one additional operation. The at least one additional operation may include an operation 654. The operation 654 executes at least one other instruction of the instruction set in response to the execution-based optimization profile. The operation 654 may include at least one additional operation, such as an operation 656. The operation 656 executes at least one other instruction of the instruction set in response to the execution-based optimization profile and omits an execution of the at least one instruction.

Figure 14:
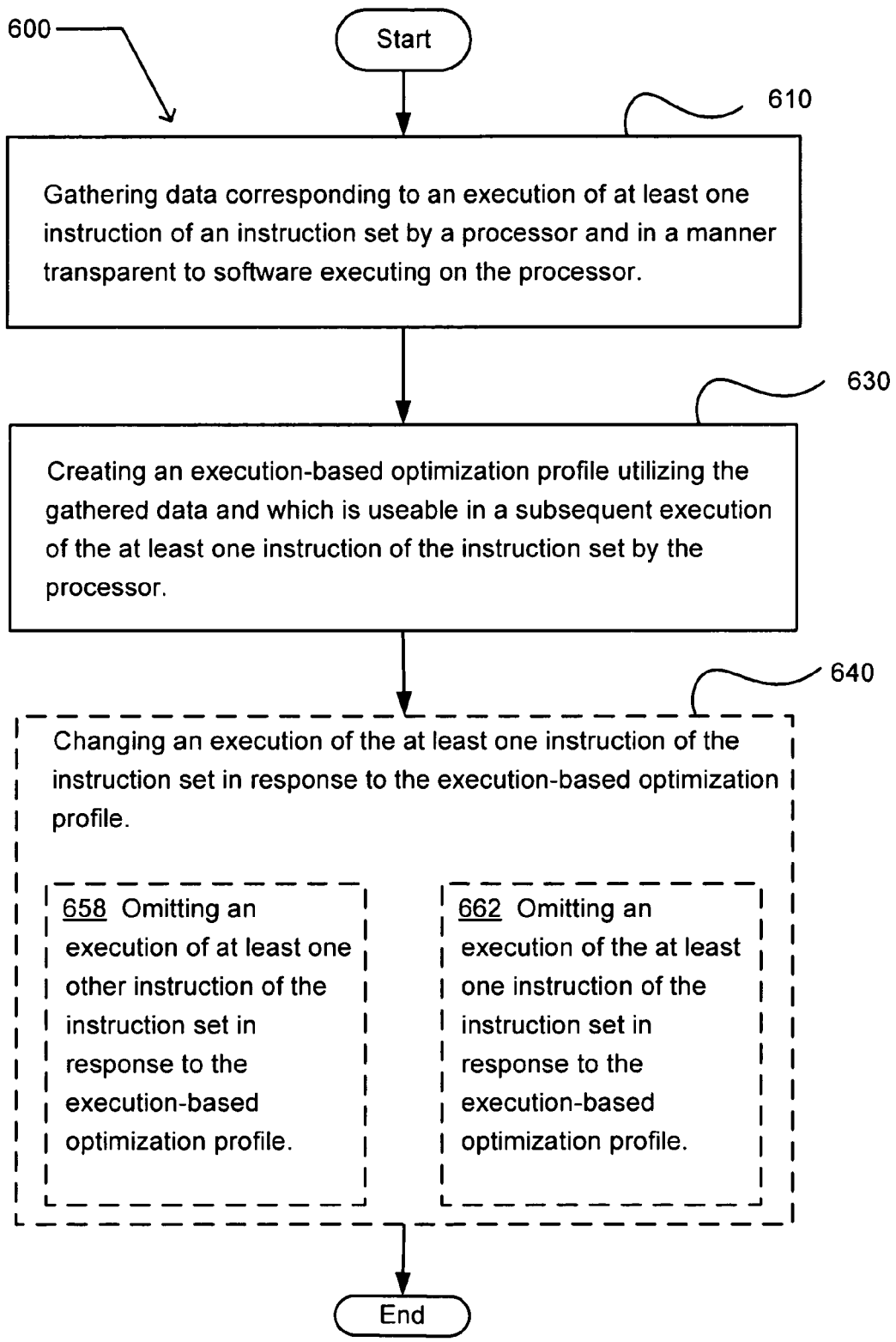
FIG. 14 illustrates another alternative embodiment of the exemplary operational flow of FIGS. 9 and 11.

FIG. 14 illustrates another alternative embodiment of the exemplary operational flow 600 of FIGS. 9 and 11. The modification operation 640 may include at least one additional operation. The at least one additional operation may include an operation 658, and/or an operation 662. The operation 658 omits an execution of at least one other instruction of the instruction set in response to the execution-based optimization profile. The operation 662 omits an execution of the at least one instruction of the instruction set in response to the execution-based optimization profile.

Figure 15:
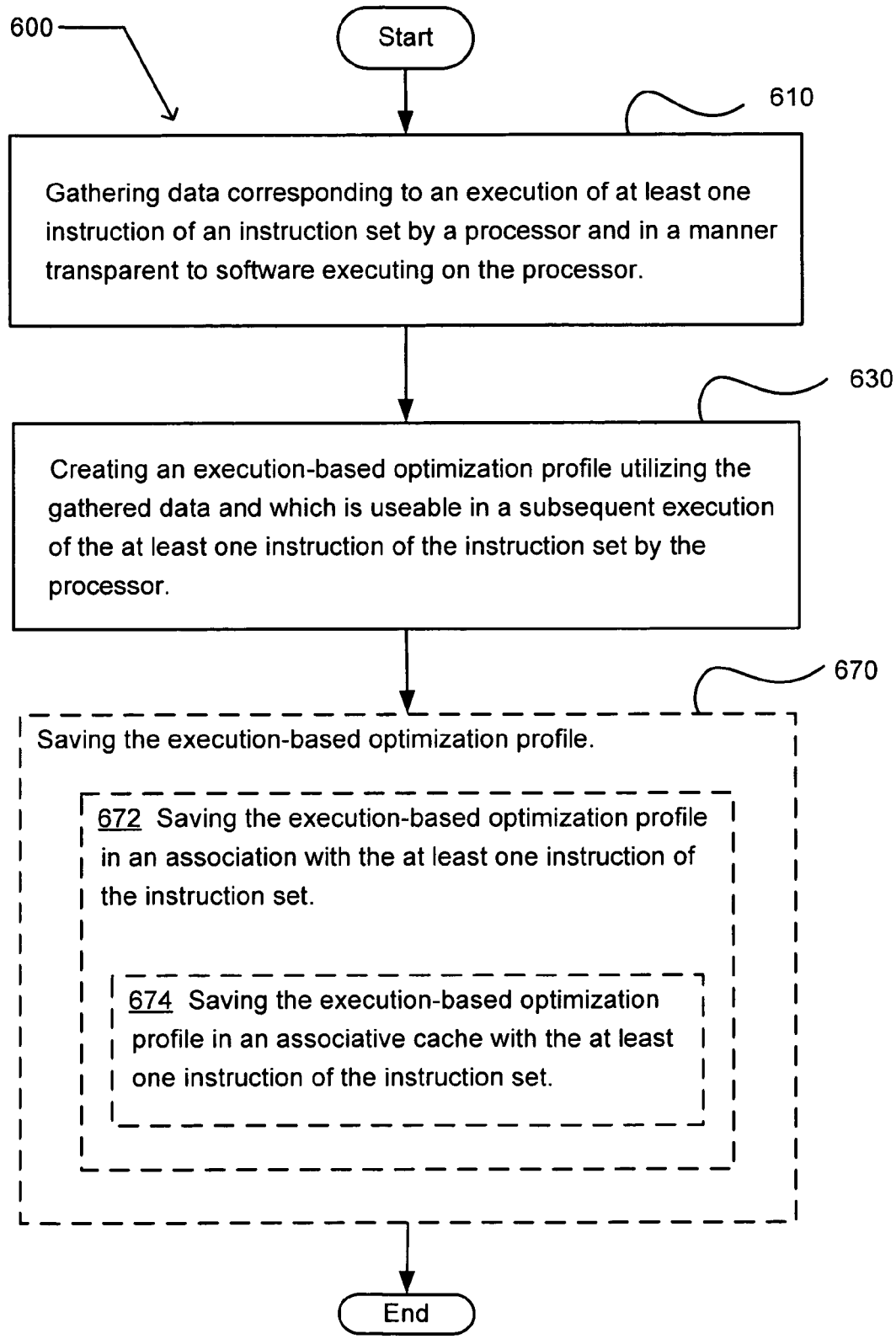
FIG. 15 illustrates another alternative embodiment of the exemplary operational flow of FIG. 9.

FIG. 15 illustrates another alternative embodiment of the exemplary operational flow 600 of FIG. 9. The operational flow may include at least one additional operation, such as the operation 670. The operation 670 saves the execution-based optimization profile. The operation 670 may include at least one additional operation, such as the operation 672. The operation 672 saves the execution-based optimization profile in an association with the at least one instruction of the instruction set. The operation 672 may include at least one additional operation, such as the operation 674. The operation 674 saves the execution-based optimization profile in an associative cache with the at least one instruction of the instruction set.

Figure 16:
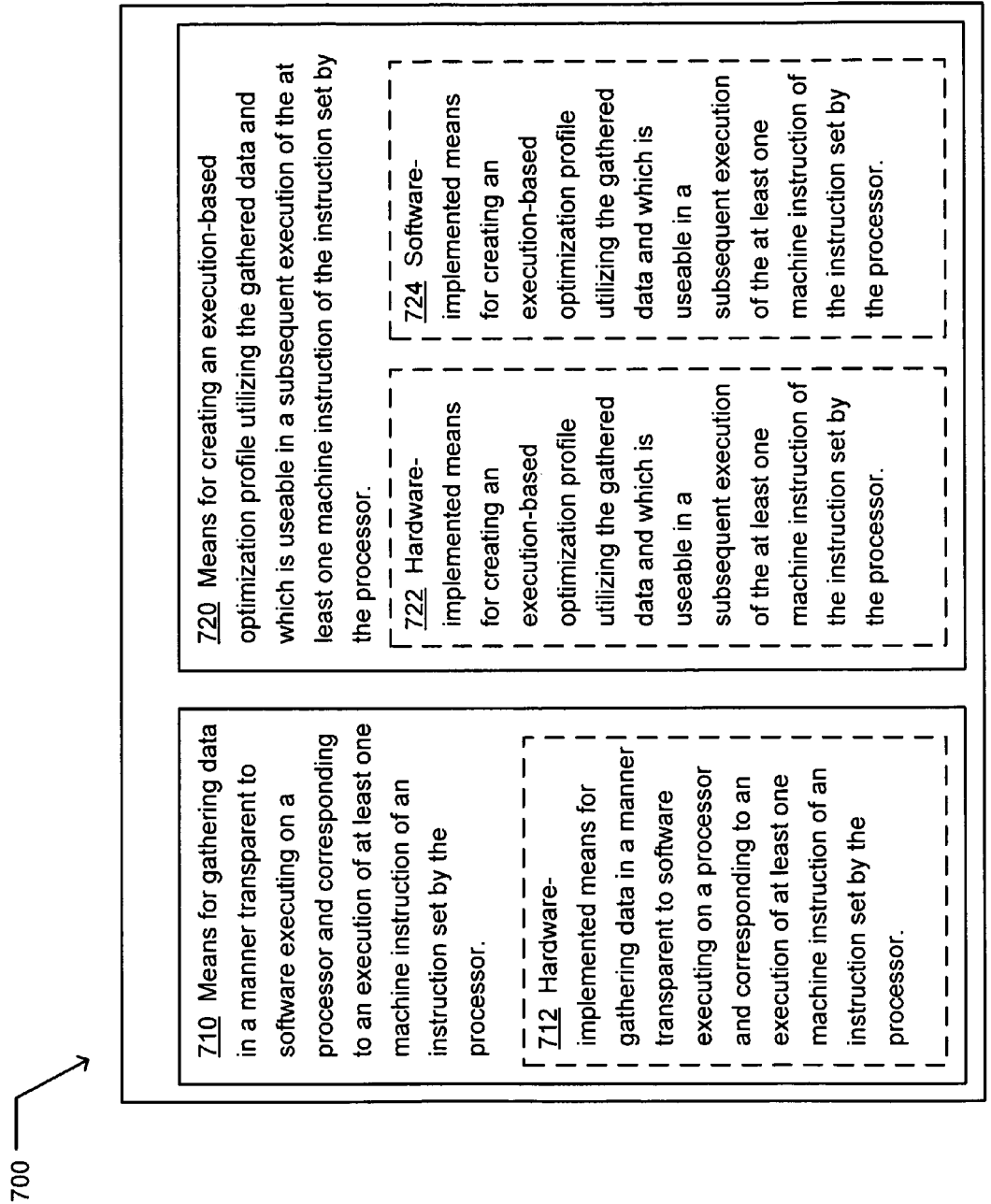
FIG. 16 illustrates a partial view of an exemplary device in which embodiments may be implemented.

FIG. 16 illustrates a partial view of an exemplary device 700 in which embodiments may be implemented. The device includes means 710 for gathering data in a manner transparent to software executing on the processor and corresponding to an execution of at least one machine instruction of an instruction set by the processor. The device includes means 720 for creating an execution-based optimization profile utilizing the gathered data and which is useable in a subsequent execution of the at least one machine instruction of the instruction set by the processor.

In an alternative embodiment the means 710 includes hardware-implemented means 712 for gathering data in a manner transparent to software executing on a processor and corresponding to an execution of at least one machine instruction of an instruction set by the processor. In another alternative embodiment, the means 720 may include at least one additional means. The at least one additional means may include hardware-implemented means 722 for creating an execution-based optimization profile utilizing the gathered data and which is useable in a subsequent execution of the at least one machine instruction of the instruction set by the processor. The at least one additional means may include software-implemented means 724 for creating an execution-based optimization profile utilizing the gathered data and which is useable in a subsequent execution of the at least one machine instruction of the instruction set by the processor.

Figure 17:
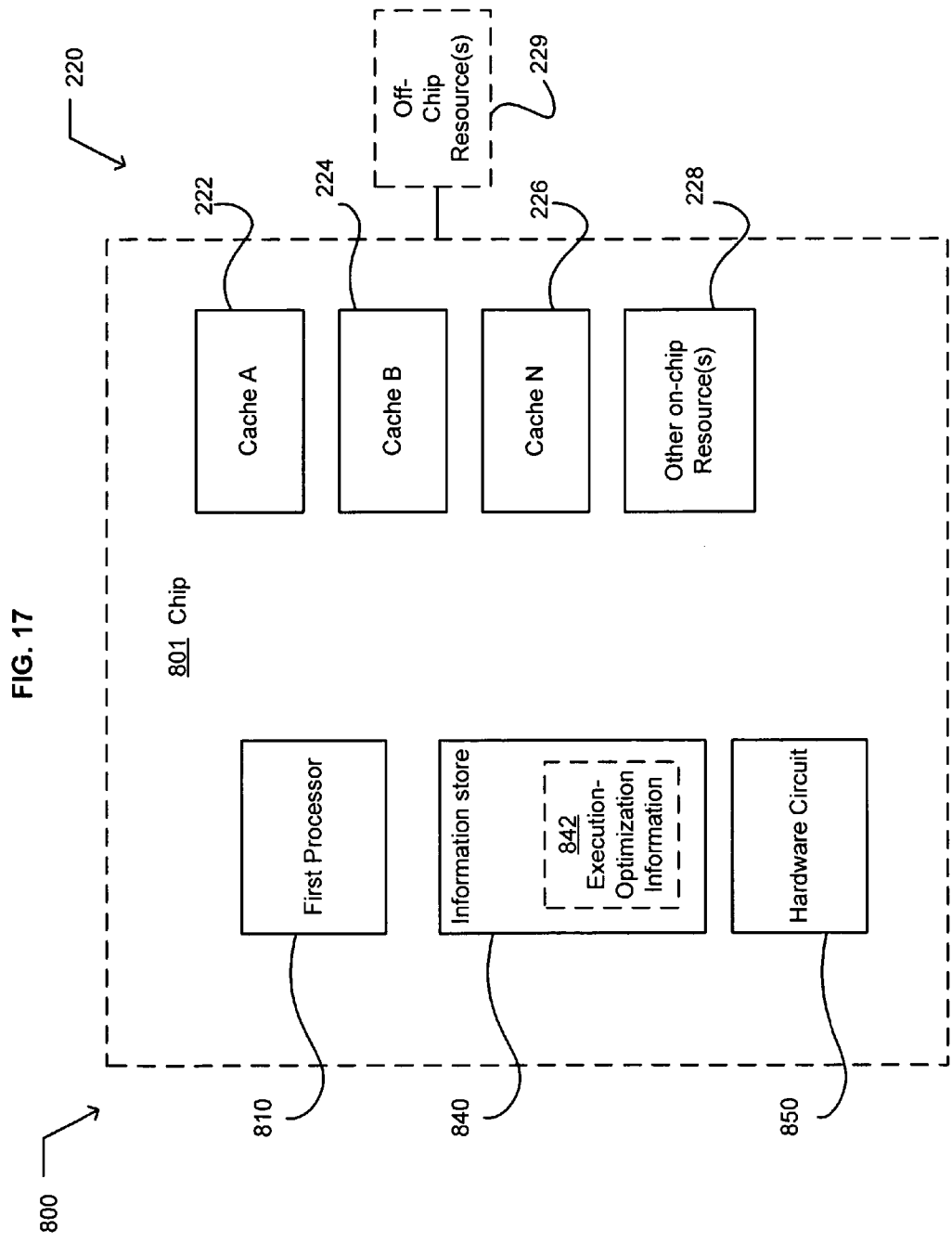
FIG. 17 illustrates a partial view of an exemplary device in which embodiments may be implemented.

FIG. 17 illustrates a partial view of an exemplary device 800 in which embodiments may be implemented. The device includes an information store 840 operable to save an execution-optimization information 842, a first processor 810, and a hardware circuit 850. The hardware circuit includes a circuit for altering an execution of a program by the first processor in response to the execution-optimization information. The execution-optimization information includes execution-optimization information created by a hardware device utilizing data collected from a second processor (not shown). The collected data corresponding to a previous runtime execution by the second processor of at least a portion of the program that was transparent to any software executing on the second processor.

In an embodiment, the execution-optimization information 842 may include the execution-optimization information generated by the execution-optimization synthesizer 250 of FIG. 2. In another embodiment, the execution-optimization information may include at least one of the ghost pages 272, the execution-optimization information 274, and/or the execution-optimization profile 276 described in conjunction with FIGS. 2 and 3. In an alternative embodiment, the first processor 810 includes a first processor operable to execute an instruction set and operably coupled to the information store 840. In another embodiment, the hardware circuit for altering an execution of a program includes a hardware circuit for altering an execution of a program and operably coupled to the information store. In a further embodiment, the hardware circuit includes a hardware circuit operably coupled to the processor.

In an embodiment, the hardware circuit 850 includes a hardware circuit for copying the execution-optimization information from the information store to a memory operably coupled to the first processor. For example, the memory operably coupled to the first processor may include the hardware resource 220, such as the on-chip cache B 224, or the off-chip resource 229, such as an off-chip cache or an outboard memory or an outboard storage.

In a further embodiment, the hardware circuit 850 for altering an execution of a program by the first processor 810 in response to the execution-optimization information includes a hardware circuit for causing an alteration of an execution of at least one instruction of an instruction set of a static program by the first processor in response to the execution-optimization information. In another embodiment, the altering an execution of a program by the first processor in response to the execution-optimization information includes altering an execution of at least one instruction of an instruction set of a dynamic program by the first processor in response to the execution-optimization information. In a further embodiment, the altering an execution of a program by the first processor in response to the execution-optimization information includes altering a context of an execution of a program by the first processor in response to the execution-optimization information.

In an embodiment, the hardware circuit for altering an execution of a program by the first processor in response to the execution-optimization information includes a hardware circuit for altering an execution of at least one instruction of an instruction set of a program by the first processor in response to the execution-optimization information. In another embodiment, the hardware circuit for altering an execution of a program by the first processor in response to the execution-optimization information includes a hardware circuit for altering a movement of data with respect to the first processor in response to the execution-optimization information. In a further embodiment, the hardware circuit for altering an execution of a program by the first processor in response to the execution-optimization information includes a hardware circuit for altering a movement of at least one instruction of the program toward the first processor in response to the execution-optimization information.

In some instances, the altering an execution of a program by the first processor in response to the execution-optimization information may include directly altering an execution of a program by the first processor in response to the execution-optimization information. In other instances, the altering an execution of a program by the first processor in response to the execution-optimization information may include causing an alteration of an execution of a program by the first processor in response to the execution-optimization information. In further instances, the altering an execution of a program by the first processor in response to the execution-optimization information may include initiating an alteration of an execution of a program by the first processor in response to the execution-optimization information.

In an embodiment, the execution-optimization information includes execution-optimization information created by a hardware device (not shown) utilizing data collected from a second processor (not shown) that is at least substantially a same processor as the first processor 810. For example, the execution-optimization information used to alter a current execution of a program by the first processor 810 may have been created during a prior execution of the program by the first processor. In another embodiment, the execution-optimization information includes an execution-optimization information created by a hardware device utilizing data collected from a second processor that is at least a substantially different processor from the first processor. For example, the execution-optimization information used to alter a current execution of a program by the first processor may have been created during a prior execution of the program by a completely different second processor, which may be a processor running in a completely different computing device.

In an embodiment, the information store includes at least a portion of a cache. In another embodiment, the information store includes at least one of an I-cache or a D-cache. In a further embodiment, the information store includes at least one of a volatile memory or a non-volatile memory. In a further embodiment, the information store includes a computer readable medium. In another embodiment, the information store may include a non-volatile outboard storage, such as magnetic disk storage.

In another embodiment, the first processor 810 and the hardware circuit 850 are formed on a single chip, illustrated as a single chip 801. In a further embodiment, the first processor 810 and the information store 840 are formed on a single chip, illustrated as a single chip 801.

Figure 18:
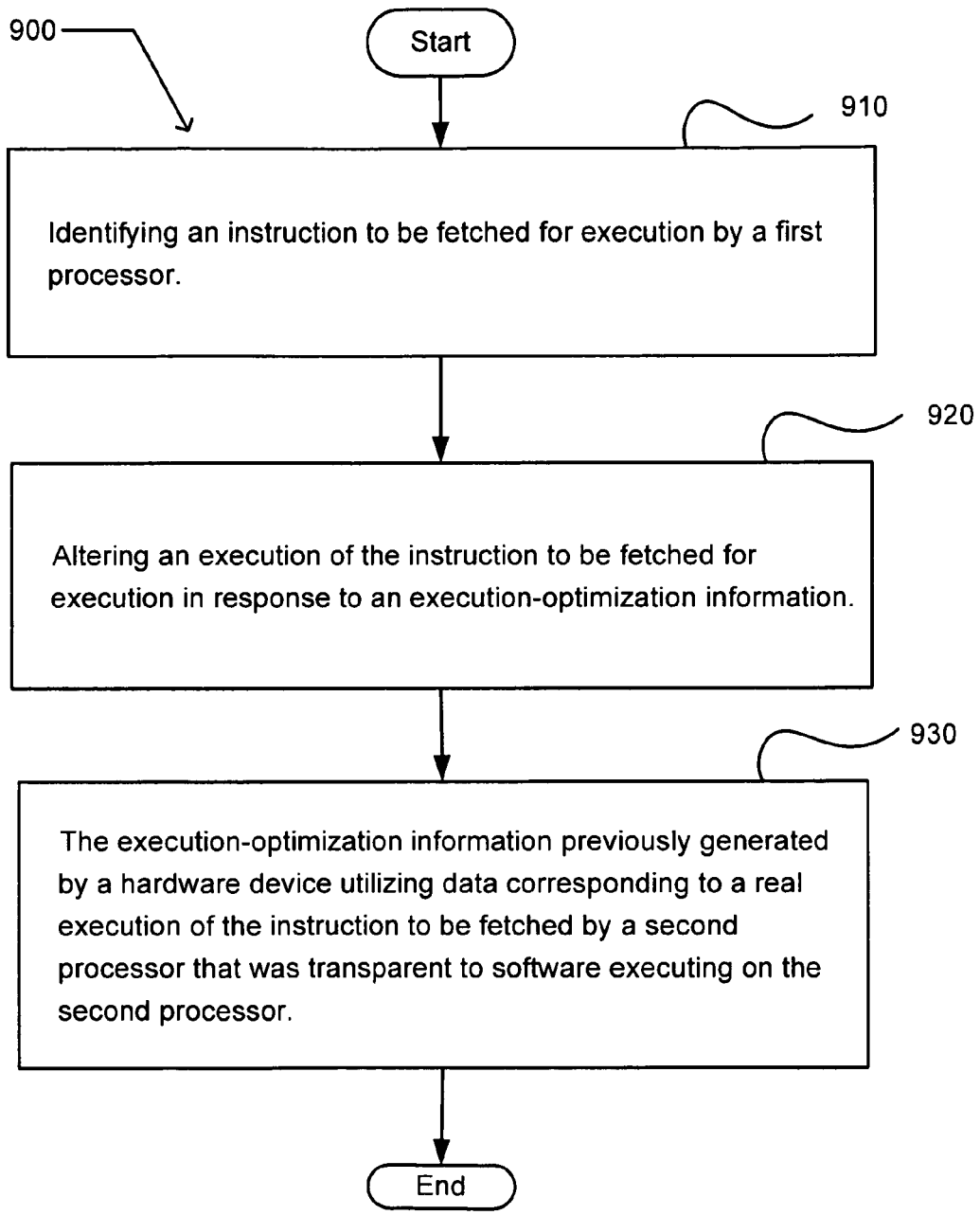
FIG. 18 illustrates an exemplary operational flow that may implement embodiments.

FIG. 18 illustrates an exemplary operational flow 900 that may implement embodiments. In an embodiment, the operational flow may be implemented in the computing system environment 100 of FIG. 1, and/or the device 800 of FIG. 17. After a start operation, the operational flow moves to an instruction determination operation 910. The instruction determination operation identifies an instruction to be fetched for execution by a first processor. An optimization operation 920 alters an execution of the instruction to be fetched for execution in response to an execution-optimization information. The execution-optimization information 930 was previously generated by a hardware device utilizing data corresponding to a real execution of the instruction to be fetched by a second processor that was transparent to software executing on the second processor. The flow then moves to an end operation.

Figure 19:
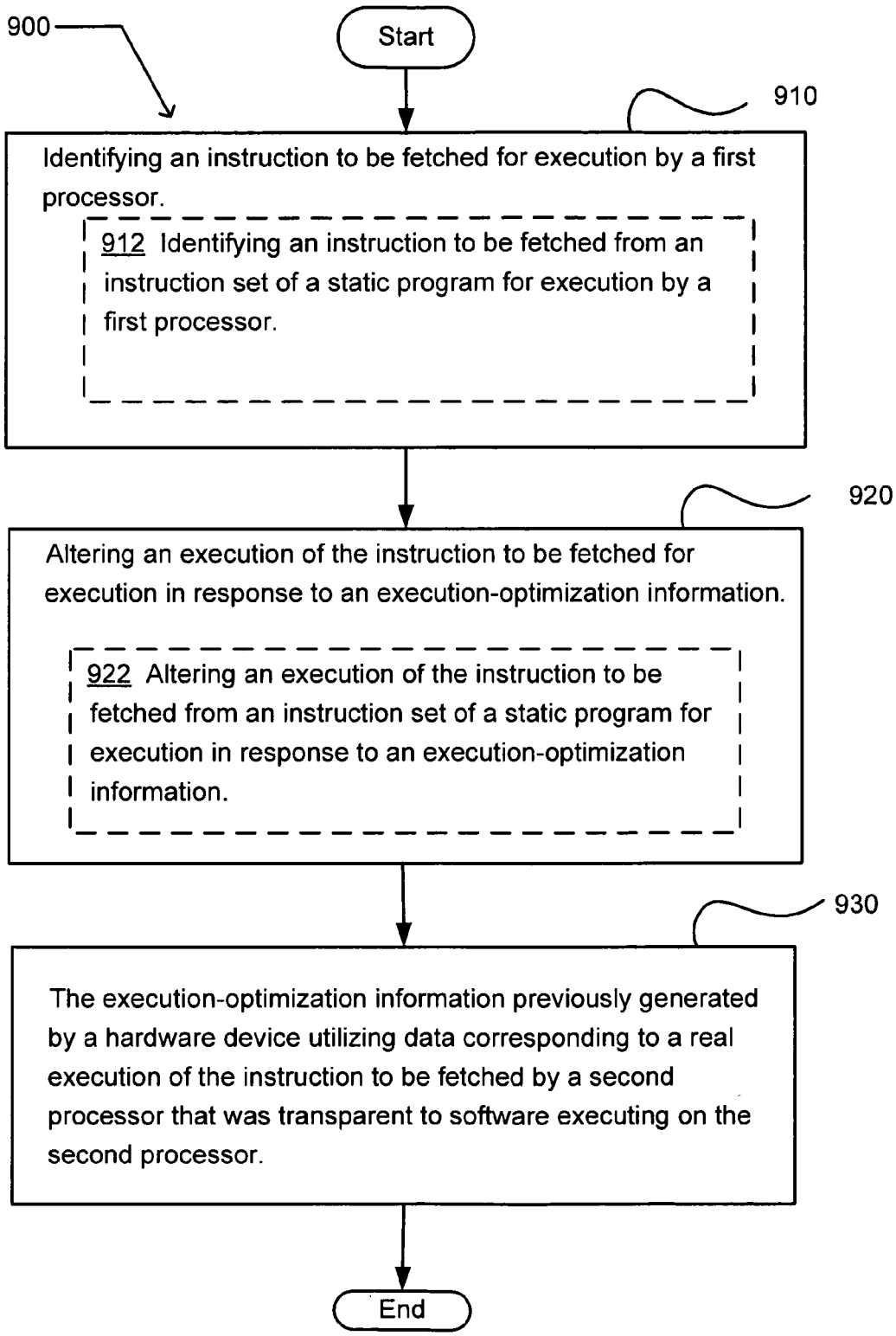
FIG. 19 illustrates an alternative embodiment of the exemplary operational flow of FIG. 18.

FIG. 19 illustrates an alternative embodiment of the exemplary operational flow 900 of FIG. 18. The instruction determination operation 910 may include at least one additional operation, such as an operation 912. The operation 912 identifies an instruction to be fetched from an instruction set of a static program for execution by a first processor. The optimization operation 920 may include at least one additional operation, illustrated as the operation 922. The operation 922 alters an execution of the instruction to be fetched from an instruction set of a static program for execution in response to an execution-optimization information.

Figure 20:
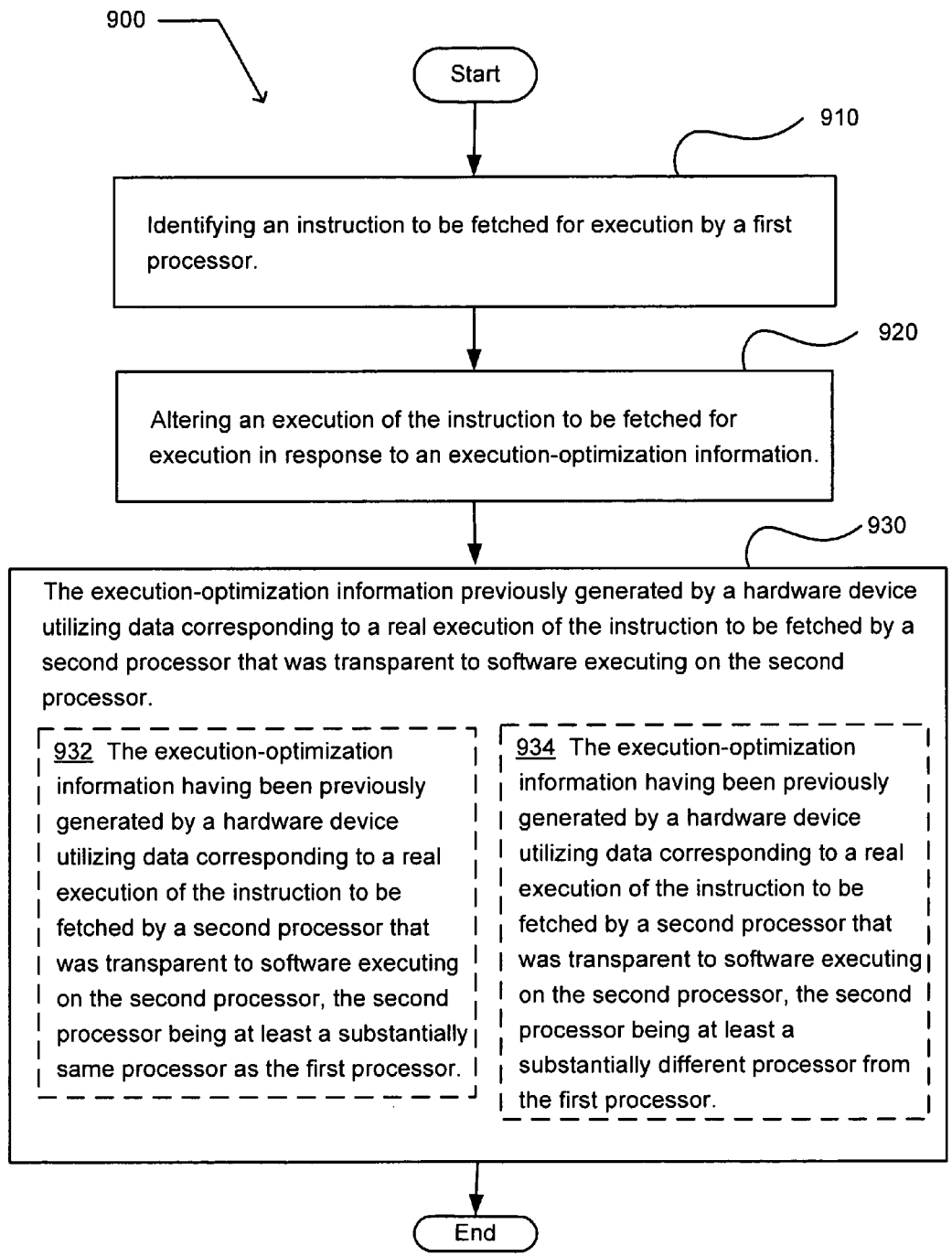
FIG. 20 illustrates an alternative embodiment of the exemplary operational flow of FIG. 18.

FIG. 20 illustrates an alternative embodiment of the exemplary operational flow 900 of FIG. 18. The execution-optimization information 930 may include at least one additional embodiment. The at least one additional embodiment may include an execution-optimization information 932 and/or an execution-optimization information 934. The execution-optimization information 932 includes execution-optimization information having been previously generated by a hardware device utilizing data corresponding to a real execution of the instruction to be fetched by a second processor that was transparent to software executing on the second processor, the second processor being at least a substantially same processor as the first processor. The execution-optimization information 934 may include an execution-optimization information having been previously generated by a hardware device utilizing data corresponding to a real execution of the instruction to be fetched by a second processor that was transparent to software executing on the second processor, the second processor being at least a substantially different processor from the first processor. In an embodiment, the second processor may be a processor of a multiprocessor computing device that includes the first processor. In another embodiment, the second processor may be a processor of a second computing device that is a separate and a distinct computing device from a first computing device that includes the first processor.

Figure 21:
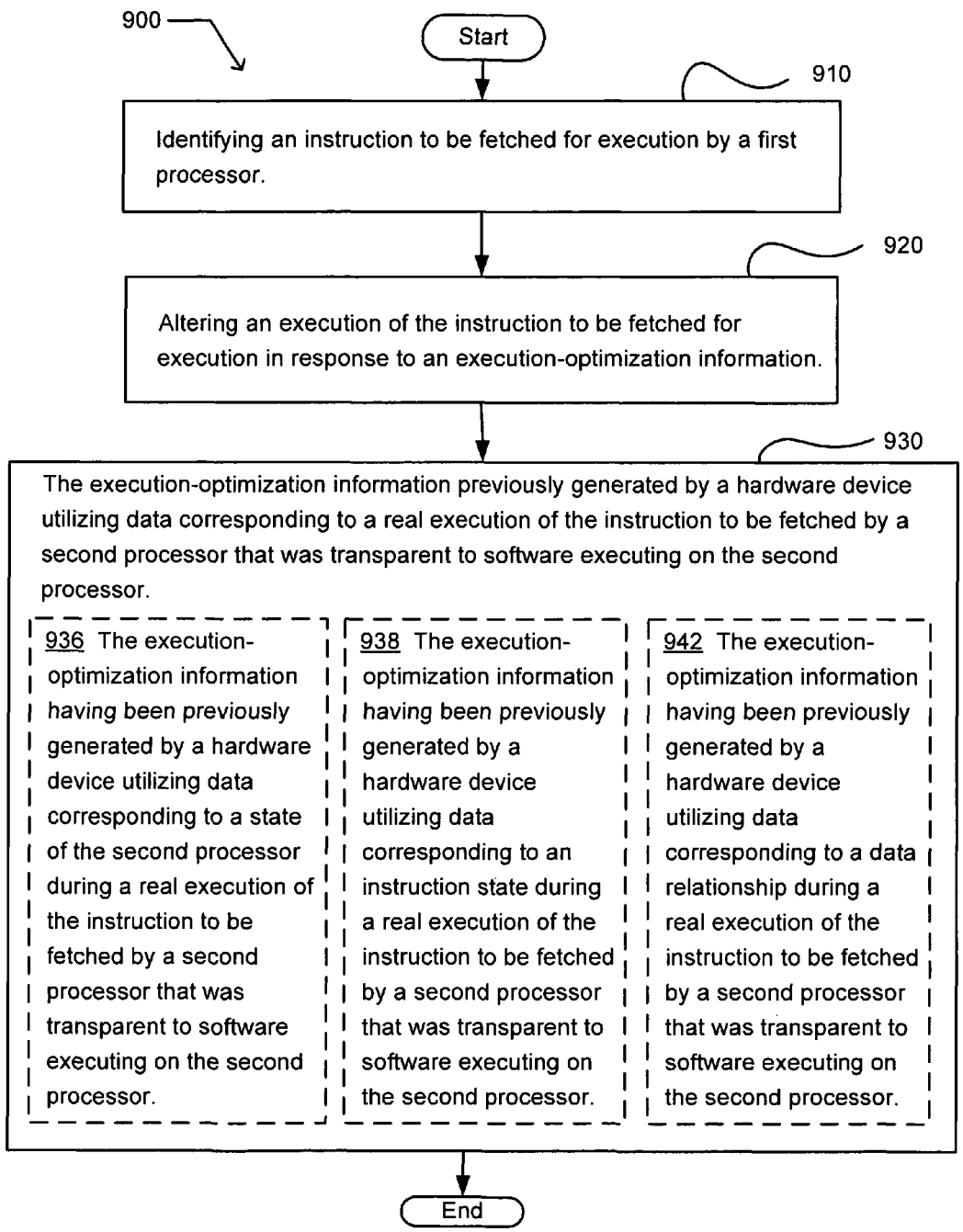
FIG. 21 illustrates an alternative embodiment of the exemplary operational flow of FIG. 18.

FIG. 21 illustrates an alternative embodiment of the exemplary operational flow 900 of FIG. 18. The execution-optimization information 930 may include at least one additional embodiment. The at least one additional embodiment may include an execution-optimization information 936, an execution-optimization information 938, and/or an execution-optimization information 942. The execution-optimization information 936 includes an execution-optimization information having been previously generated by a hardware device utilizing data corresponding to a state of the second processor during a real execution of the instruction to be fetched by a second processor that was transparent to software executing on the second processor. The execution-optimization information 938 includes an execution-optimization information having been previously generated by a hardware device utilizing data corresponding to an instruction state during a real execution of the instruction to be fetched by a second processor that was transparent to software executing on the second processor. The execution-optimization information 942 includes an execution-optimization information having been previously generated by a hardware device utilizing data corresponding to a data relationship during a real execution of the instruction to be fetched by a second processor that was transparent to software executing on the second processor.

Figure 22:
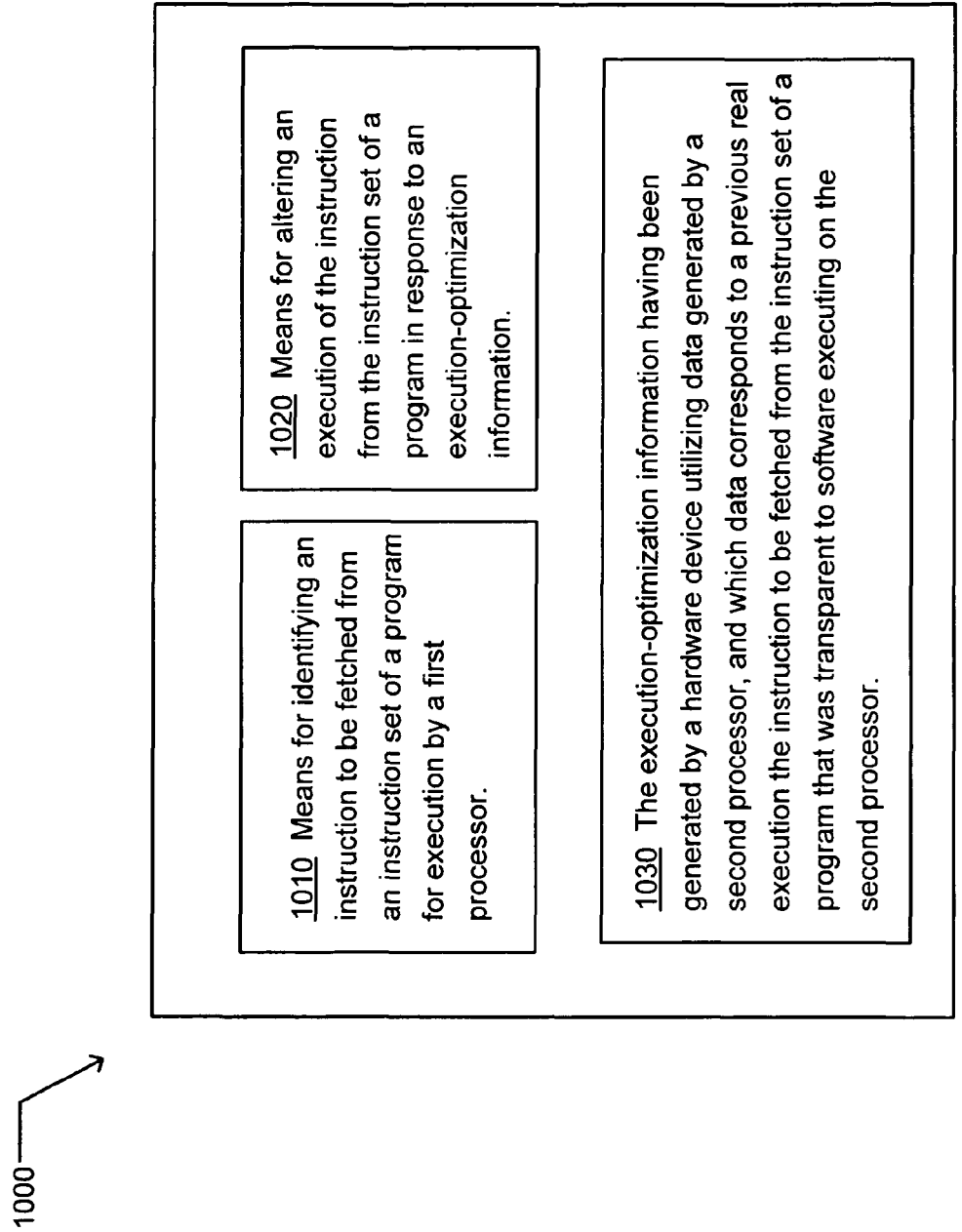
FIG. 22 illustrates a partial view of an exemplary device in which embodiments may be implemented.

FIG. 22 illustrates a partial view of an exemplary device 1000 in which embodiments may be implemented. The device includes means 1010 for identifying an instruction to be fetched from an instruction set of a program for execution by a first processor. The device also includes means 1020 for altering an execution of the instruction from the instruction set of a program in response to an execution-optimization information. The execution-optimization information 1030 having been generated by a hardware device utilizing data generated by a second processor, and which data corresponds to a previous real execution the instruction to be fetched from the instruction set of a program that was transparent to software executing on the second processor.

Figure 23:
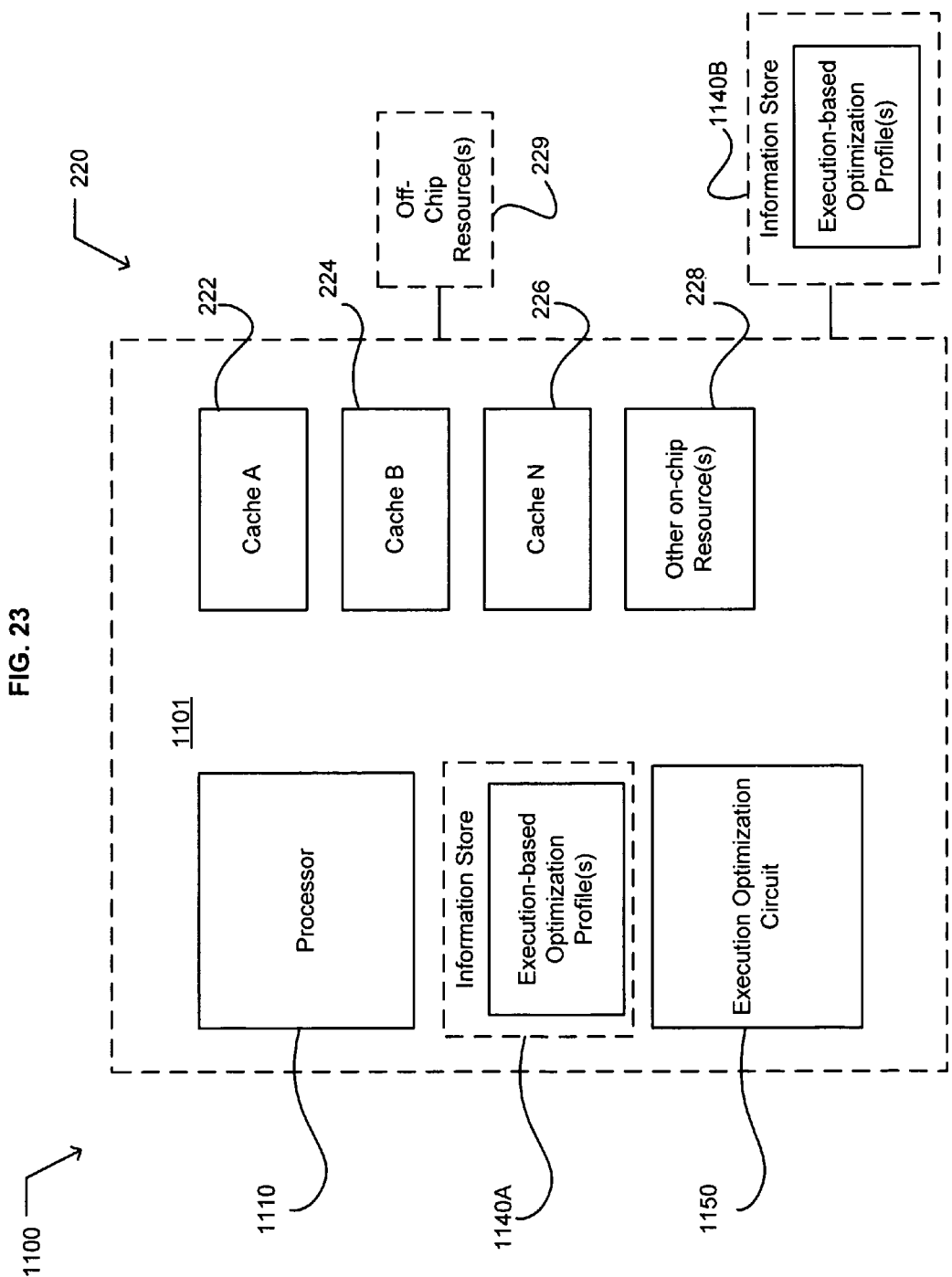
FIG. 23 illustrates a partial view of an exemplary device in which embodiments may be implemented.

FIG. 23 illustrates a partial view of an exemplary device 1100 in which embodiments may be implemented. The device includes a processor 1110 operable to execute an instruction set, and an execution-optimization circuit 1150. The execution-optimization circuit includes an execution-optimization circuit for receiving an identification of a first instruction to be fetched from the instruction set for execution by the processor. The execution-optimization circuit also includes an execution-optimization circuit for pointing to a second instruction of the instruction set of the processor to be fetched for execution by the processor if indicated by an execution-based optimization profile saved in an information store. In an embodiment, the information store may include an information store 1140A close to the processor, such as on the same chip. In another embodiment, the information store may include an information store 1140B that is an off-processor-chip resource. The execution-based optimization profile being previously derived by a hardware device utilizing data invisible to software and generated during a runtime execution of at least a portion of the instruction set. The execution-based optimization profile may indicate that the second instruction be fetched in a direct and/or indirect manner. For example, the execution-based optimization profile may modify the next instruction address calculation causing the second instruction to be fetched in lieu of the first instruction. In another example, the execution-based optimization profile may signal and/or point the next instruction address calculation causing the second instruction to be fetched in lieu of the first instruction. In a further example, the execution-based optimization profile may provide information usable in determining whether to fetch the second instruction in lieu of the first instruction.

In an embodiment, the execution-optimization circuit 1150 includes at least one of a microengine, a micro-programmed circuit, and/or a hardwired circuit. In another embodiment, the execution-optimization circuit includes an execution-optimization portion of a control unit of the processor. In a further embodiment, the processor and the execution-optimization circuit are formed on a chip, illustrated as the chip 1101.

In an embodiment, the execution-optimization circuit 1150 includes an execution-optimization circuit for receiving an identification of a first instruction to be fetched from the instruction set of a program for execution by the processor. The program may be a static program or a dynamic program. In another embodiment, the execution-optimization circuit includes an execution-optimization circuit for pointing to a second instruction of the instruction set of the processor to be fetched for execution by the processor if indicated by an execution-based optimization profile associated with the first instruction. In a further embodiment, the execution-optimization circuit includes an execution-optimization circuit for pointing to a second instruction of the instruction set of the processor to be fetched for execution by the processor if indicated by an execution-based optimization profile associated with another instruction of the instruction set. In an embodiment, the execution-based optimization profile includes the execution-based optimization profile being previously derived by a hardware device utilizing data invisible to software and generated during a runtime execution of at least a portion of an instruction set of a static program.

Figure 24:
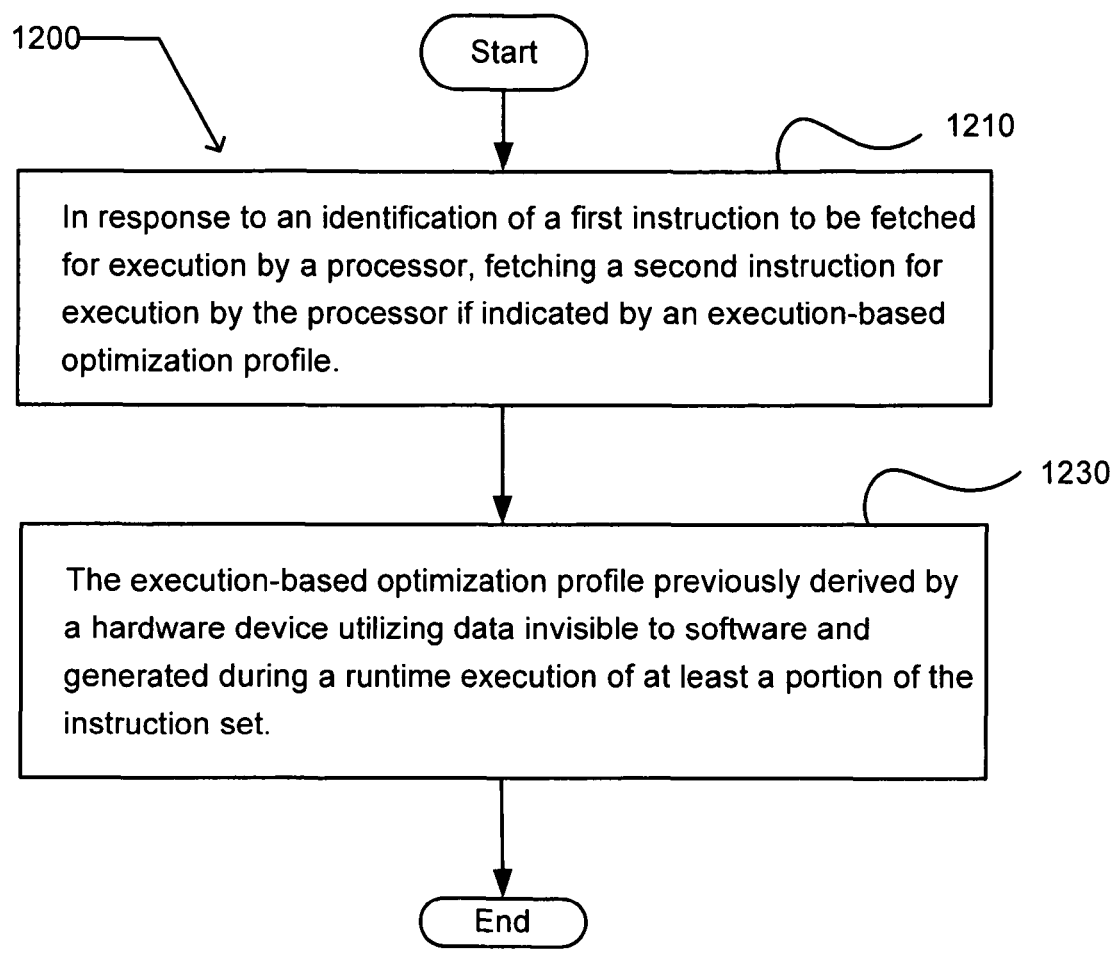
FIG. 24 illustrates an exemplary operational flow in which embodiments may be implemented.

FIG. 24 illustrates an exemplary operational flow 1200 in which embodiments may be implemented. In an embodiment, the operational flow may be implemented in the computing system environment 100 of FIG. 1, and/or the device 1100 of FIG. 23. After a start operation, the operational flow moves to a substitution operation 1210. In response to an identification of a first instruction to be fetched for execution by a processor, the substitution operation fetches a second instruction for execution by the processor if indicated by an execution-based optimization profile. The execution-based optimization profile 1230 includes an execution-based optimization profile previously derived by a hardware device utilizing data invisible to software and generated during a runtime execution of at least a portion of the instruction set. The flow then proceeds to an end operation. The operational flow is transparent to software executing on the processor.

Figure 25:
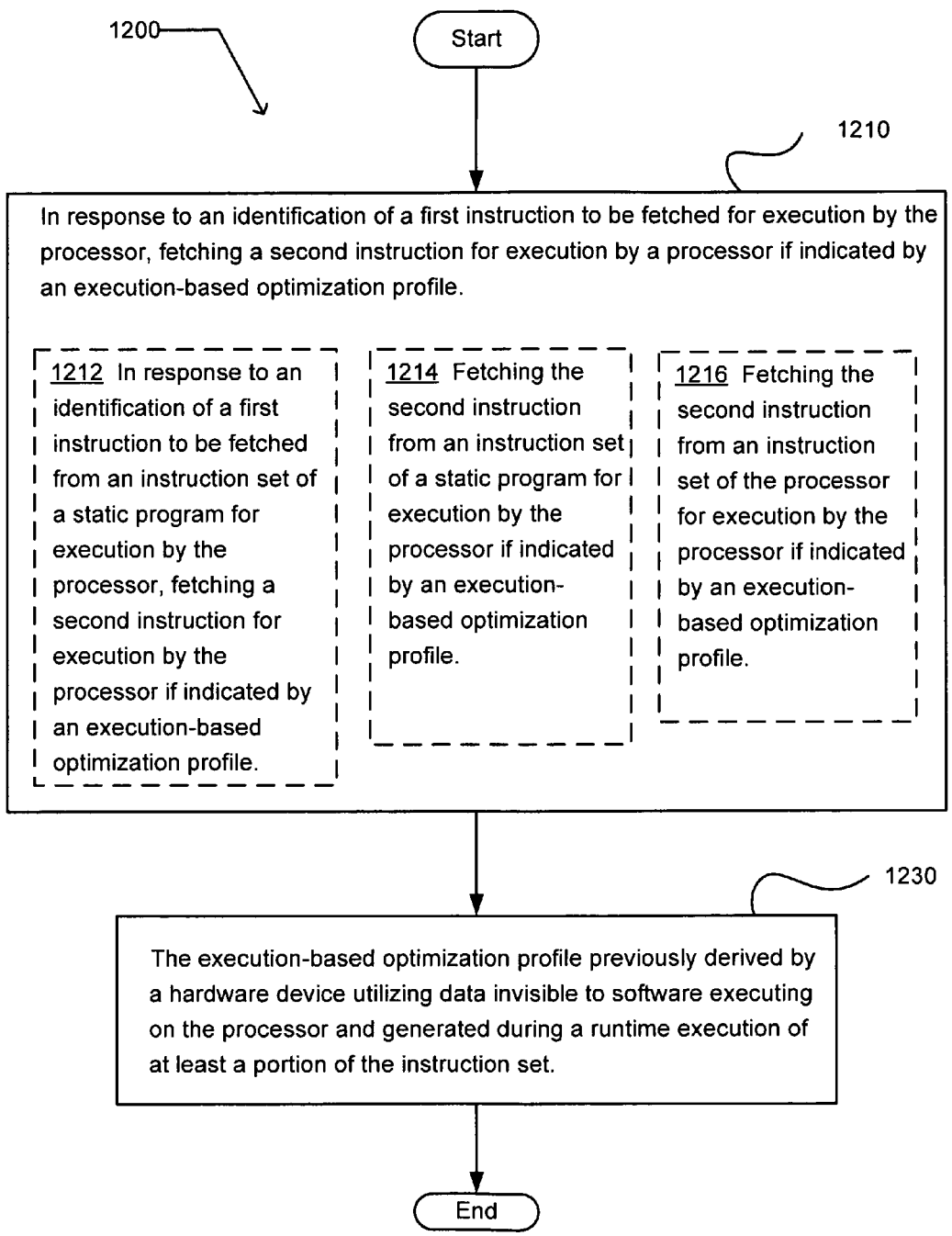
FIG. 25 illustrates an alternative embodiment of the exemplary operational flow of FIG. 24.

FIG. 25 illustrates an alternative embodiment of the exemplary operational flow 1200 of FIG. 24. The substitution operation 1210 may include at least one additional operation. The at least one additional operation may include an operation 1212, an operation 1214, and/or an operation 1216. In response to an identification of a first instruction to be fetched from an instruction set of a static program for execution by the processor, the operation 1212 fetches a second instruction for execution by the processor if indicated by an execution-based optimization profile. In response to an identification of a first instruction to be fetched from an instruction set of a static program for execution by the processor, the operation 1214 fetches the second instruction from an instruction set of a static program for execution by the processor if indicated by an execution-based optimization profile. In response to an identification of a first instruction to be fetched from an instruction set of a static program for execution by the processor, the operation 1216 fetches the second instruction from an instruction set of the processor for execution by the processor if indicated by an execution-based optimization profile.

Figure 26:
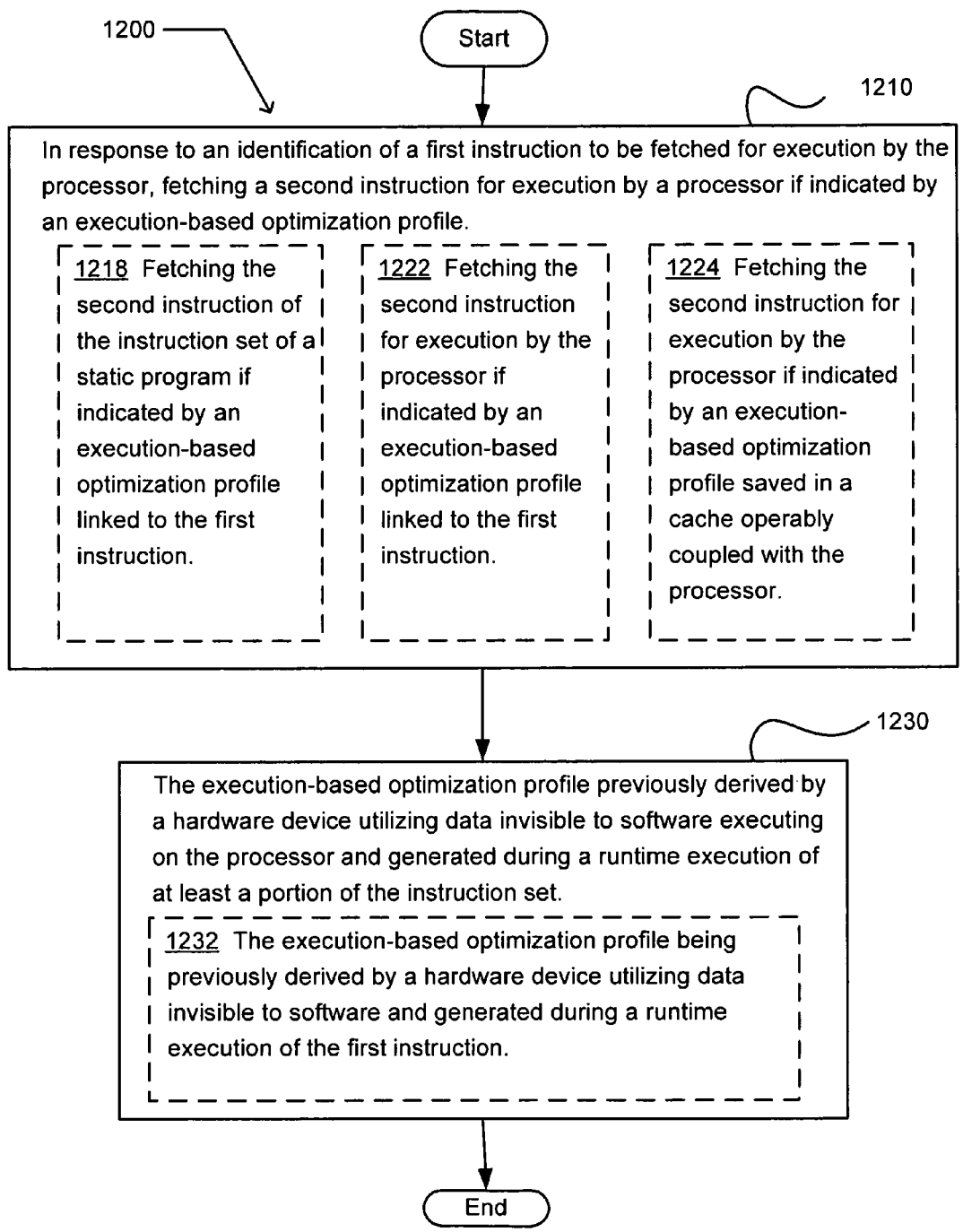
FIG. 26 illustrates another alternative embodiment of the exemplary operational flow of FIG. 24.

FIG. 26 illustrates another alternative embodiment of the exemplary operational flow 1200 of FIG. 24. The substitution operation 1210 may include at least one additional operation. The at least one additional operation may include an operation 1218, an operation 1222, and/or an operation 1224. In response to an identification of a first instruction to be fetched from an instruction set of a static program for execution by the processor, the operation 1218 fetches the second instruction of the instruction set of a static program if indicated by an execution-based optimization profile linked to the first instruction. In response to an identification of a first instruction to be fetched from an instruction set of a static program for execution by the processor, the operation 1222 fetches a second instruction for execution by the processor if indicated by an execution-based optimization profile linked to the first instruction. In response to an identification of a first instruction to be fetched from an instruction set of a static program for execution by the processor, the operation 1224 fetches the second instruction for execution by the processor if indicated by an execution-based optimization profile saved in a cache operably coupled with the processor. The execution-based optimization profile 1230 may include at least one additional execution-based optimization profile, such as an execution-based optimization profile 1232. The execution-based optimization profile 1232 includes an execution-based optimization profile being previously derived by a hardware device utilizing data invisible to software and generated during a runtime execution of the first instruction.

Figure 27:
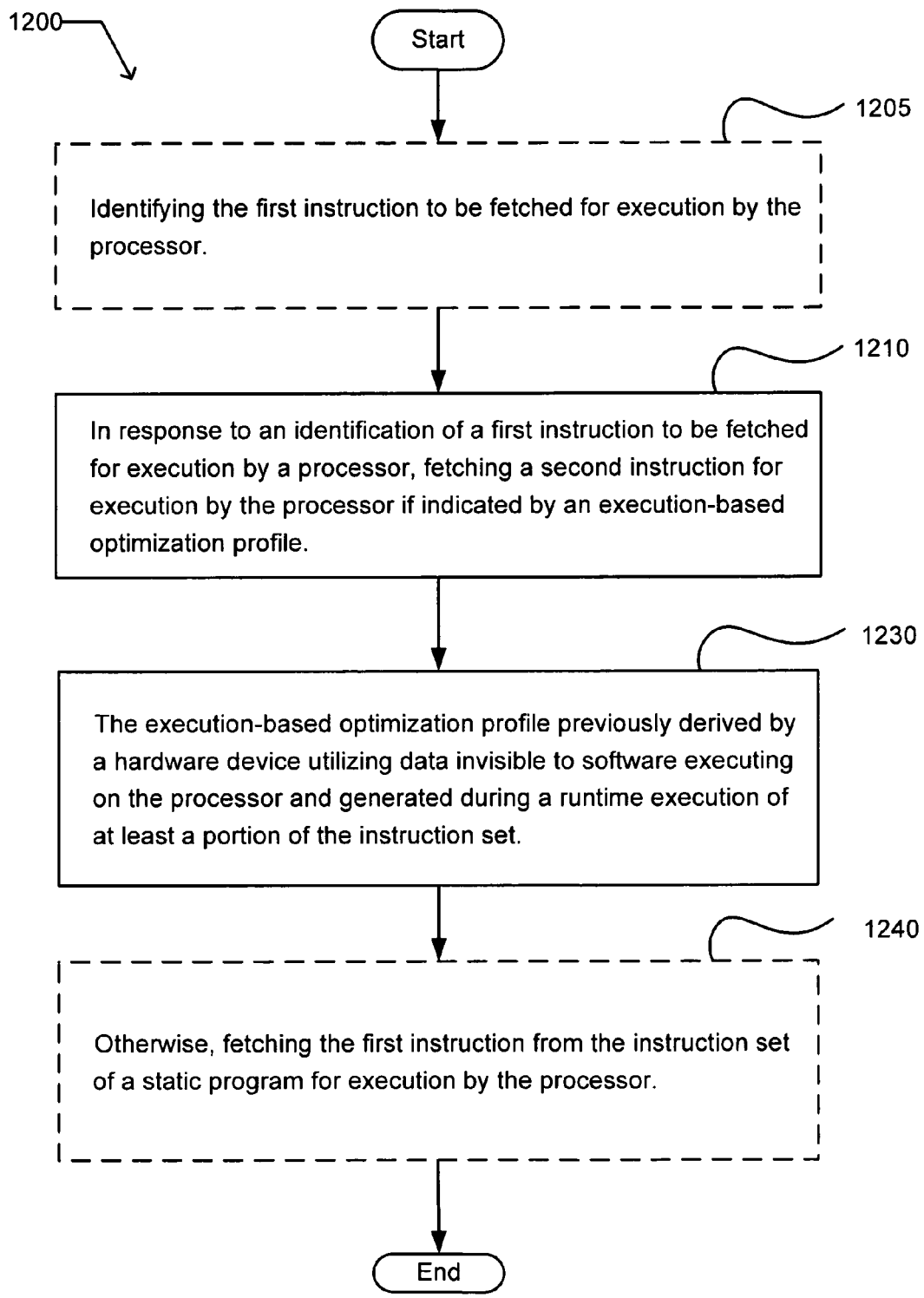
FIG. 27 illustrates a further alternative embodiment of the exemplary operational flow of FIG. 24.

FIG. 27 illustrates a further alternative embodiment of the exemplary operational flow 1200 of FIG. 24. The operational flow may include at least one additional operation. The at least one additional operation may include a fetch next instruction operation 1205, and/or an operation 1240. The fetch next instruction operation 1205 identifies the first instruction to be fetched for execution by the processor. If fetching a second instruction for execution by the processor is not indicated by the execution-based optimization profile, the operation 1240 fetches the first instruction from the instruction set of a static program for execution by the processor.

Figure 28:
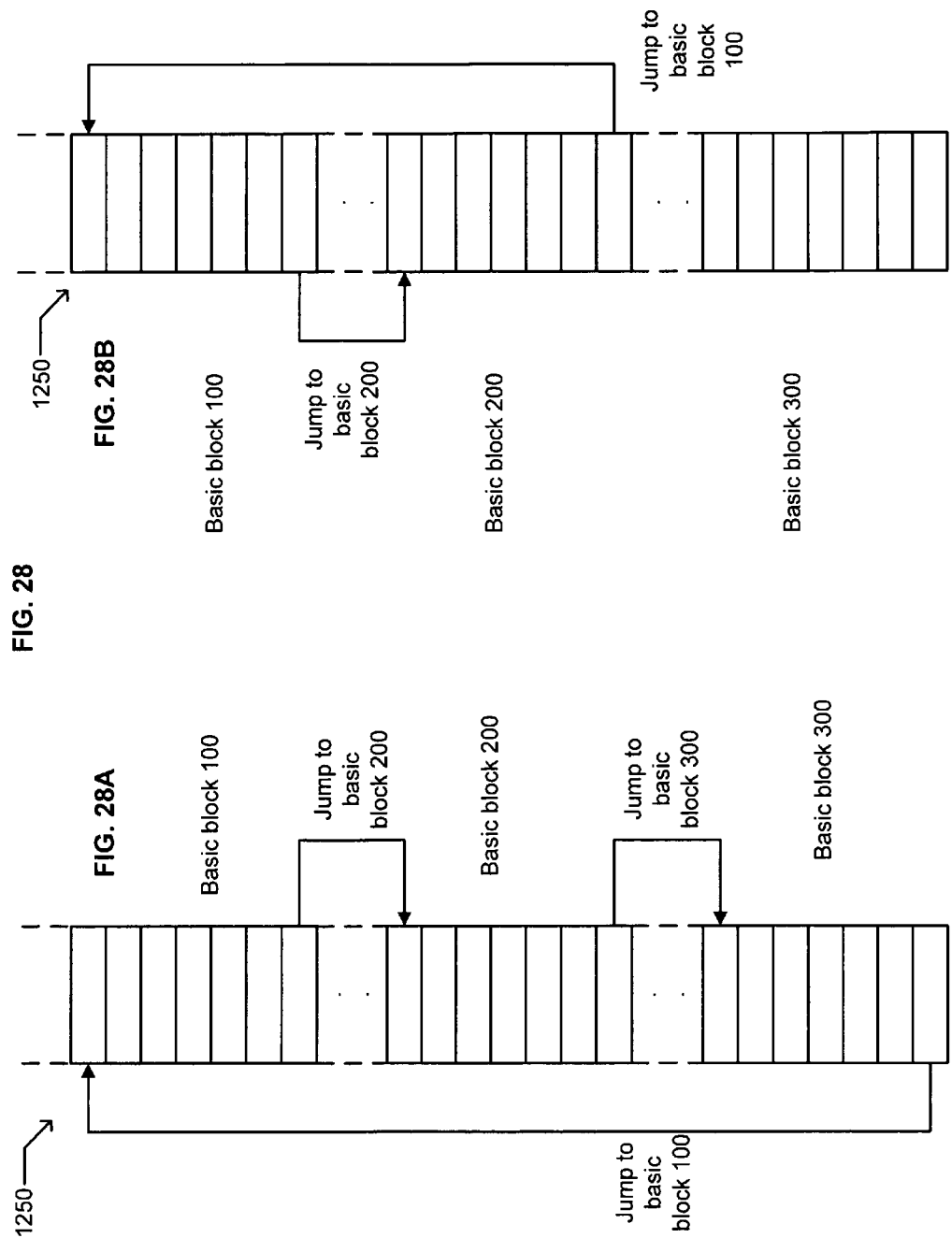
FIG. 28 illustrates an alternative embodiment of the exemplary operational flow of FIG. 24, and includes FIGS. 28A and 28B.

FIG. 28 illustrates an alternative embodiment of the exemplary operational flow 1200 of FIG. 24, and includes FIGS. 28A and 28B. FIG. 28A illustrates an instruction group 1250, which includes a basic block 100, a basic block 200, and a basic block 300. The execution sequence of the instruction group includes a jump from the last instruction of the basic block 100 to the first instruction of the basic block 200, a jump from the last instruction of the basic block 200 to the first instruction of the basic block 300, and a jump from the last instruction of the basic block 300 to the first instruction of the basic block 100 until a condition is met.

FIG. 28B illustrates a modification of the instruction group 1250 in response to a hardware-generated and historically-based execution-optimization strategy. For example, the optimization strategy may have been created in response to data collected from a processor indicating that a result produced by execution of the basic block 300 is never read. In an embodiment, the optimization strategy may include using at least one of the execution-optimization information described in conjunction with FIGS. 2, 4, 17, and 18; a runtime-based optimization profile described in conjunction with FIG. 8; and/or an execution-based optimization profile described in conjunction with FIGS. 9, 23, and 24. If indicated by the optimization strategy, the execution sequence of the instruction group includes a jump from the last instruction of the basic block 100 to the first instruction of the basic block 200, and jump from the last instruction of the basic block 200 to the first instruction of the basic block 100 until a condition is met. The execution of the basic block 300 is omitted or not executed.

Figure 29:
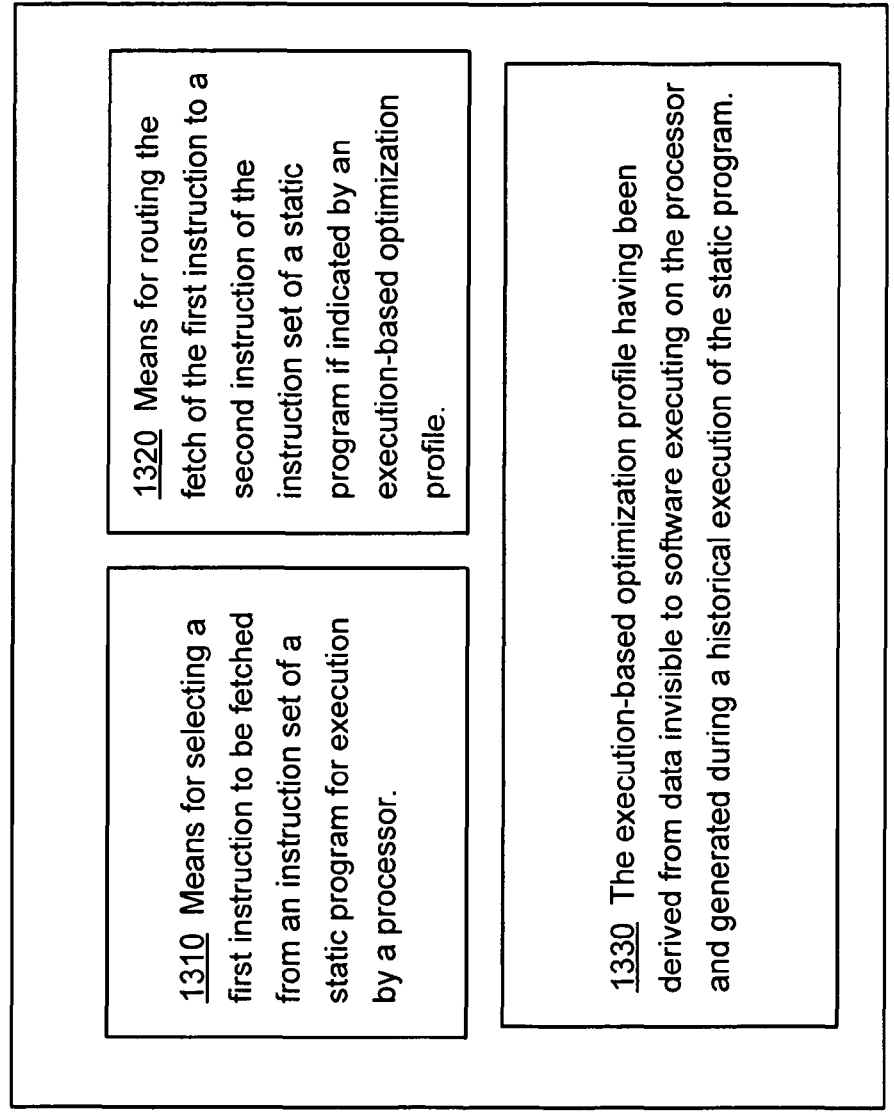
FIG. 29 illustrates a device in which embodiments may be implemented.

FIG. 29 illustrates a device 1300 in which embodiments may be implemented. The device includes means 1310 for selecting a first instruction to be fetched from an instruction set of a static program for execution by a processor. The device also includes means 1320 for routing the fetch of the first instruction to a second instruction of the instruction set of a static program if indicated by an execution-based optimization profile. The execution-based optimization profile 1330 includes an execution-based optimization profile having been derived from data invisible to software and generated during a historical execution of the static program.

Figure 30:
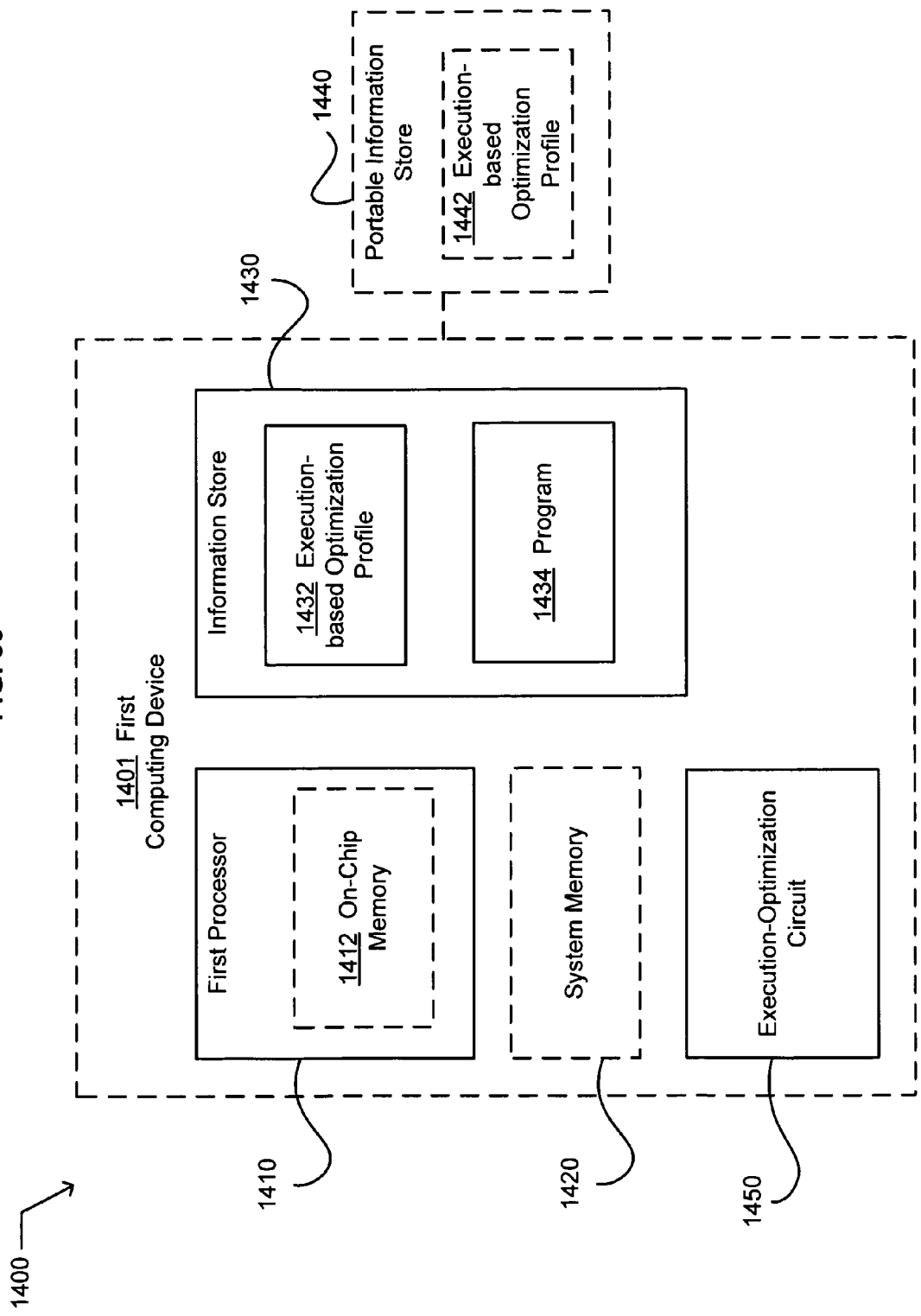
FIG. 30 illustrates a partial view of an exemplary apparatus in which embodiments may be implemented.

FIG. 30 illustrates a partial view of an exemplary apparatus 1400 in which embodiments may be implemented. The apparatus includes a first processor operable to execute a program, an embodiment of which is illustrated as a first processor 1410, an information store, an embodiment of which is illustrated as an information store 1430, and an execution-optimization circuit, an embodiment of which is illustrated as an execution-optimization circuit 1450. In an alternative embodiment, the apparatus may include a system memory 1420 and/or an on-chip memory 1412.

The first processor 1410 is operable to execute a program, illustrated as the program 1434 saved in the information store 1430. The first processor includes a first processor operable to execute an instruction set and/or having a first instruction set architecture. The first processor may include any processing unit, and may be described as a central processing unit that controls operation of a computer, such as for example, the processing unit 120 described in conjunction with FIG. 1.

The information store 1430 includes an information store configured by an execution-based optimization profile, an embodiment of which is illustrated as an execution-based optimization profile 1432. In an embodiment, the information store may be configured by writing bits of data representing the execution-based optimization profile on the information store. In another embodiment, the information store may be configured by flashing bits of data representing the execution-based optimization profile on the information store.

The execution-based optimization profile 1432 includes an execution-based optimization profile that is usable in an execution of the program, and that was created utilizing data collected during a runtime execution of the program by a second processor (not shown) and transparent to software executing on the second processor. For example, in an embodiment, the second processor may include the processor 510 described in conjunction with FIG. 8, and the execution-based optimization profile may have been created as described in conjunction with FIGS. 8 and 9. In an embodiment, the execution-based optimization profile may have another provenance. For example, the execution-based optimization profile may have a provenance that includes a derivation from other information responsive to a runtime execution of the program. In a further embodiment, the execution-based optimization profile may include one or more execution-based optimization profiles described elsewhere in this document.

Figure 31:
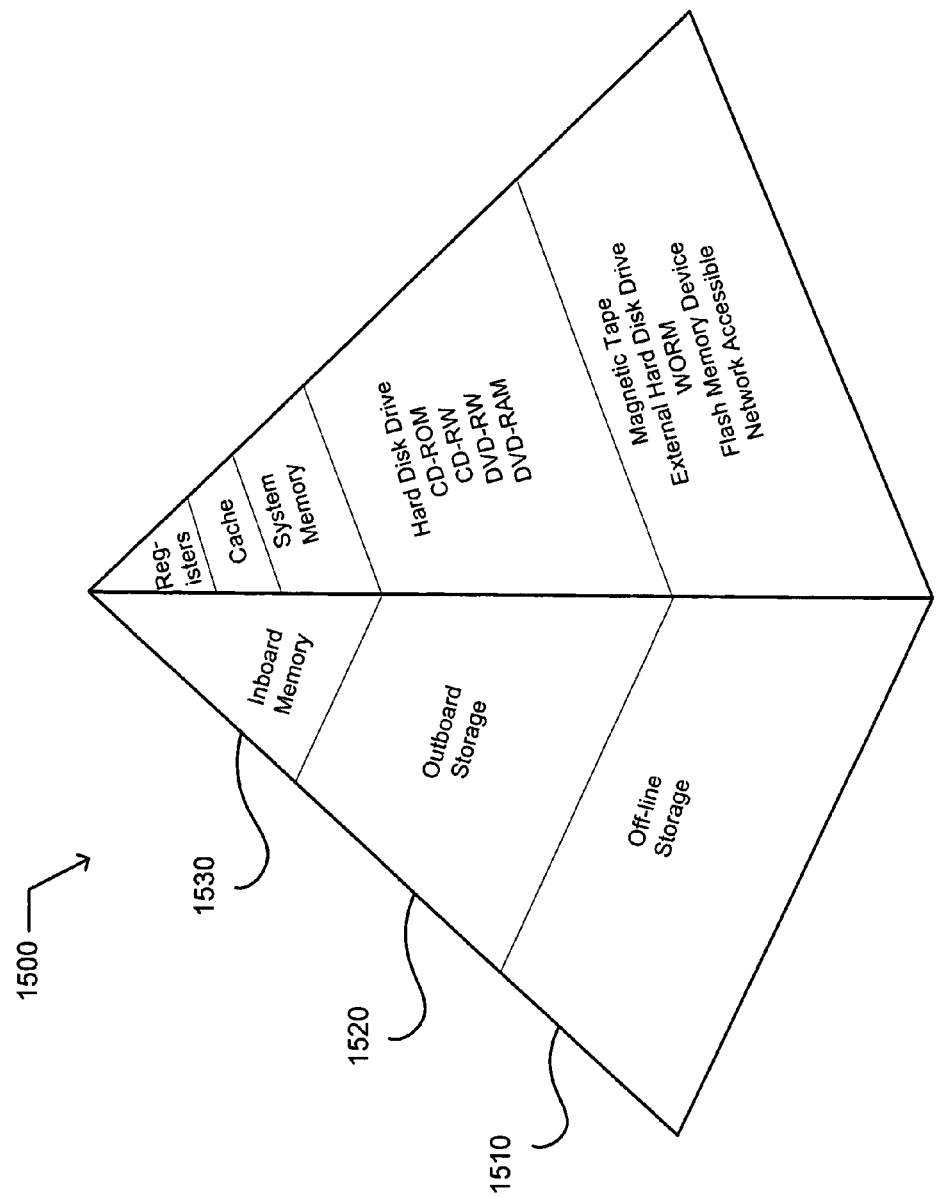
FIG. 31 partially illustrates an embodiment of an information store hierarchy of computer-readable media.

In an embodiment, the information store 1430 may include any suitable computer-readable media. FIG. 31 partially illustrates an embodiment of an information store hierarchy 1500 of computer-readable media. An off-line storage 1510 may include a magnetic tape, an external hard disk drive, a flash memory card, and/or a network accessible information store, such as an Internet site. An outboard storage 1520 may include an internal hard disk drive, such as the hard disk drive 141 and/or a mounted portable storage medium, such as the non-volatile magnetic disk 152, and/or a mounted removable optical media, such as the optical disk 156, all as described in conjunction with FIG. 1. An inboard memory 1530 may include a system memory, such as the system memory 130 or the system memory 1420 described in conjunction with FIGS. 1 and 30 respectively. The inboard memory may also include an on-chip memory, such as a cache and/or a register, illustrated as the on-chip memory 1412 of FIG. 30.

In another embodiment, the information store configured by an execution-based optimization profile includes an information store configured by a portable execution-based optimization profile, such as the execution-based optimization profile 1442 carried by a portable information store 1440 as depicted in FIG. 30. The portable information store may include any form of portable off-line storage 1510 and/or mountable portable outboard storage 1520 described in conjunction with FIG. 31, and/or described in conjunction with FIG. 1. For example, an embodiment of the portable information store may include a flash memory device, such as a flash memory card configured by the execution-based optimization profile. By way of further example, an embodiment of the portable information store may include an optical disk, such as a DVD configured by the execution-based optimization profile.

The execution-optimization circuit 1450 includes an execution-optimization circuit operable to alter an execution of the program 1434 by the first processor 1410 in response to the execution-based optimization profile 1432. In an embodiment, the first processor operable to execute a program includes a first computing device 1401 having a first processor operable to execute a program as shown in FIG. 30.

In a further embodiment, a provenance of the execution-based optimization profile 1432 includes an execution-based optimization profile usable in an execution of the program and that was created utilizing data collected by a hardware device during a runtime execution of the program by a second processor and transparent to software executing on the second processor. The hardware device may include the execution optimization synthesizer 250 described in conjunction with FIG. 2. In another embodiment, the hardware device may include a micro-engine.

In an embodiment, a provenance of the execution-based optimization profile 1432 includes an execution-based optimization profile usable in an execution of the program and generated utilizing data collected during a runtime execution of the program by a second processor and transparent to software executing on the second processor. The data collected during a runtime execution of the program may include data corresponding to at least one of an execution environment, a data object involved in the execution of the program, and/or to an instruction involved in the execution of the program. In another embodiment, a provenance of the execution-based optimization profile includes an execution-based optimization profile that is usable in an execution of the program and that was created utilizing data collected during a runtime execution of the program by a second computing device (not shown) having a second processor and transparent to software executing on the second processor. In a further embodiment, a provenance of the execution-based optimization profile includes an execution-based optimization profile usable in an execution of the program and that was created by an entity that utilized data collected during a runtime execution of the program by a second processor and transparent to software executing on the second processor. The entity may include a real entity, such as a human or a person, a legal entity, such as a corporation or labor union, or a fictional entity, such as a company or partnership. In an embodiment, an entity may create the execution-based optimization profile by operating, controlling, possessing, and/or otherwise having a nexus with the creation of the execution-based optimization profile.

In an embodiment, the execution-optimization circuit 1450 of FIG. 30 includes an execution-optimization circuit operable to alter an execution of an instruction of the program by the first processor in response to the execution-based optimization profile. In another embodiment, the execution-optimization circuit includes an execution-optimization circuit operable to alter an environment of the program execution by the first processor in response to the execution-based optimization profile. In an embodiment, the execution-optimization circuit includes an execution-optimization circuit operable to alter a context of the program execution by the first processor in response to the execution-based optimization profile. In a further embodiment, the execution-optimization circuit includes an execution-optimization circuit operable to at least one of initiate, activate, cause, facilitate, accomplish, and/or achieve an alteration of an execution of the program by the first processor in response to the execution-based optimization profile. In another embodiment, the execution-optimization circuit includes an execution-optimization circuit operable to alter at least one of a memory, a data object storage schema, and/or a data object management schema corresponding to an execution of the program by the first processor in response to the execution-based optimization profile. The memory may include at least one of a cache and/or a register. In a further embodiment, the execution-optimization circuit includes an execution-optimization circuit operable to receive at least a portion the execution-based optimization profile and to alter an execution of the program by the first processor in response to the execution-based optimization profile. For example, the execution-optimization circuit may receive at least a portion the execution-based optimization profile from the information store 1430 and/or the portable information store 1440.

Figure 32:
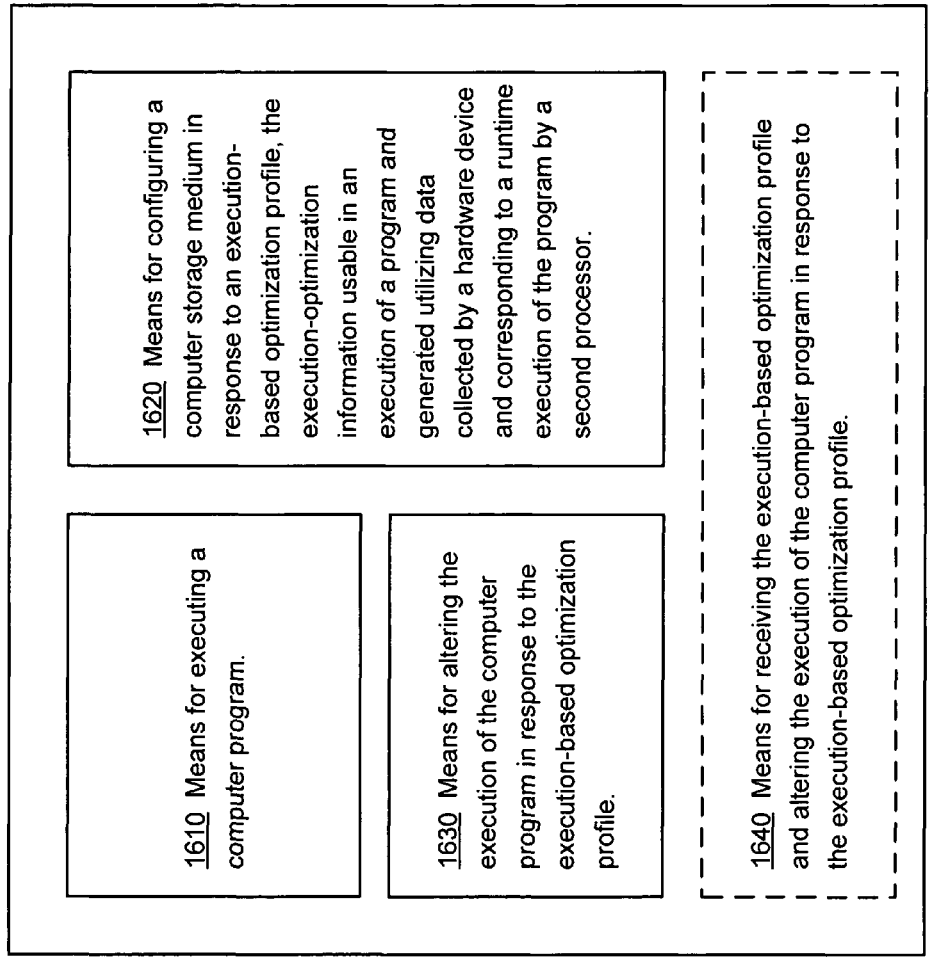
FIG. 32 illustrates a partial view of an embodiment of a device in which embodiments may be implemented.

FIG. 32 illustrates a partial view of an embodiment of a device 1600 in which embodiments may be implemented. The device includes means 1610 for executing a computer program. The device also includes means 1620 for configuring a computer storage medium in response to an execution-based optimization profile. The execution-optimization information is usable in an execution of a program and was generated utilizing data collected by a hardware device and corresponding to a runtime execution of the program by a second processor. In an embodiment, the execution-optimization information was generated utilizing data collected by an evaluation entity utilizing a hardware device and corresponding to a runtime execution of the program by a second processor. The device further includes means 1630 for altering the execution of the computer program in response to the execution-based optimization profile.

In another embodiment, the device 1600 includes means 1640 for receiving the execution-based optimization profile and altering the execution of the computer program in response to the execution-based optimization profile.

Figure 33:
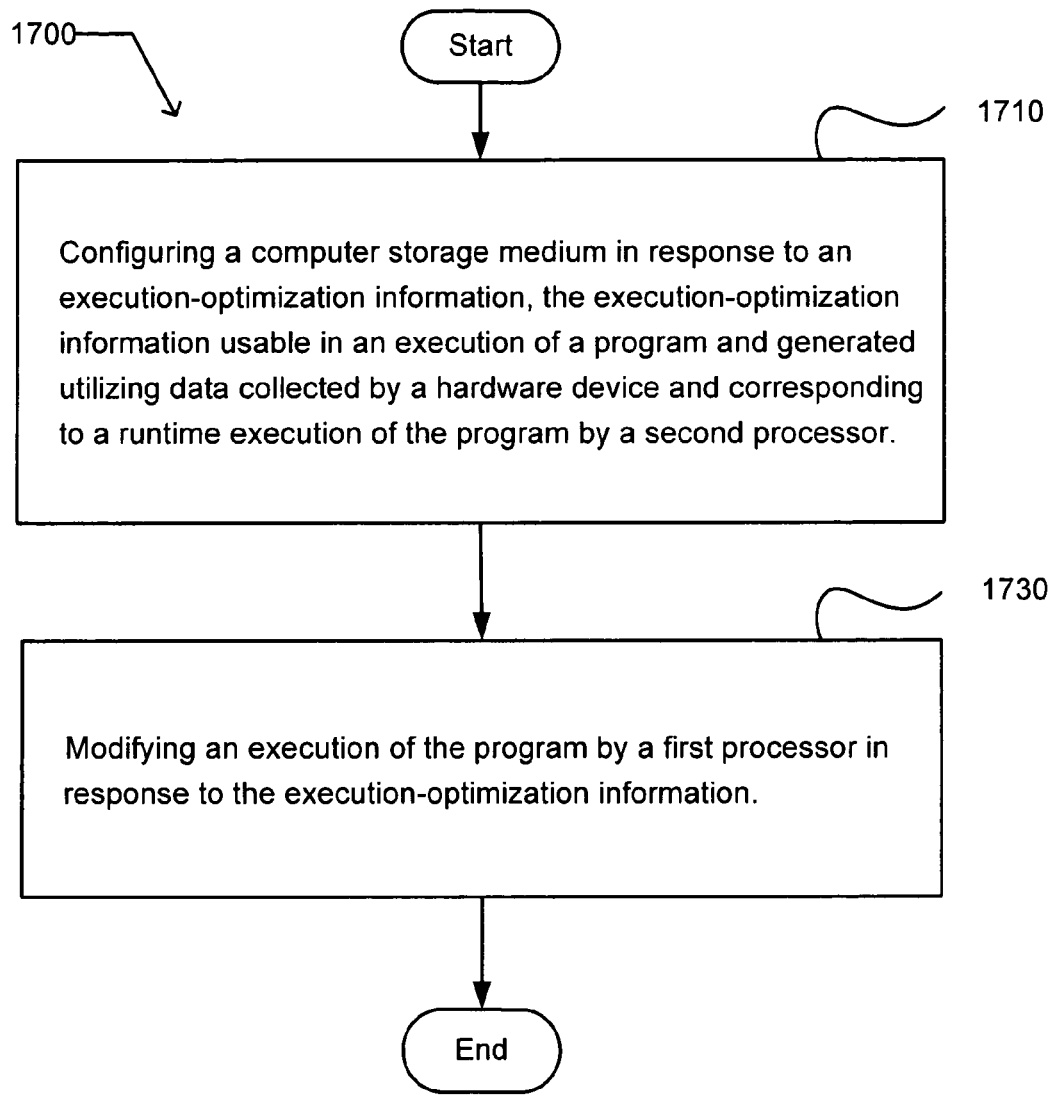
FIG. 33 illustrates an exemplary operational flow.

FIG. 33 illustrates an exemplary operational flow 1700. After a start operation, the operational flow moves to an arrangement operation 1710. The arrangement operation configures a computer storage medium in response to an execution-optimization information. The execution-optimization information is usable in an execution of a program and was generated utilizing data collected by a hardware device and corresponding to a runtime execution of the program by a second processor. An improvement operation 1730 modifies an execution of the program by a first processor in response to the execution-optimization information. The operational flow then moves to an end operation.

Figure 34:
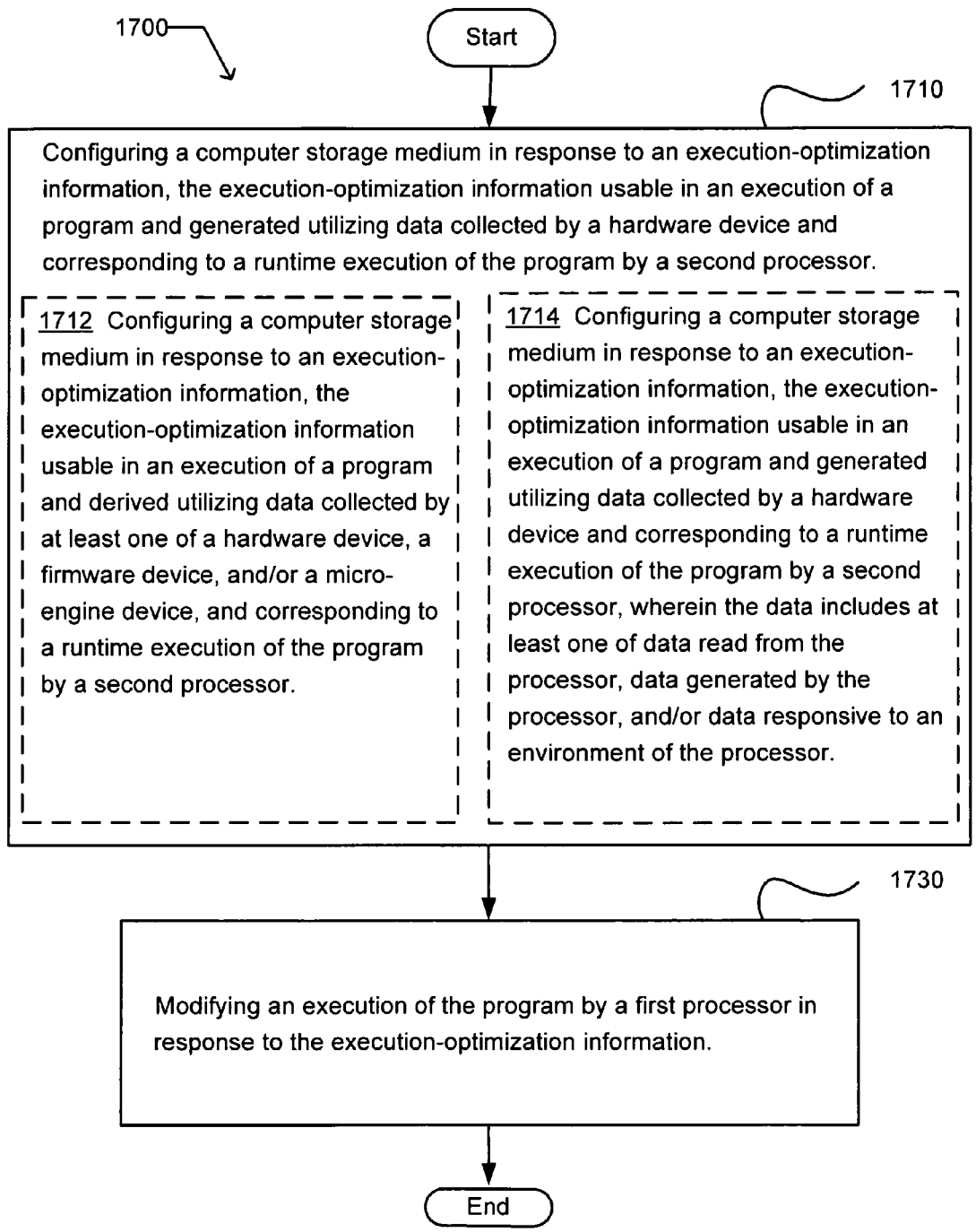
FIG. 34 illustrates an alterative embodiment of the exemplary operational flow of FIG. 33.

FIG. 34 illustrates an alterative embodiment of the exemplary operational flow 1700 of FIG. 33. The arrangement operation 1710 may include at least one additional operation. The at least one additional operation may include an operation 1712, and/or an operation 1714. The operation 1712 includes configuring a computer storage medium in response to an execution-optimization information. The execution-optimization information is usable in an execution of a program and was derived utilizing data collected by at least one of a hardware device, a firmware device, and/or a micro-engine device, and corresponding to a runtime execution of the program by a second processor. The operation 1714 includes configuring a computer storage medium in response to an execution-optimization information. The execution-optimization information is usable in an execution of a program and was generated utilizing data collected by a hardware device and corresponding to a runtime execution of the program by a second processor, wherein the data includes at least one of data read from the processor, data generated by the processor, and/or data responsive to an environment of the processor.

Figure 35:
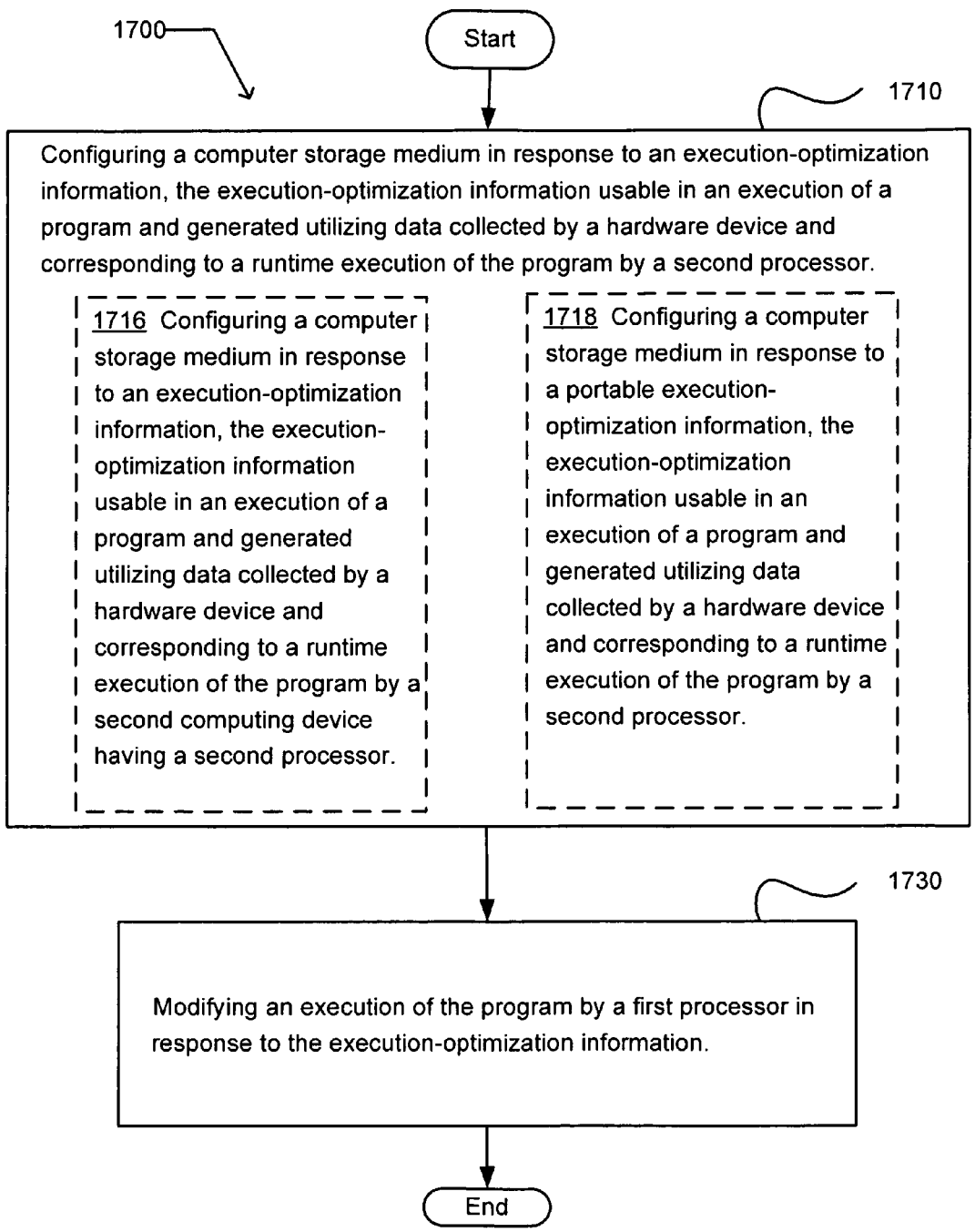
FIG. 35 illustrates another embodiment of the exemplary operational flow of FIG. 33.

FIG. 35 illustrates another embodiment of the exemplary operational flow 1700 of FIG. 33. The arrangement operation 1710 may include at least one additional operation. The at least one additional operation may include an operation 1716, and/or an operation 1718. The operation 1716 includes configuring a computer storage medium in response to an execution-optimization information. The execution-optimization information is usable in an execution of a program and was generated utilizing data collected by a hardware device and corresponding to a runtime execution of the program by a second computing device having a second processor. The operation 1718 includes configuring a computer storage medium in response to a portable execution-optimization information. The execution-optimization information being usable in an execution of a program and generated utilizing data collected by a hardware device and corresponding to a runtime execution of the program by a second processor.

Figure 36:
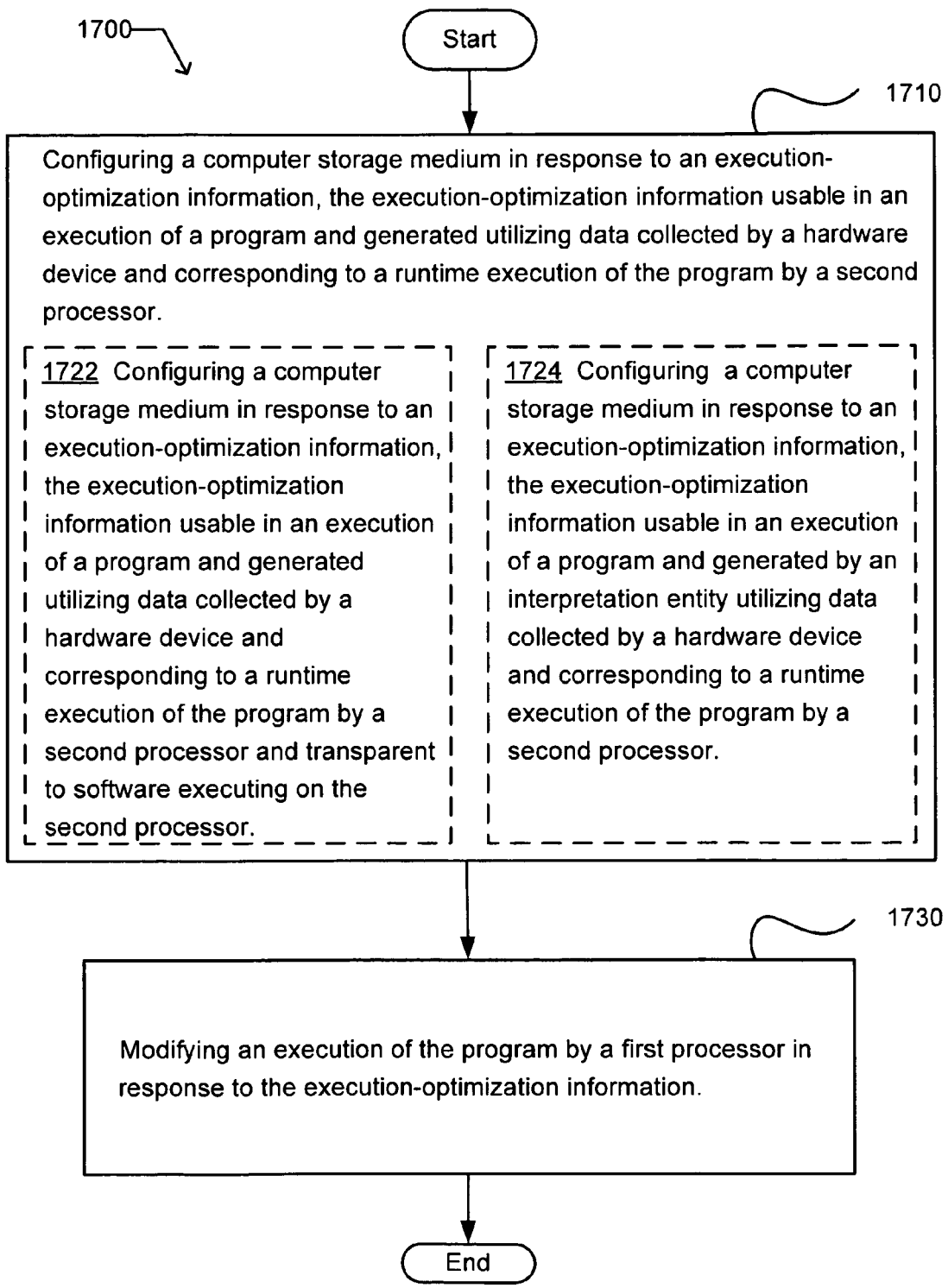
FIG. 36 illustrates a further embodiment of the exemplary operational flow of FIG. 33.

FIG. 36 illustrates a further embodiment of the exemplary operational flow 1700 of FIG. 33. The arrangement operation 1710 may include at least one additional operation. The at least one additional operation may include an operation 1722, and/or an operation 1724. The operation 1722 includes configuring a computer storage medium in response to an execution-optimization information. The execution-optimization information is usable in an execution of a program and was generated utilizing data collected by a hardware device, corresponding to a runtime execution of the program by a second processor, and transparent to software executing on the second processor. The operation 1724 includes configuring a computer storage medium in response to an execution-optimization information. The execution-optimization information being usable in an execution of a program and generated by an interpretation entity utilizing data collected by a hardware device and corresponding to a runtime execution of the program by a second processor.

Figure 37:
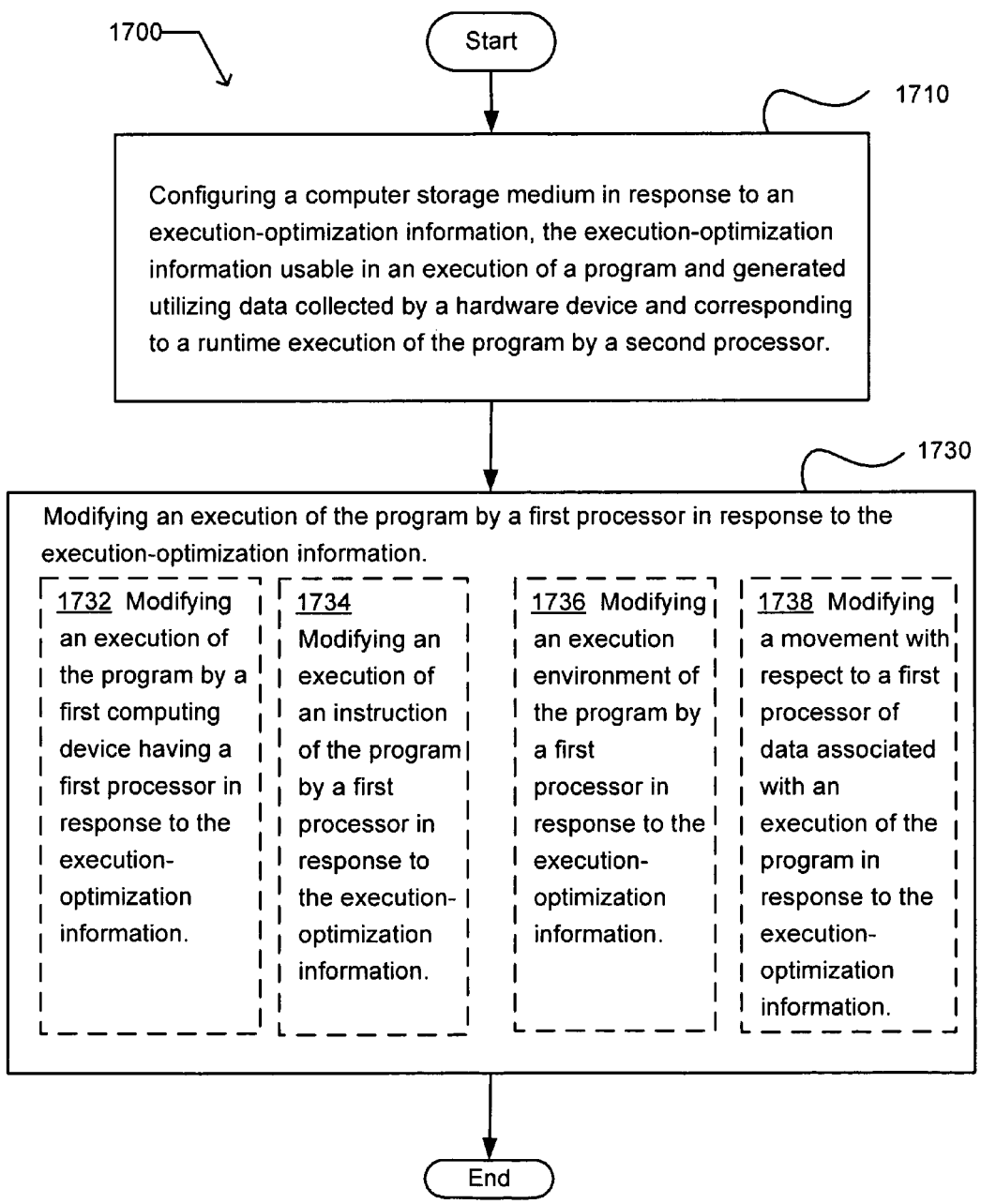
FIG. 37 illustrates another embodiment of the exemplary operational flow of FIG. 33.

FIG. 37 illustrates another embodiment of the exemplary operational flow 1700 of FIG. 33. The improvement operation 1730 may include at least one additional operation. The at least one additional operation may include an operation 1732, an operation 1734, an operation 1736, and/or an operation 1738. The operation 1732 modifies an execution of the program by a first computing device having a first processor in response to the execution-optimization information. The operation 1734 modifies an execution of an instruction of the program by a first processor in response to the execution-optimization information. The operation 1736 modifies an execution environment of the program by a first processor in response to the execution-optimization information. The operation 1738 modifies a movement with respect to a first processor of data associated with an execution of the program in response to the execution-optimization information. In an embodiment, the movement of data may include a movement of data toward a processor or away from a processor, such as the first processor 1410 of FIG. 30. In a further embodiment, the movement of data may include a movement of data along the information store hierarchy 1500 of computer-readable media of FIG. 31. For example, in an embodiment, data may be moved directly from an instance of the outboard storage 1520 to a cache of the inboard memory 1530 without residing in system memory.

Figure 38:
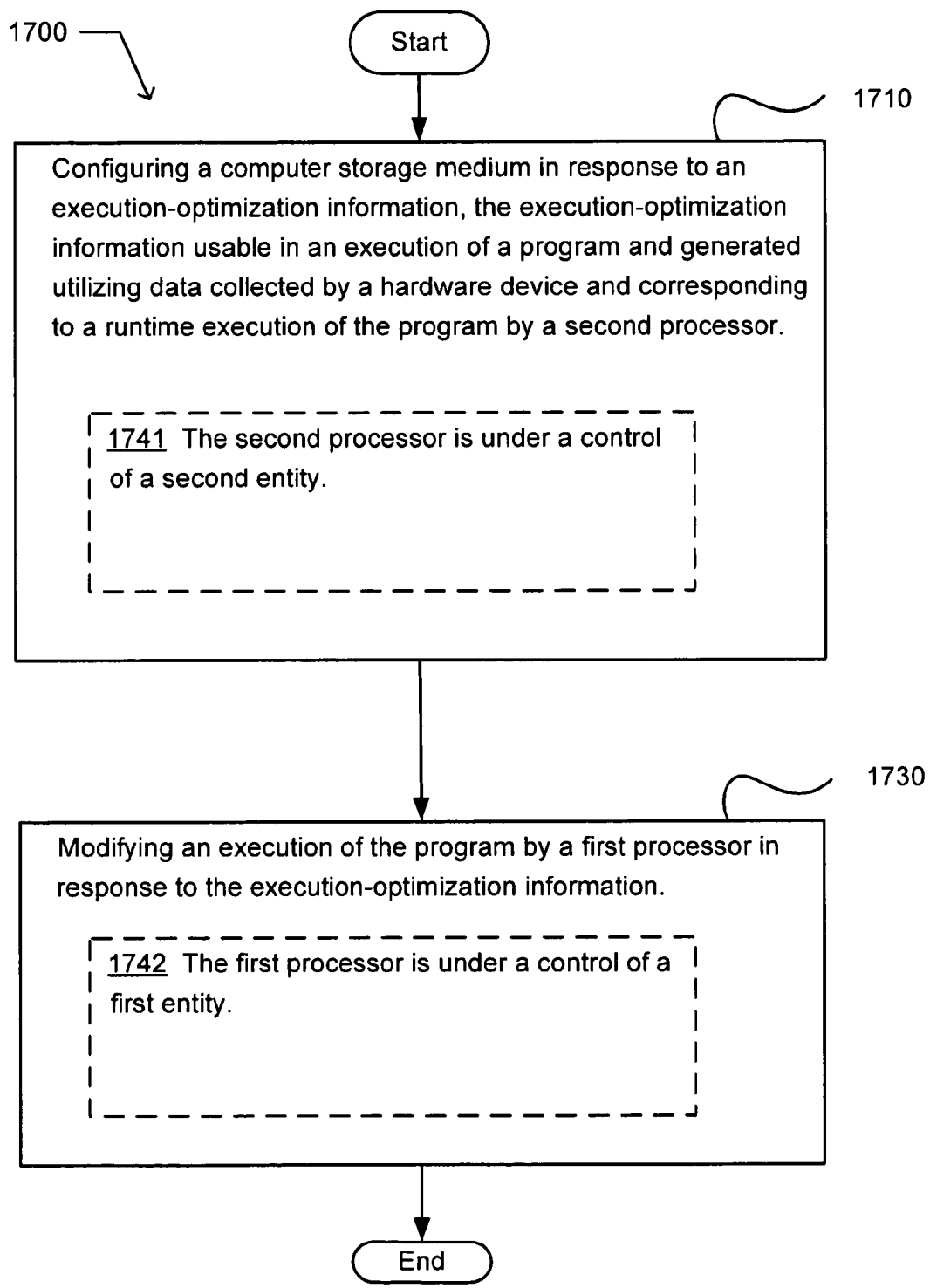
FIG. 38 illustrates a further embodiment of the exemplary operational flow of FIG. 33.

FIG. 38 illustrates a further embodiment of the exemplary operational flow 1700 of FIG. 33. In an embodiment, the second processor is under a control of a second entity 1741, and/or the first processor is under a control of a first entity 1742.

Figure 39:
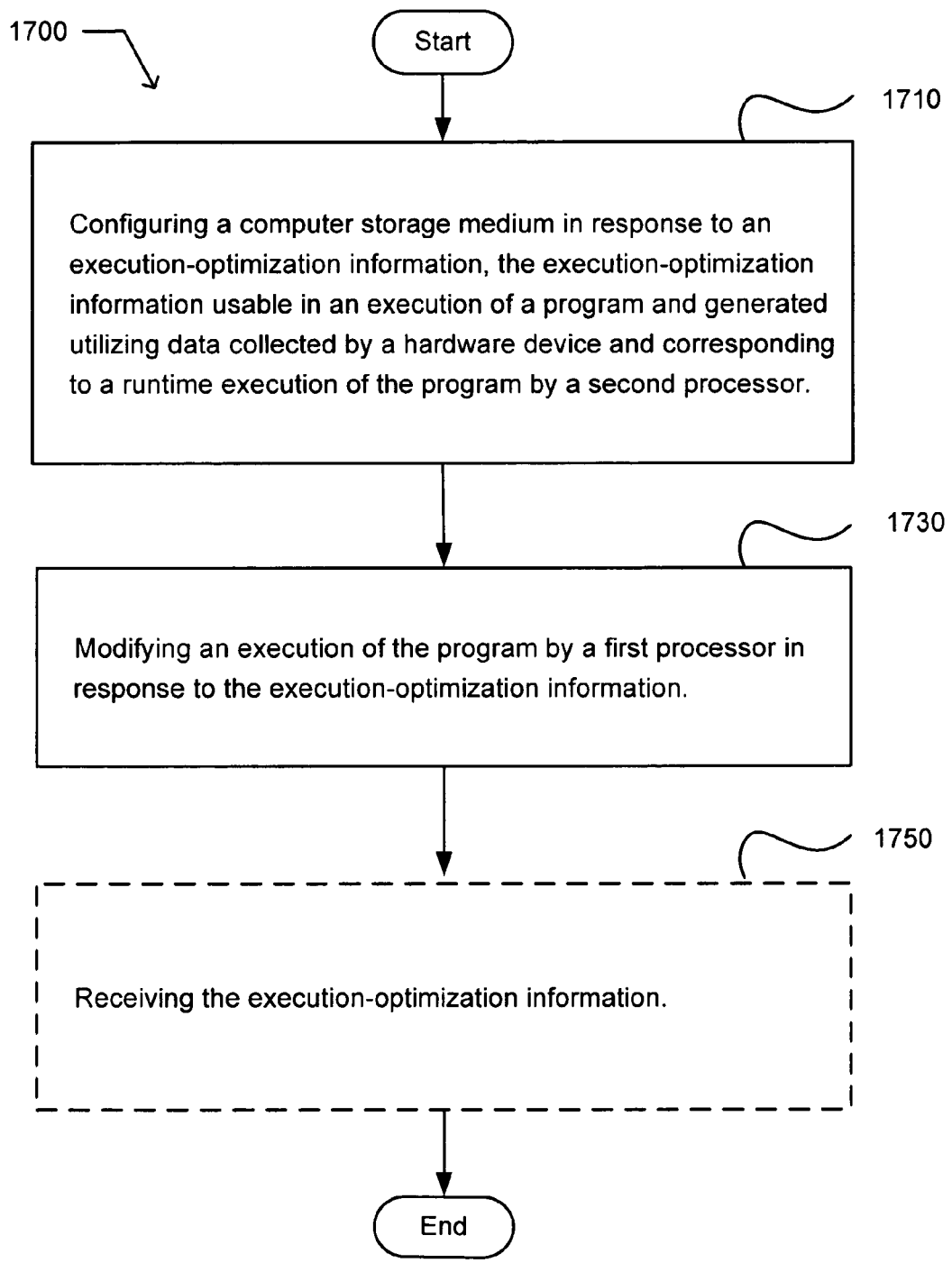
FIG. 39 illustrates another embodiment of the exemplary operational flow of FIG. 33.

FIG. 39 illustrates another embodiment of the exemplary operational flow 1700 of FIG. 33. In an embodiment, the operational flow 1700 includes an acquisition operation 1750 that receives the execution-optimization information. For example, the receiving the execution-optimization information may include receiving the execution-optimization information 1432 from the information store 1430 as described in conjunction with FIG. 30. In another example, the receiving an execution-optimization information may include receiving the execution optimization information 1442 from the portable information store 1440 described in conjunction with FIG. 30. By way of further example, the execution-optimization information may be received over a network from a remote computing device, such from a server site over the Internet.

FIG. 40 illustrates an exemplary apparatus 1800 in which embodiments may be implemented. The apparatus includes a computer-readable medium 1802 encoded with an execution-based optimization profile 1804. The execution-based optimization profile includes an execution-based optimization profile usable during an execution of a computer program by a first processor and derived by a hardware device utilizing data generated during a runtime execution of the computer program by a second processor.

An alternative embodiment includes an execution-based optimization profile 1806 usable during an execution of a computer program by a first processor and derived by a hardware device utilizing data generated during a runtime execution of the computer program by a second processor and transparent to software executing on the second processor. In another embodiment, the computer-readable medium 1802 includes a computer storage medium 1810. In a further embodiment, the computer storage medium may include a transportable computer storage medium 1812, or a portable computer storage medium 1814. In an embodiment, the computer-readable medium includes a computer-readable communications medium 1820.

Figure 41:
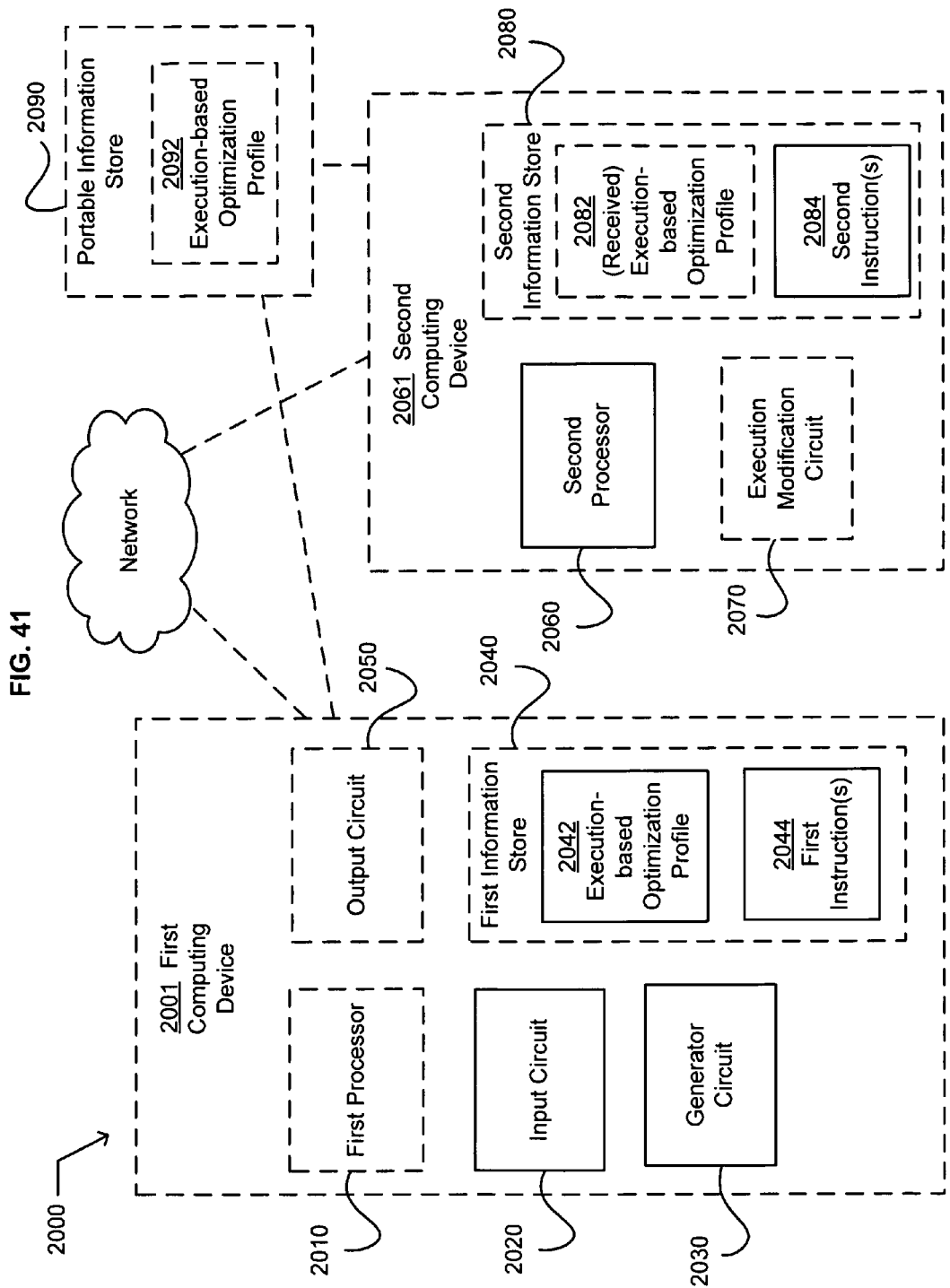
FIG. 41 illustrates a partial view of an exemplary device in which embodiments may be implemented.

FIG. 41 illustrates a partial view of an exemplary device 2000 in which embodiments may be implemented. The device includes an input circuit 2020 and a generator circuit 2030. The input circuit includes an input circuit for receiving data corresponding to a runtime execution of a first instruction 2044 by a first processor 2010 having a first architecture. The generator circuit includes a generator circuit for creating an execution-based optimization profile 2042 useable in an execution of a second instruction by a second processor having a second architecture.

In an embodiment, the input circuit 2020 and the generator circuit 2030 may be associated with a processor, illustrated as a first processor 2010. The first processor may include any processor, such as for example, the processing unit 120 described in conjunction with FIG. 1. In another embodiment, a computing device, illustrated as a first computing device 2001, may include at least one of the input circuit, the generator circuit, and/or the first processor. The first computing device may include any computing device, such as for example, the computing device 110 described in conjunction with FIG. 1. The first computing device may include a first information store 2040 and/or an output circuit 2050. The first information store may be configured by an execution-based optimization profile 2042 and/or a first instruction(s) 2044.

In a further embodiment, another computing device, such as a second computing device 2061, may include the input circuit 2020 and the generator circuit 2030 (the inclusion is not illustrated in FIG. 41). The second computing device may include any computing device, such as for example, the computing device 110 described in conjunction with FIG. 1. The second computing device may also include at least one of a second processor 2060, and/or a second information store 2080. The second information store may be configured by an execution-based optimization profile 2082 and/or a second instruction(s) 2084. In an embodiment, the execution-based optimization profile 2082 may include a received version of the execution-based optimization profile 2042. The received version of the execution-based optimization profile 2042 may include a version of the execution-based optimization profile received from the first computing device 2001 via a network, such as the Internet, or may be a received from a portable information store 2090 configured by a portable execution-based optimization profile 2092. In another embodiment, the execution-based optimization profile 2082 may include a locally generated execution-based optimization profile, such as for example, when second computing device includes the generator circuit 2030.

In an embodiment, the first processor 2010 and the second processor 2060 may be formed on a single chip. In another embodiment, the first processor and the second processor may be formed on separate chips. In a further embodiment, the first processor and the second processor may be formed on separate chips and incorporated into separate computing device. In a further embodiment, the first processor and the second processor may be formed on separate chips and incorporated in a single computing device.

In an embodiment, the input circuit 2020 for receiving data corresponding to a runtime execution of a first instruction 2044 by a first processor 2010 having a first architecture includes an input circuit for receiving data corresponding to a runtime execution of a first instruction 2044 by a first processor having a first instruction set architecture. The instruction set architecture is an architectural component of the first processor and may be built into the first processor and/or into a microcode of the first processor. The instruction set architecture may include a programmer visible instruction set that the first processor can execute. The instruction set architecture may include a repertoire of machine language instructions that the first processor can execute. The instruction set may include a machine instruction set, such as the x86 instruction set. The instruction set may include a compilable or interpretable instruction set, such as Java bytecode. In another embodiment, the input circuit for receiving data corresponding to a runtime execution of a first instruction by a first processor having a first architecture includes an input circuit for receiving data corresponding to a runtime execution of a first instruction by a first processor having a first microarchitecture. A microarchitecture may include a hardware system architecture, which in combination with the instruction set architecture comprises a computer architecture. Processors with a differing microarchitectures may execute the same instruction set architecture. For example, Intel processor chips have various microarchitectures but all execute the x86 instruction set architecture. By way of further example, Intel processor chips and AMD processor chips have differing microarchitectures but both executing the x86 instruction set architecture.

In an embodiment, the input circuit 2020 for receiving data corresponding to a runtime execution of a first instruction by a first processor having a first architecture includes an input circuit for receiving data corresponding to a runtime execution of a first instruction associated with a program by a first processor having a first architecture. In another embodiment, the generator circuit 2030 for creating an execution-based optimization profile useable in an execution of a second instruction 2084 by a second processor 2060 having a second architecture includes a generator circuit for creating an execution-based optimization profile useable in an execution of a second instruction associated with the program by a second processor having a second architecture.

In a further embodiment, the input circuit 2020 for receiving data corresponding to a runtime execution of a first instruction by a first processor having a first architecture includes an input circuit for receiving data corresponding to a runtime execution of a first instruction associated with an application by a first processor having a first architecture. In another embodiment, the input circuit for receiving data corresponding to a runtime execution of a first instruction by a first processor having a first architecture includes an input circuit for receiving data transparent to software executing on the first processor and corresponding to a runtime execution of a first instruction by the first processor having a first architecture. A runtime execution of a first instruction may include a runtime execution of a compiled first instruction and/or a runtime execution of an interpreted first instruction. For example, a runtime execution of an interpreted first instruction may include a runtime execution of an interpreted first Java bytecode instruction.

In an embodiment, the generator circuit 2030 for creating an execution-based optimization profile useable in an execution of a second instruction 2084 by a second processor 2060 having a second architecture includes a generator circuit for creating an execution-based optimization profile useable in an execution of a second instruction by a second processor 2060 having a second instruction set architecture. In another embodiment, the generator circuit for creating an execution-based optimization profile useable in an execution of a second instruction by a second processor having a second architecture includes a generator circuit for creating an execution-based optimization profile useable in an execution of a second instruction associated by a second processor having a second microarchitecture. In a further embodiment, the generator circuit for creating an execution-based optimization profile useable in an execution of a second instruction by a second processor having a second architecture includes a generator circuit for creating an execution-based optimization profile useable in an execution of a second instruction by a second processor having a second architecture, the second instruction being at least substantially similar to the first instruction 2044.

In an embodiment, the generator circuit 2030 for creating an execution-based optimization profile useable in an execution of a second instruction by a second processor having a second architecture includes a generator circuit for creating an execution-based optimization profile useable in an execution of a second instruction by a second processor having a second architecture, the second instruction being at least substantially different from the first instruction. In another embodiment, the generator circuit for creating an execution-based optimization profile useable in an execution of a second instruction by a second processor having a second architecture includes a generator circuit for creating an execution-based optimization profile useable in an execution of a second instruction by a second processor having a second architecture in response to the received data. In a further embodiment, the generator circuit for creating an execution-based optimization profile useable in an execution of a second instruction by a second processor having a second architecture includes a generator circuit for creating an execution-based optimization profile useable in prefetching data in conjunction with an execution of a second instruction by a second processor having a second architecture. In another embodiment, the generator circuit for creating an execution-based optimization profile useable in an execution of a second instruction by a second processor having a second architecture includes a generator circuit for creating an execution-based optimization profile useable in prefetching a third instruction in conjunction with an execution of a second instruction by a second processor having a second architecture.

In an embodiment, the first instruction 2044 includes at least one of a machine-level instruction, a compiled instruction, a compilable instruction, one instruction, at least two instructions, an instruction line, an instruction block, an atomic instruction block, a program, and/or an application. In another embodiment, the first processor 2010 includes an x86 architecture and the second processor 2060 includes a PowerPC architecture. In a further embodiment, the first processor includes an Intel based architecture and the second processor includes an AMD based architecture.

In an embodiment, the device 2000 includes the first information store 2040 configured by the execution-based optimization profile 2042. In another embodiment, the device 2000 includes an output circuit 2050 for broadcasting the execution-based optimization profile. In a further embodiment, the second computing device includes an execution modification circuit 2070. In an embodiment, the execution modification circuit includes an execution modification circuit for modifying an execution of the second instruction 2084 in response to the execution-based optimization profile 2082.

Figure 42:
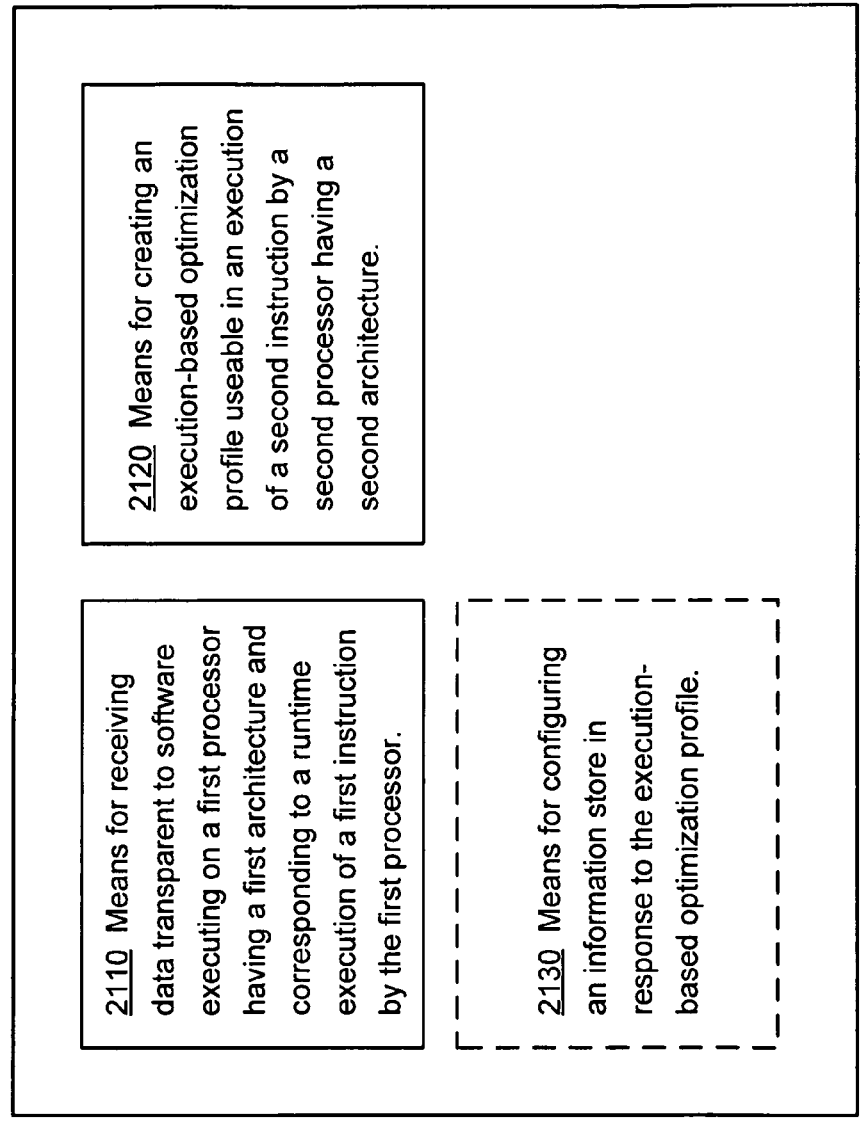
FIG. 42 illustrates a partial view of an exemplary device in which embodiments may be implemented.

FIG. 42 illustrates a partial view of an exemplary device 2100 in which embodiments may be implemented. The device includes means 2110 for receiving data transparent to software executing on a first processor having a first architecture and corresponding to a runtime execution of a first instruction by the first processor. The device also includes means 2120 for creating an execution-based optimization profile useable in an execution of a second instruction by a second processor having a second architecture. In an alternative embodiment, the device includes means 2130 for configuring an information store in response to the execution-based optimization profile.

Figure 43:
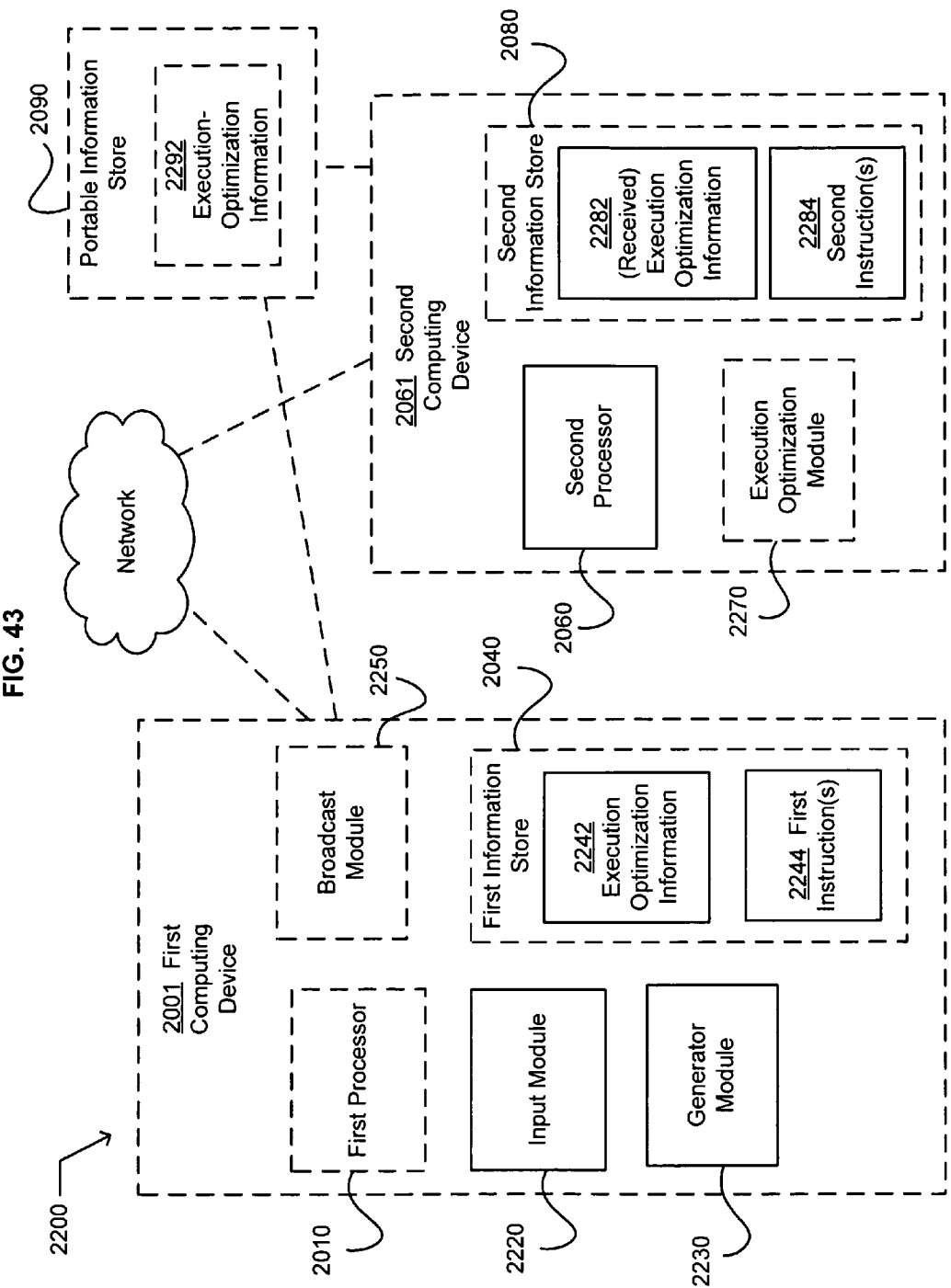
FIG. 43 illustrates a partial view of an exemplary apparatus in which embodiments may be implemented.

FIG. 43 illustrates a partial view of an exemplary apparatus 2200 in which embodiments may be implemented. The apparatus includes an input module 2220 and a generator module 2230. The input module includes an input module operable to receive data transparent to software executing on a first processor 2010 having a first instruction set architecture and corresponding to a runtime execution of a first instruction 2244 by the first processor. The generator module includes a generator module operable to create an execution optimization information 2242 useable in an execution of a second instruction 2284 by a second processor 2060 having a second instruction set architecture.

In an embodiment, the input module 2220 and the generator module 2230 may be associated with a processor, illustrated as the first processor 2010. In another embodiment, a computing device, illustrated as the first computing device 2001, may include at least one of the input module, the generator module, and/or the first processor 2010. The first computing device may include a broadcast module 2250. The first information store 2040 may be configured by an execution optimization profile 2242 and/or a first instruction(s) 2244.

In another embodiment, another computing device, such as the second computing device 2061, may include the input module 2220 and/or the generator module 2230 (the inclusion is not illustrated in FIG. 43). The second computing device may include at least one of the second processor 2060, and/or the second information store 2080. The second information store may be configured by an execution optimization profile 2282 and/or a second instruction(s) 2284. In an embodiment, the execution optimization profile 2282 may include a received version of the execution optimization profile 2242. The received version of the execution optimization profile 2242 may include a version of the execution optimization profile received from the first computing device 2001 via a network, such as the Internet, or may be received from a portable information store 2090 configured by an execution optimization profile 2292. In another embodiment, the execution optimization profile 2282 may include a locally generated execution optimization profile, such as for example, when second computing device includes the generator module 2230.

In an embodiment, the second instruction set architecture of the second processor 2060 is at least substantially different from the first instruction set architecture of the first processor 2010. In a further embodiment, the second instruction set architecture is at least substantially similar to the first instruction set architecture.

In an embodiment, the apparatus 2200 includes a broadcast module 2250 operable to encode a computer-readable signal-bearing medium with the execution optimization information. In another embodiment, the apparatus includes a broadcast module operable to transmit a computer-readable signal-bearing medium encoded with the execution optimization information. In a further embodiment, the apparatus includes an execution optimization module 2270. The execution optimization module includes an execution optimization module operable to optimization an execution of the second instruction 2284 in response to the execution optimization profile 2282.

Figure 44:
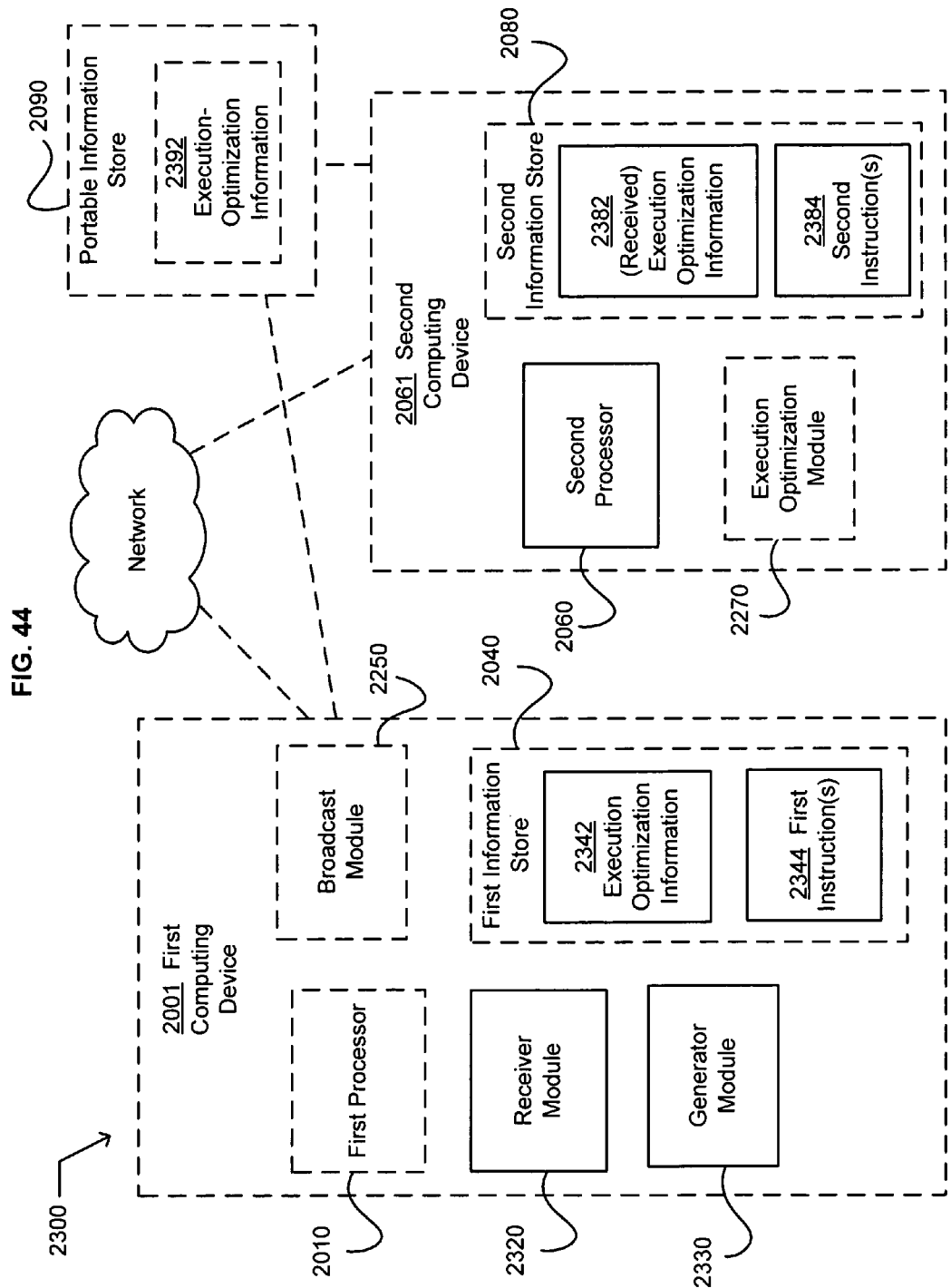
FIG. 44 illustrates a partial view of an exemplary apparatus in which embodiments may be implemented.

FIG. 44 illustrates a partial view of an exemplary apparatus 2300 in which embodiments may be implemented. The apparatus includes a receiver module 2320 and a generator module 2330. The receiver module includes a receiver module operable to acquire data transparent to software executing on a first processor 2010 having a first microarchitecture and corresponding to a runtime execution of a first instruction 2344 by the first processor. The generator module includes a generator module operable to create an execution optimization information useable in an execution of a second instruction 2384 by a second processor 2060 having a second microarchitecture.

In an embodiment, the receiver module 2320 and the generator module 2330 may be associated with a processor, illustrated as the first processor 2010. In another embodiment, a computing device, illustrated as a first computing device 2001, may include at least one of the receiver module, the generator module, and/or the first processor 2010. The first computing device may include the broadcast module 2250. The first information store 2040 may be configured by an execution optimization information 2342 and/or a first instruction(s) 2344.

In another embodiment, another computing device, such as the second computing device 2061, may include the receiver module 2320 and/or the generator module 2330 (the inclusion is not illustrated in FIG. 44). The second computing device may include at least one of the second processor 2060, and/or the second information store 2080. The second information store may be configured by an execution optimization information 2382 and/or a second instruction(s) 2384. In an embodiment, the execution optimization information 2382 may include a received version of the execution optimization information 2342. The received version of the execution optimization information 2342 may include a version of the execution optimization information received from the first computing device 2001 via a network, such as the Internet, or may be received from the portable information store 2090 configured by a portable execution optimization information 2392. In another embodiment, the execution optimization information 2342 may include a locally generated execution optimization information.

In an embodiment, the second microarchitecture of the second processor 2060 is at least substantially different from the first microarchitecture of the first processor 2010. In another embodiment, the second microarchitecture of the second processor is at least substantially similar to the first microarchitecture of the first processor.

In a further embodiment, the apparatus 2300 includes the execution optimization module 2270. The execution optimization module includes an execution optimization module operable to optimization an execution of the second instruction 2384 in response to the execution optimization information 2382.

Figure 45:
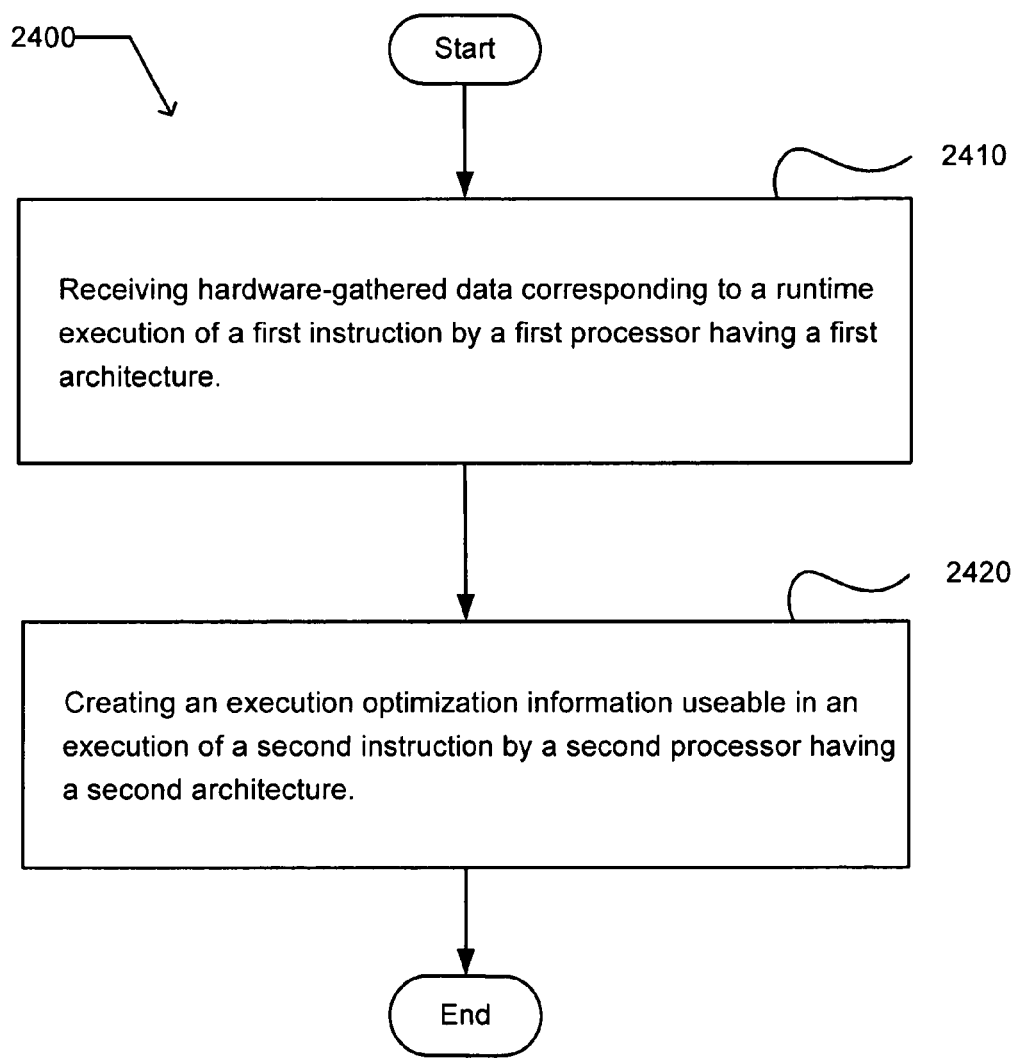
FIG. 45 illustrates an exemplary operational flow.

FIG. 45 illustrates an exemplary operational flow 2400. After a start operation, the operational flow moves to an acquisition operation 2410. The acquisition operation receives hardware-gathered data corresponding to a runtime execution of a first instruction by a first processor having a first architecture. A making operation 2420 creates an execution optimization information useable in an execution of a second instruction by a second processor having a second architecture. The operational flow then moves to an end operation.

Figure 46:
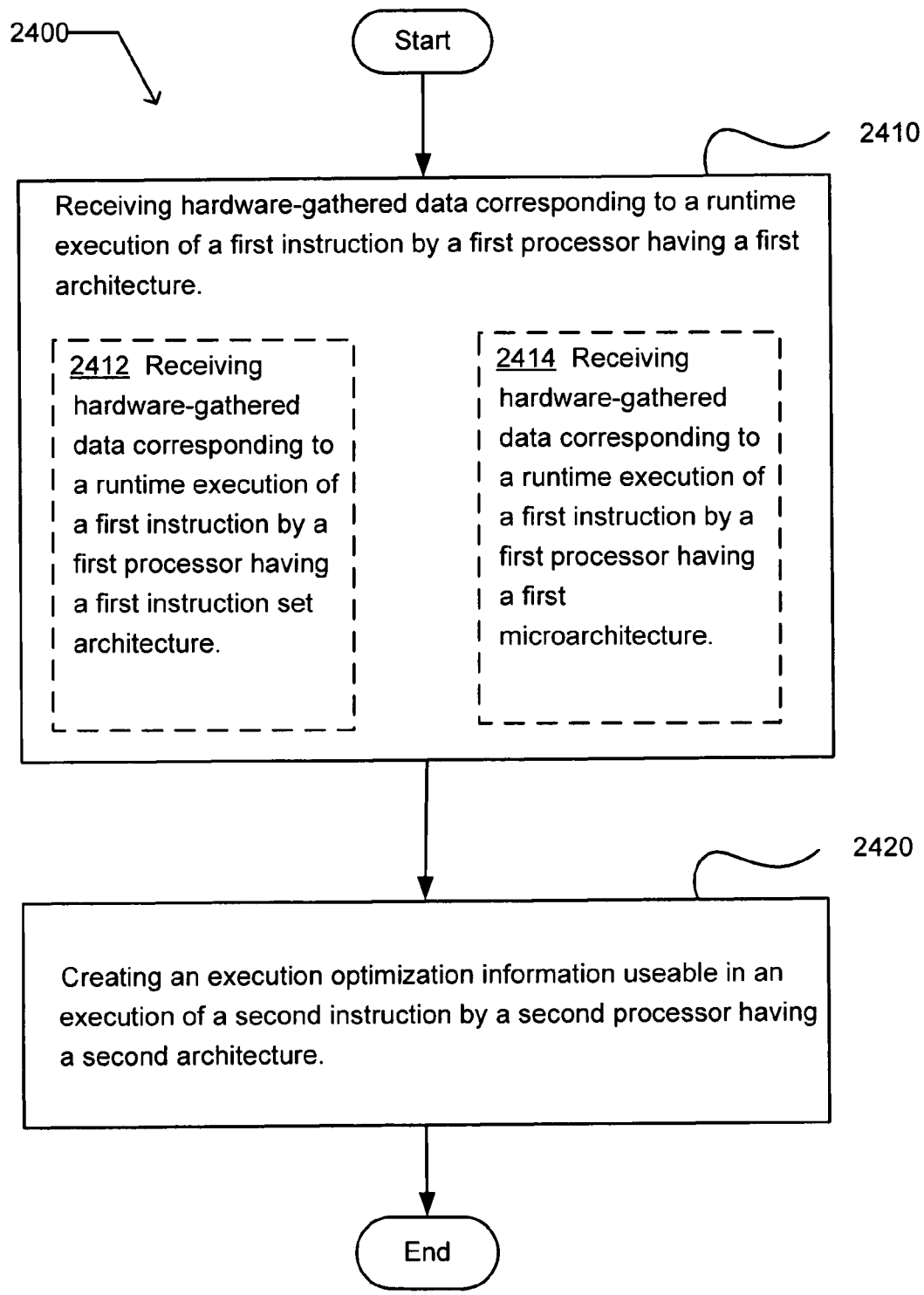
FIG. 46 illustrates an alternative embodiment of the operational flow of FIG. 45.

FIG. 46 illustrates an alternative embodiment of the operational flow 2400 of FIG. 45. The acquisition operation may include at least one additional operation. The at least one additional operation may include an operation 2412 and/or an operation 2414. The operation 2412 receives hardware-gathered data corresponding to a runtime execution of a first instruction by a first processor having a first instruction set architecture. The operation 2414 receives hardware-gathered data corresponding to a runtime execution of a first instruction by a first processor having a first microarchitecture.

Figure 47:
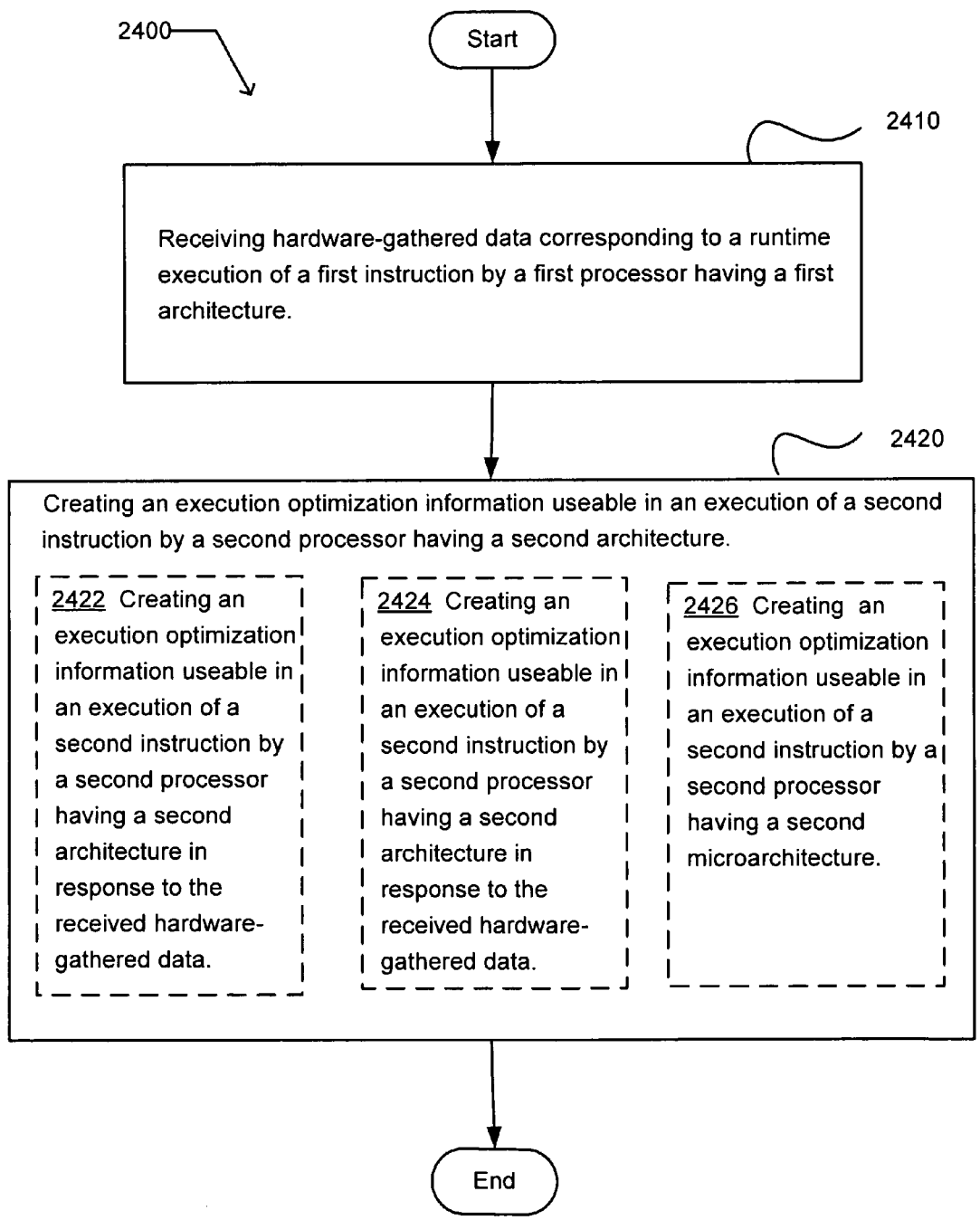
FIG. 47 illustrates another alternative embodiment of the operational flow of FIG. 45.

FIG. 47 illustrates another alternative embodiment of the operational flow 2400 of FIG. 45. The making operation may include at least one additional operation. The at least one additional operation may include an operation 2422, an operation 2424, and/or an operation 2426. The operation 2422 creates an execution optimization information useable in an execution of a second instruction by a second processor having a second architecture in response to the received hardware-gathered data. The operation 2424 creates an execution optimization information useable in an execution of a second instruction by a second processor having a second instruction set architecture in response to the received hardware-gathered data. The operation 2426 creates an execution optimization information useable in an execution of a second instruction by a second processor having a second microarchitecture.

Figure 48:
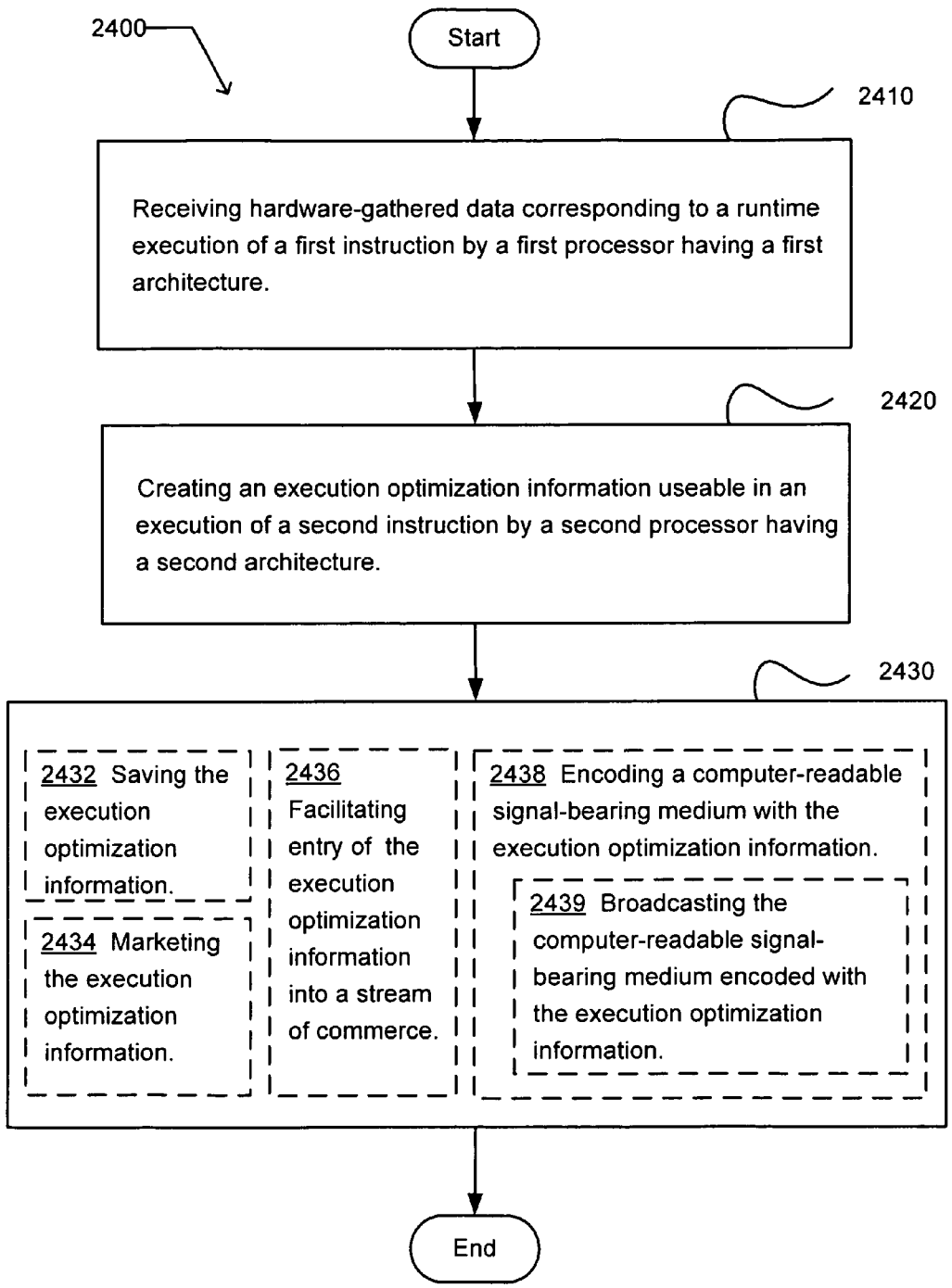
FIG. 48 illustrates a further alternative embodiment of the operational flow of FIG. 45.

FIG. 48 illustrates a further alternative embodiment of the operational flow 2400 of FIG. 45. The operational flow includes an additional operation 2430. The additional operation may include an operation 2432, an operation 2434, an operation 2436, and/or an operation 2438. The operation 2432 saves the execution optimization information. The operation 2434 markets the execution optimization information. The operation 2436 facilitates entry of the execution optimization information into a stream of commerce. The operation 2438 encodes a computer-readable signal-bearing medium with the execution optimization information. The operation 2438 may include at least one additional operation, such as the operation 2439. The operation 2439 broadcasts the computer-readable signal-bearing medium encoded with the execution optimization information.

Figure 49:
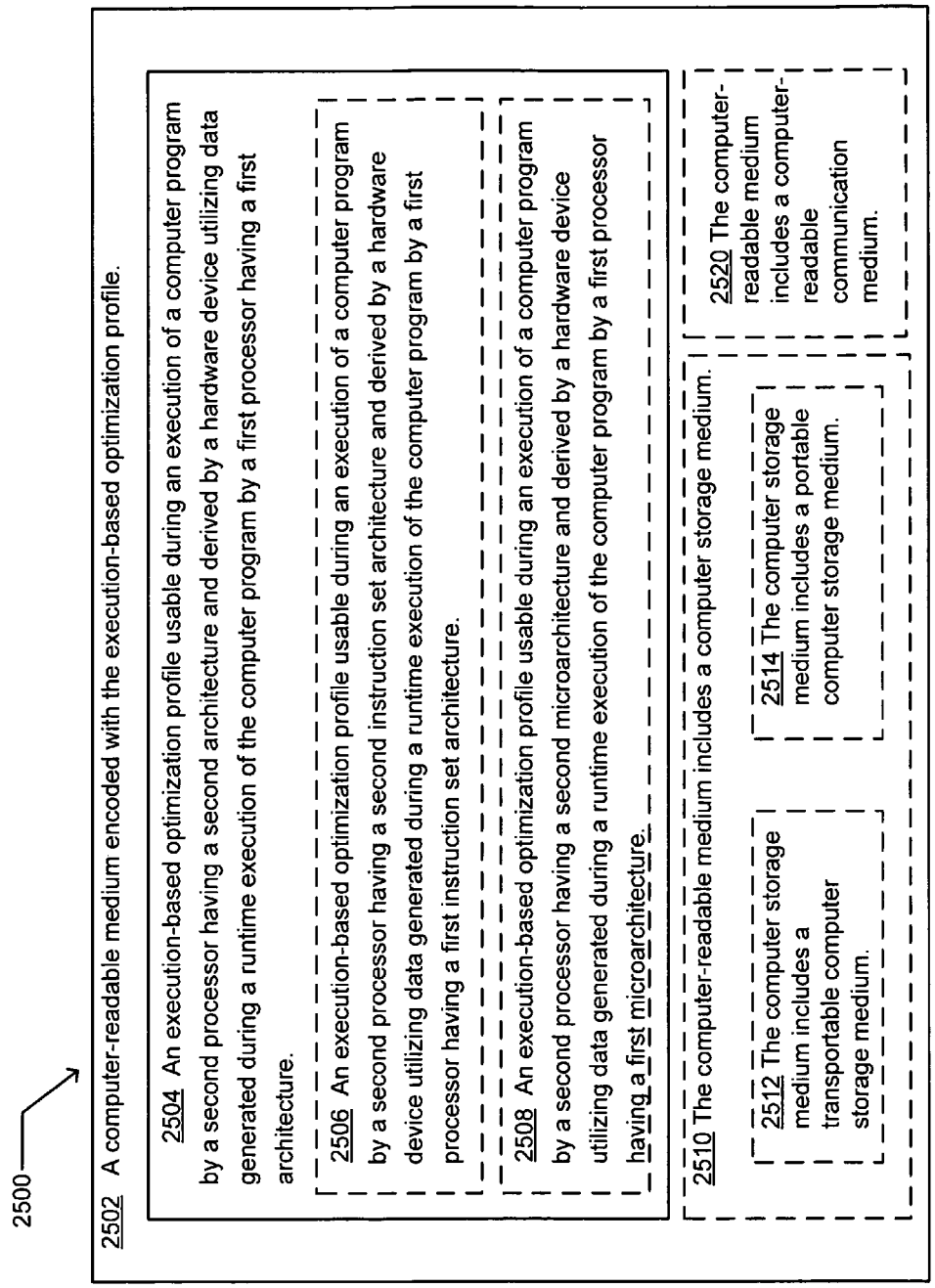
FIG. 49 illustrates an exemplary apparatus in which embodiments may be implemented.

FIG. 49 illustrates an exemplary apparatus 2500 in which embodiments may be implemented. The apparatus includes a computer-readable medium 2502 encoded with an execution-based optimization profile 2504. The execution-based optimization profile includes an execution-based optimization profile usable during an execution of a computer program by a second processor having a second architecture and derived by a hardware device utilizing data generated during a runtime execution of the computer program by a first processor having a first architecture.

In another embodiment, the execution-based optimization profile includes an execution-based optimization profile 2506 usable during an execution of a computer program by a second processor having a second instruction set architecture and derived by a hardware device utilizing data generated during a runtime execution of the computer program by a first processor having a first instruction set architecture. In a further embodiment, the execution-based optimization profile includes an execution-based optimization profile 2508 usable during an execution of a computer program by a second processor having a second microarchitecture and derived by a hardware device utilizing data generated during a runtime execution of the computer program by a first processor having a first microarchitecture.

In an embodiment, the computer-readable medium 2502 includes a computer storage medium 2510. In a further embodiment, the computer storage medium may include a transportable computer storage medium 2512, or a portable computer storage medium 2514. In an embodiment, the computer-readable medium includes a computer-readable communications medium 2520.

Figure 50:
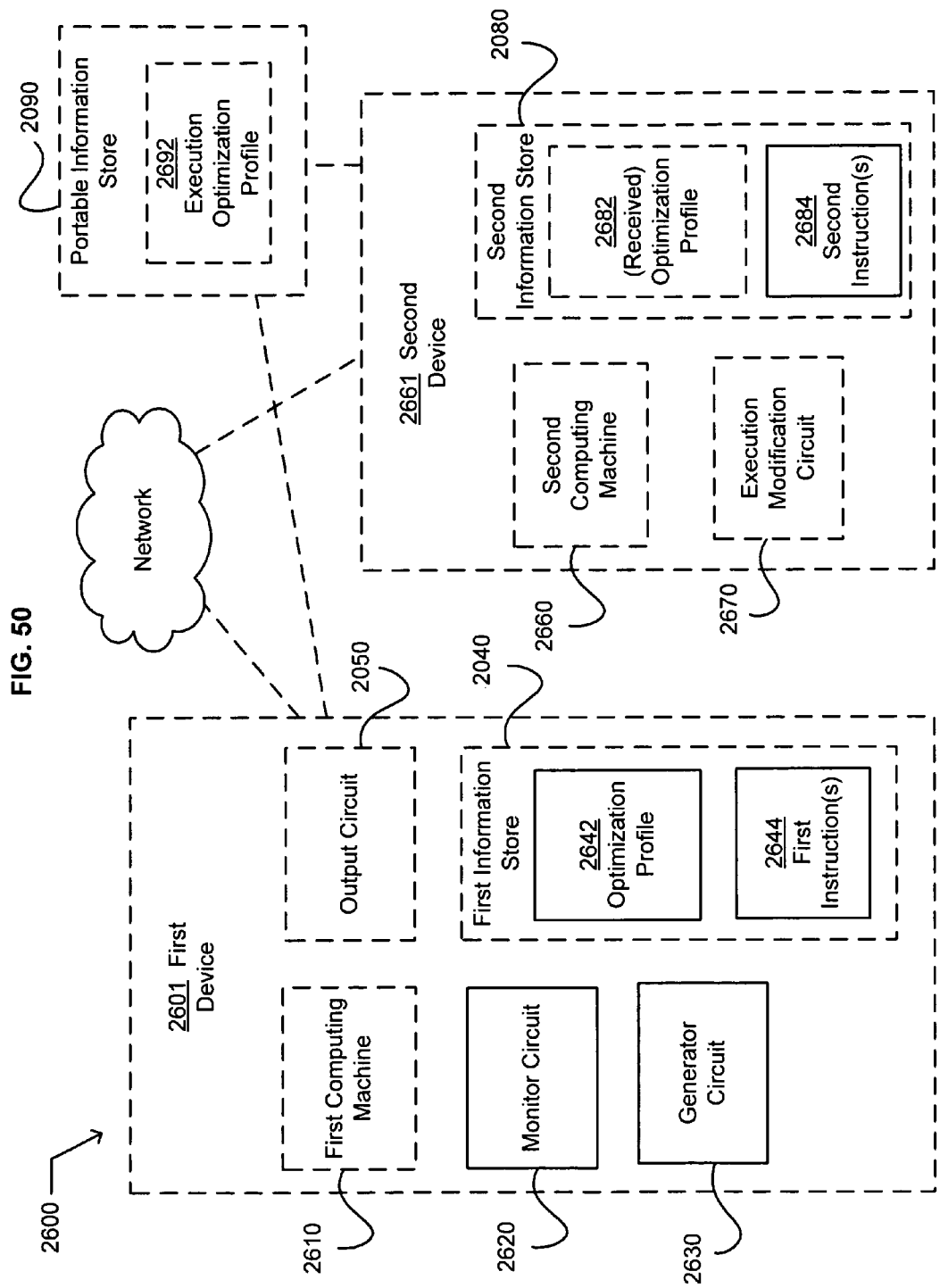
FIG. 50 illustrates a partial view of an exemplary apparatus in which embodiments may be implemented.

FIG. 50 illustrates a partial view of an exemplary apparatus 2600 in which embodiments may be implemented. The apparatus includes a monitor circuit 2620 and a generator circuit 2630. The monitor circuit includes a monitor circuit for determining an execution characteristic of a first instruction 2644 associated with a first computing machine architecture. The generator circuit includes a generator circuit for creating an optimization profile 2642 useable in an execution of a second instruction 2684 associated with a second computing machine architecture.

In an embodiment, the apparatus may include a first computing machine 2610 having the first computing machine architecture, and/or a second computing machine 2660 having the second computing machine architecture. In another embodiment, the apparatus may include a first device 2601 that includes the first computing machine 2610. The first computing machine may include a virtual computing machine and/or a real computing machine. In a further embodiment, the apparatus may include a second device 2661 that includes the second computing machine. The second computing machine may include a virtual computing machine and/or a real computing machine. A real computing machine may include a real processor unit formed on a chip, such as the processing unit 120 described in conjunction with FIG. 1. A virtual computing machine may include a Java Virtual Machine.

In an embodiment, the monitor circuit 2620 includes a monitor circuit for determining at a runtime an execution characteristic of a first instruction 2644 associated with a first computing machine architecture. In a further embodiment, the monitor circuit includes a monitor circuit for determining at a walk-time a characteristic of execution of a first instruction associated with a first computing machine architecture. In another embodiment, the monitor circuit includes a monitor circuit for determining at a compile time an execution characteristic of a first instruction associated with a first computing machine architecture. For example, determining at a compile time may include determining statically, i.e., without an execution. In a further embodiment, the monitor circuit includes a monitor circuit for dynamically determining an execution characteristic of a first instruction associated with a first computing machine architecture.

In an embodiment, the monitor circuit 2620 includes a monitor circuit for determining an execution characteristic of a first instruction 2644 associated with a first computing machine architecture in response to a compilation of the first instruction into an intermediate language. For example, an intermediate language may include a binary executable language, such as bytecode of the Java Virtual Machine, or Common Intermediate Language of Microsoft's C#. In another embodiment, the monitor circuit includes a monitor circuit for determining an execution characteristic of a first instruction corresponding to an execution of the first instruction by a real first computing machine having the first computing machine architecture. In a further embodiment, the monitor circuit includes a monitor circuit for determining an execution characteristic of a first instruction corresponding to an execution of the first instruction by a virtual first computing machine having the first computing machine architecture.

In an embodiment, the monitor circuit 2620 includes a monitor circuit for determining an execution characteristic of a first instruction 2644 corresponding to a simulated execution of the first instruction having a first computing machine architecture. In another embodiment, the monitor circuit includes a monitor circuit for determining an execution characteristic of a first instruction corresponding to a translation of the first instruction having a first computing machine architecture. The translation may include a static translation. In a further embodiment, the monitor circuit includes a monitor circuit for determining an execution characteristic of a first instruction corresponding to a dynamic translation of the first instruction associated with a first computing machine architecture. In another embodiment, the monitor circuit includes a monitor circuit for determining an execution characteristic of a first instruction corresponding to a compilation of the first instruction associated with a first computing machine architecture.

In an embodiment, the generator circuit 2630 includes a generator circuit for creating an optimization profile useable in an execution of a second instruction 2684 associated with a second computing machine architecture in response to the determined execution characteristic. In a further embodiment, the second instruction associated with a second computing machine architecture is at least substantially similar to the first instruction 2644 associated with a first computing machine architecture. In another embodiment, the second instruction associated with a second computing machine architecture is at least substantially different than the first instruction associated with a first computing machine architecture.

In an embodiment, the generator circuit 2630 includes a generator circuit for creating an optimization profile useable in modifying a movement of data with respect to an execution of a second instruction 2684 associated with a second computing machine architecture. For example, the movement of data may include a prefetch of data, and/or storage of data in a different location than indicated by the second instruction. In another embodiment, the generator circuit includes a generator circuit for creating an optimization profile useable in modifying an execution of a second instruction associated with a second computing machine architecture.

Figure 51:
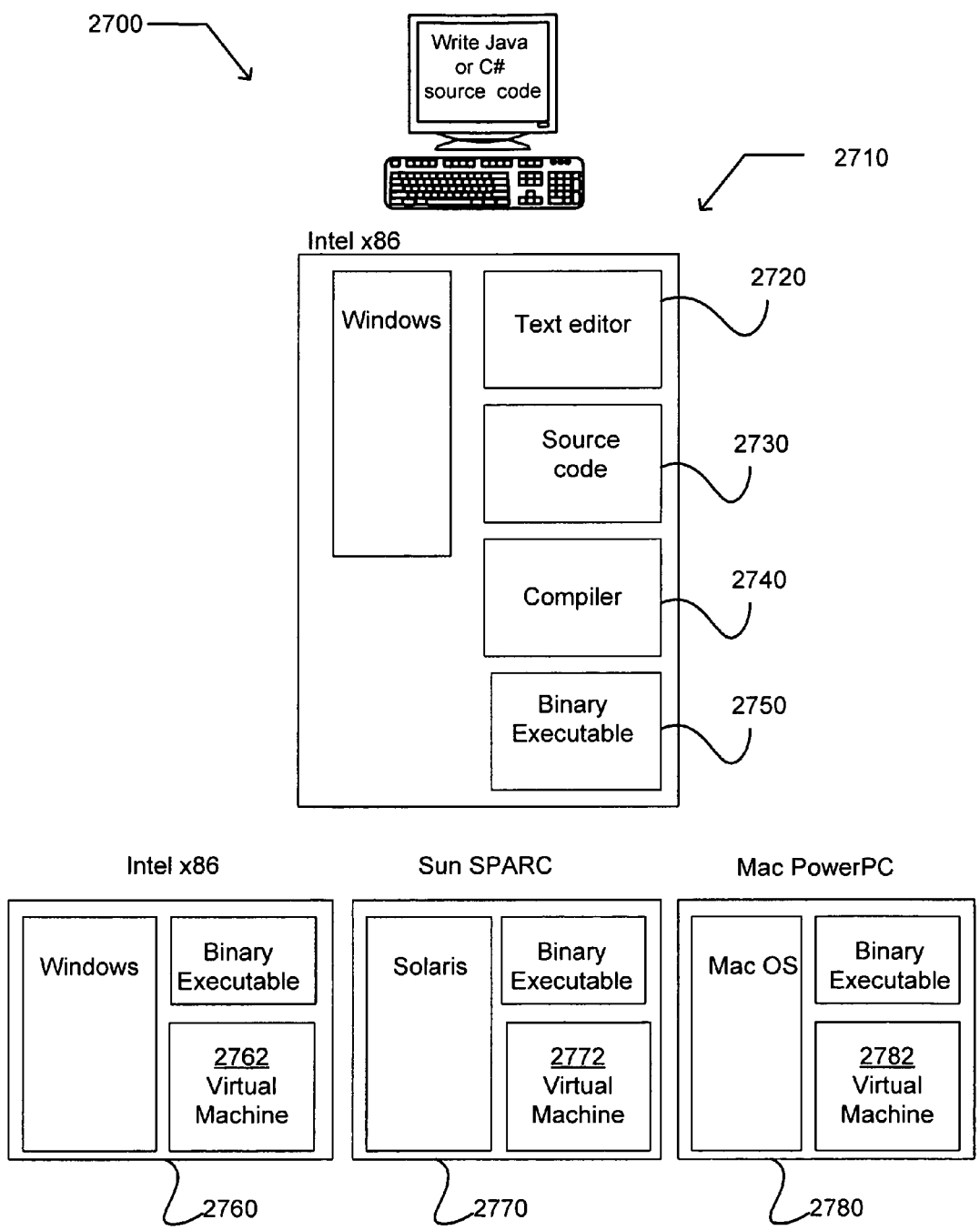
FIG. 51 illustrates a partial view of an environment in which embodiments may be implemented.

FIG. 51 illustrates a partial view of an environment 2700 in which embodiments may be implemented. The environment includes a computing device useable for writing programs in a source code 2730, such as Sun's Java and/or Microsoft's C#. The computing device may include any computing device, and is illustrated as a windows-based computing device 2710. In an embodiment, the computing device may include the monitor circuit 2620 and the generator circuit 2630 described in conjunction with FIG. 50, the inclusion of which is not illustrated in FIG. 51.

A user employs a text editor 2720 to write one or more instructions and/or statements in the source code 2730 having a computing machine architecture, illustrated as Java and/or Microsoft C# source code. The one or more instructions and/or statements written in the source code 2730 having a computing machine architecture (sometimes referred to herein as "a first instruction") are compiled by a compiler 2740 into a binary executable 2750 associated with a first computing machine architecture. For example, instructions and/or statements written in Java source code may be compiled to bytecode associated with Java virtual computing machine architecture, and instructions and/or statements written in C# source code may be complied to Microsoft's Common Intermediate Language associated with a computing machine architecture. In conjunction with compiling the source code, the monitor circuit 2620 determines an execution characteristic of a first instruction associated with a first computing machine architecture. In response to the determined execution characteristic, the generator circuit 2630 creates an optimization profile useable in an execution of a second instruction associated with a second computing machine architecture. In an embodiment, the second computing machine architecture is at least substantially different from the first computing machine architecture. In a further embodiment, the second computing machine architecture is at least substantially similar to the first computing machine architecture.

The second computing machine architecture may be any computing machine architecture. For example, the second computing machine architecture may include an Intel x86 computing machine architecture 2760, a Sun SPARC computing machine architecture 2770, and/or a Mac PowerPC computing machine architecture 2780. The optimization profile created by the generator circuit 2630 at the compilation into the binary executable 2750 by the compiler 2740 may include optimization information useful when the second instruction is compiled by the virtual machine 2762 into the native language of the second computing machine having the second computing machine architecture. The virtual machine may include a Java virtual machine, and/or a Microsoft common language runtime virtual machine. For example, the optimization profile may be usable in an execution of the second instruction in one or more of the computing machines illustrated in FIG. 51.

In an alternative embodiment, the first instruction having a first computing machine architecture may include an instruction of the binary executable 2750. The second instruction having a second computing machine architecture may include a native language and/or machine language of the processor, such the x86 machine code of the Intel x86 machine 2760 or the machine code of the Mac PowerPC machine 2780.

A further embodiment may be illustrated by FIG. 50. For example, the first instruction 2644 having a first computing machine architecture may include a machine language instruction associated with the x86 computing machine architecture. The second instruction 2684 having a second computing machine architecture may include a machine language instruction associated with the Mac PowerPC computing machine architecture.

Figure 52:
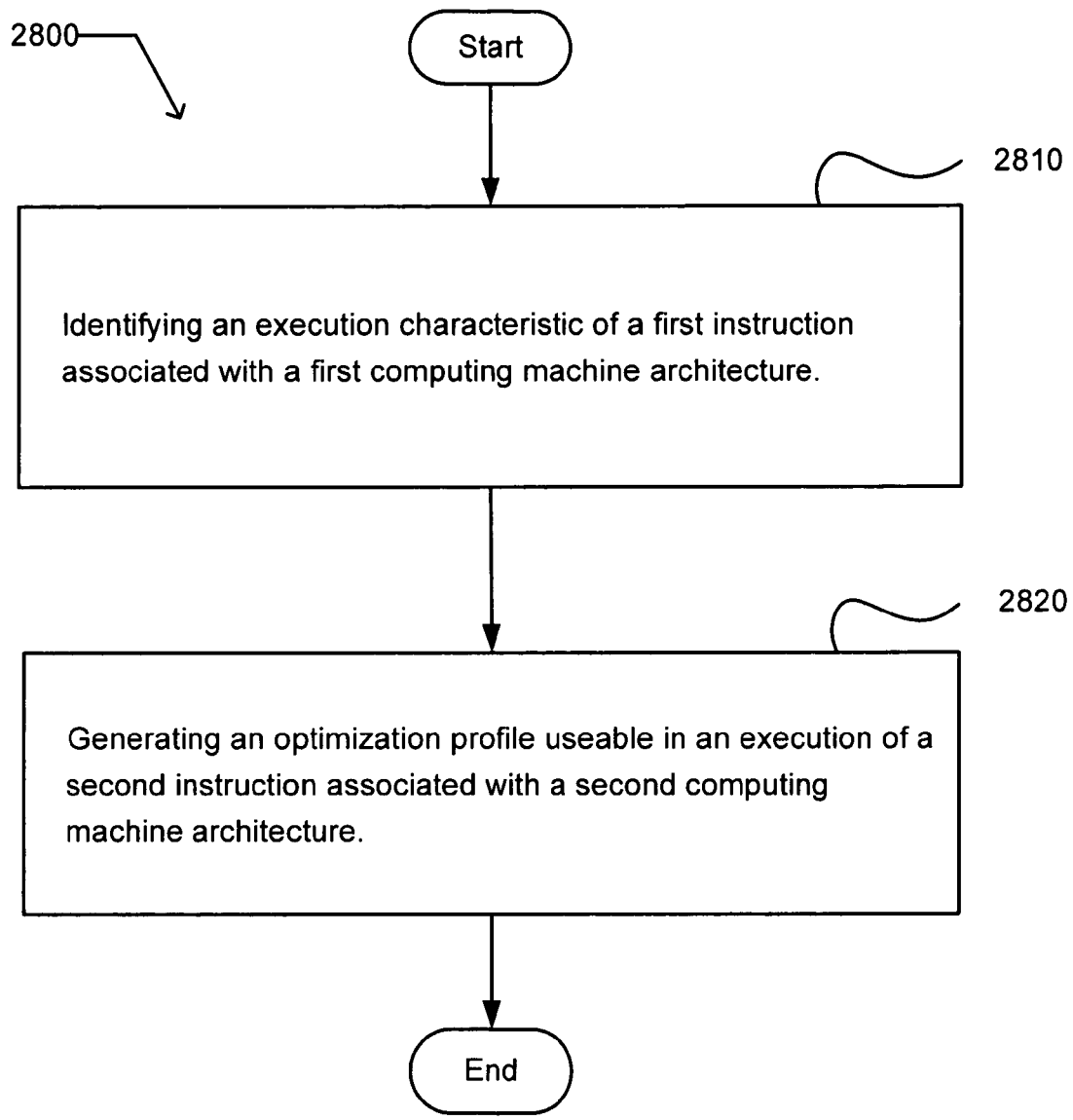
FIG. 52 illustrates an exemplary operational flow in which embodiments may be implemented

FIG. 52 illustrates an exemplary operational flow 2800 in which embodiments may be implemented. After a start operation, the operational flow moves to a detection operation 2810. The detection operation identifies an execution characteristic of a first instruction associated with a first computing machine architecture. A creation operation 2820 generates an optimization profile useable in an execution of a second instruction associated with a second computing machine architecture. The operational flow then moves to an end operation.

Figure 53:
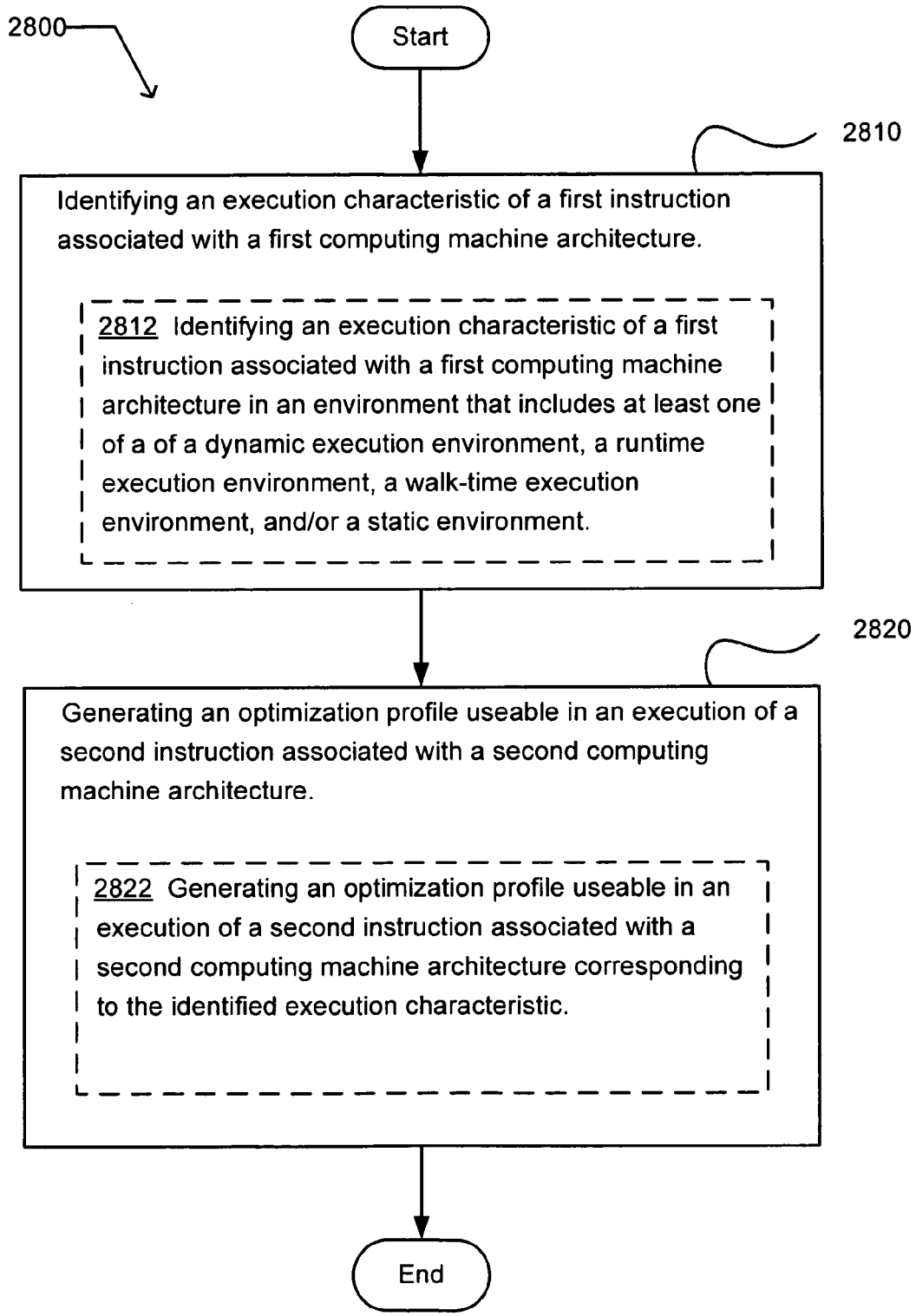
FIG. 53 illustrates an alternative embodiment of the exemplary operational flow of FIG. 52.

FIG. 53 illustrates an alternative embodiment of the exemplary operational flow 2800. The detection operation 2810 may include at least one additional operation, such as an operation 2812. The operation 2812 identifies an execution characteristic of a first instruction associated with a first computing machine architecture in an environment that includes at least one of a of a dynamic execution environment, a runtime execution environment, a walk-time execution environment, and/or a static environment. The creation operation 2820 may include at least one additional operation, such as an operation 2822. The operation 2822 generates an optimization profile useable in an execution of a second instruction associated with a second computing machine architecture corresponding to the identified execution characteristic.

FIG. 54 illustrates a partial view of a device 2900 in which embodiments may be implemented. The device includes means 2910 for determining an execution characteristic of a first instruction associated with a first computing machine architecture. The device also includes means 2920 for creating an optimization profile useable in an execution of a second instruction associated with a second computing machine architecture.

FIG. 55 illustrates a partial view of an apparatus 3000 in which embodiments may be implemented. The apparatus includes an optimization profile 3004 usable during an execution of a second instruction associated with a second computing machine architecture and determined in response to an execution characteristic of a first instruction associated with a first computing machine architecture. The apparatus also includes a computer-readable medium 3002 encoded with the optimization profile.

In an embodiment, the computer-readable medium 3002 includes a computer storage medium 3010. In another embodiment, the computer storage medium includes a transportable computer storage medium 3012. In a further embodiment, the computer storage medium includes a portable computer storage medium 3014. In another embodiment, the computer-readable medium includes a computer-readable communications medium 3020.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
   a first computing device having a first computing machine architecture;
   a second computing device having a second computing machine architecture;
   a hardware monitor circuit for determining an execution characteristic of a first instruction associated with the first computing machine architecture; and
   a hardware generator circuit for creating a locally generated optimization profile useable in an execution of a second instruction associated with the second computing machine architecture corresponding to the determined execution characteristic of the first instruction associated with the first computing machine architecture, wherein the second computing device includes the hardware generator circuit, and wherein the second instruction associated with the second computing machine architecture is at least substantially different than the first instruction associated with the first computing machine architecture.

2. The apparatus of claim 1, wherein the monitor circuit for determining an execution characteristic of a first instruction associated with a first computing machine architecture includes
   circuitry for determining at a runtime an execution characteristic of a first instruction associated with a first computing machine architecture.

3. The apparatus of claim 1, wherein the monitor circuit for determining an execution characteristic of a first instruction associated with a first computing machine architecture includes
   circuitry for determining at a walk-time an execution characteristic of a first instruction associated with a first computing machine architecture.

4. The apparatus of claim 1, wherein the monitor circuit for determining an execution characteristic of a first instruction associated with a first computing machine architecture includes
 circuitry for determining at a compile time an execution characteristic of a first instruction associated with a first computing machine architecture.

5. The apparatus of claim 1, wherein the monitor circuit for determining an execution characteristic of a first instruction associated with a first computing machine architecture includes
 circuitry for dynamically determining an execution characteristic of a first instruction associated with a first computing machine architecture.

6. The apparatus of claim 1, wherein the monitor circuit for determining an execution characteristic of a first instruction associated with a first computing machine architecture includes
 circuitry for determining an execution characteristic of a first instruction associated with a first computing machine architecture in response to a compilation of the first instruction into an intermediate language.

7. The apparatus of claim 1, wherein the monitor circuit for determining an execution characteristic of a first instruction associated with a first computing machine architecture includes
 circuitry for determining an execution characteristic of a first instruction corresponding to an execution of the first instruction by a real first computing machine having the first computing machine architecture.

8. The apparatus of claim 1, wherein the monitor circuit for determining an execution characteristic of a first instruction associated with a first computing machine architecture includes
 circuitry for determining an execution characteristic of a first instruction corresponding to an execution of the first instruction by a virtual first computing machine having the first computing machine architecture.

9. The apparatus of claim 1, wherein the monitor circuit for determining an execution characteristic of a first instruction associated with a first computing machine architecture includes
 circuitry for determining an execution characteristic of a first instruction corresponding to a simulated execution of the first instruction having a first computing machine architecture.

10. The apparatus of claim 1, wherein the monitor circuit for determining an execution characteristic of a first instruction associated with a first computing machine architecture includes
 circuitry for determining an execution characteristic of a first instruction corresponding to a translation of the first instruction having a first computing machine architecture.

11. The apparatus of claim 1, wherein the monitor circuit for determining an execution characteristic of a first instruction associated with a first computing machine architecture includes
 circuitry for determining an execution characteristic of a first instruction corresponding to a dynamic translation of the first instruction associated with a first computing machine architecture.

12. The apparatus of claim 1, wherein the monitor circuit for determining an execution characteristic of a first instruction associated with a first computing machine architecture includes
 circuitry for determining an execution characteristic of a first instruction corresponding to a compilation of the first instruction associated with a first computing machine architecture.

13. The apparatus of claim 1, wherein the generator circuit for creating an optimization profile useable in an execution of a second instruction associated with a second computing machine architecture includes
 circuitry for creating an optimization profile useable in an execution of a second instruction associated with a second computing machine architecture in response to the determined execution characteristic.

14. The apparatus of claim 1, wherein the second instruction associated with a second computing machine architecture performs at least a substantially similar function as that of the first instruction associated with a first computing machine architecture.

15. The apparatus of claim 1, wherein the generator circuit for creating an optimization profile useable in an execution of a second instruction associated with a second computing machine architecture includes
 circuitry for creating an optimization profile useable in modifying a movement of data with respect to an execution of a second instruction associated with a second computing machine architecture.

16. The apparatus of claim 1, wherein the generator circuit for creating an optimization profile useable in an execution of a second instruction associated with a second computing machine architecture includes
 circuitry for creating an optimization profile useable in modifying an execution of a second instruction associated with a second computing machine architecture.

17. A method comprising:
 identifying an execution characteristic of a first instruction associated with a first computing machine architecture of a first computing device; and
 generating locally, in response to the execution characteristic of the first instruction associated with the first computing machine architecture of the first computing device, an optimization profile useable in an execution of a second instruction associated with a second computing machine architecture of a second computing device, wherein the first computing device and the second computing device are included in a same apparatus, and wherein the second instruction associated with the second computing machine architecture is at least substantially different than the first instruction associated with the first computing machine architecture.

18. The method of claim 17, wherein the identifying an execution characteristic of a first instruction associated with a first computing machine architecture of a first computing device includes
 identifying an execution characteristic of a first instruction associated with a first computing machine architecture of a first computing device in an environment that includes at least one of a dynamic execution environment, a runtime execution environment, a walk-time execution environment, and/or a static environment.

19. The method of claim 17, wherein the generating an optimization profile useable in an execution of a second instruction associated with a second computing machine architecture includes
 generating an optimization profile useable in an execution of a second instruction associated with a second computing machine architecture corresponding to the identified execution characteristic.

20. A device comprising:
a hardware means for determining an execution characteristic of a first instruction associated with a first computing machine architecture of a first computing machine; and
means for creating locally an optimization profile useable in an execution of a second instruction associated with a second computing machine architecture of a second computing machine corresponding to the determined execution characteristic of the first instruction associated with the first computing machine architecture of the first computing device, wherein the first computing machine and the second computing machine are included in the device, and wherein the second instruction associated with the second computing machine architecture of the second computing machine is at least substantially different than the first instruction associated with the first computing machine architecture.

21. An apparatus comprising:
an optimization profile usable during an execution of a second instruction associated with a second computing machine architecture of a second computing machine and determined locally in response to an execution characteristic of a first instruction associated with a first computing machine architecture of a first computing machine, wherein the first computing machine and the second computing machine are included in the apparatus, and wherein the second instruction associated with the second computing machine architecture of the second computing machine is at least substantially different than the first instruction associated with the first computing machine architecture; and
a computer-readable storage medium encoded with the optimization profile.

22. The apparatus of claim 21, wherein the computer-readable storage medium includes a computer storage medium.

23. The apparatus of claim 22, wherein the computer storage medium includes a transportable computer storage medium.

24. The apparatus of claim 22, wherein the computer storage medium includes a portable computer storage medium.

25. The apparatus of claim 1, wherein the first computing machine architecture comprises a first instruction set architecture, and wherein the second computing machine architecture comprises a second instruction set architecture.

26. The apparatus of claim 1, wherein the optimization profile useable in the execution of the second instruction associated with the second computing machine architecture comprises optimization information useful when the second instruction is compiled by a virtual machine into a native language of a second computing machine having the second computing machine architecture corresponding to the determined execution characteristic of the first instruction associated with the first computing machine architecture.

27. The method of claim 17 wherein the first computing machine architecture comprises a first set of machine language instructions, and wherein the second computing machine architecture comprises a second set of machine language instructions.

28. The device of claim 20 wherein the first computing machine architecture comprises a first set of machine language instructions, and wherein the second computing machine architecture comprises a second set of machine language instructions.

29. The apparatus of claim 21 wherein the first computing machine architecture comprises a first set of machine language instructions, and wherein the second computing machine architecture comprises a second set of machine language instructions.

30. The apparatus of claim 1, wherein the hardware monitor circuit for determining an execution characteristic of a first instruction associated with a first computing machine architecture includes:
a hardware monitor circuit for determining an execution characteristic of a first instruction associated with a first computing machine architecture wherein the first instruction has a plurality of possible branch outcomes.

31. The apparatus of claim 1, wherein the hardware generator circuit for creating an optimization profile useable in an execution of a second instruction associated with a second computing machine architecture corresponding to the determined execution characteristic of the first instruction associated with the first computing machine architecture includes:
a hardware generator circuit for creating an optimization profile useable in an execution of a second instruction associated with a second computing machine architecture, wherein at least one of the optimization profile or the second instruction has a plurality of possible branch outcomes.

32. The apparatus of claim 1, wherein the locally generated optimization profile points to a non-contiguous third instruction, an instruction associated with the first computing machine architecture, to be fetched in lieu of the first instruction associated with the first computing machine architecture for execution by the first computing machine when indicated by the locally generated optimization profile.

33. The apparatus of claim 1, wherein the hardware generator circuit saves the locally generated optimization profile in an associative cache with the first instruction associated with the first computing machine architecture.

34. The apparatus of claim 1, wherein the locally generated optimization profile is useable in prefetching data in conjunction with an execution of the second instruction associated with the second computing machine architecture in response to receiving data.

* * * * *